US008913025B2

(12) United States Patent
Imamura et al.

(10) Patent No.: US 8,913,025 B2
(45) Date of Patent: Dec. 16, 2014

(54) TOUCH SCREEN, TOUCH PANEL, AND DISPLAY DEVICE INCLUDING THE SAME

(71) Applicants: Takuji Imamura, Tokyo (JP); Tatsuya Nakamura, Tokyo (JP); Seiichiro Mori, Tokyo (JP); Takashi Miyayama, Tokyo (JP); Masafumi Agari, Tokyo (JP); Naoki Nakagawa, Tokyo (JP); Takeshi Ono, Tokyo (JP)

(72) Inventors: Takuji Imamura, Tokyo (JP); Tatsuya Nakamura, Tokyo (JP); Seiichiro Mori, Tokyo (JP); Takashi Miyayama, Tokyo (JP); Masafumi Agari, Tokyo (JP); Naoki Nakagawa, Tokyo (JP); Takeshi Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 13/756,388

(22) Filed: Jan. 31, 2013

(65) Prior Publication Data

US 2013/0194232 A1 Aug. 1, 2013

(30) Foreign Application Priority Data

Feb. 1, 2012 (JP) ................................. 2012-020074

(51) Int. Cl.
*G06F 3/044* (2006.01)
(52) U.S. Cl.
CPC ...................................... *G06F 3/044* (2013.01)
USPC ............................ 345/173; 345/174; 345/175
(58) Field of Classification Search
CPC ................. G06F 3/044; G06F 3/041
USPC ........................ 345/168, 173–176; 178/18, 19
See application file for complete search history.

(56) References Cited

U.S. PATENT DOCUMENTS

| 5,565,658 A | 10/1996 | Gerpheide et al. |
| 5,844,506 A * | 12/1998 | Binstead ........................ 341/34 |
| 6,137,427 A | 10/2000 | Binstead |
| 6,452,514 B1 | 9/2002 | Philipp |
| 8,269,744 B2 * | 9/2012 | Agari et al. ................... 345/174 |
| 8,686,308 B2 * | 4/2014 | Kuriki ........................... 200/600 |
| 2010/0026664 A1* | 2/2010 | Geaghan ....................... 345/174 |
| 2012/0293457 A1 | 11/2012 | Agari et al. |

FOREIGN PATENT DOCUMENTS

| JP | 09-511086 | 11/1997 |
| JP | 11-505641 | 5/1999 |
| JP | 2003-526831 A | 9/2003 |
| JP | 2010-061502 A | 3/2010 |
| JP | 2010-097536 A | 4/2010 |
| WO | 95/27334 A1 | 10/1995 |
| WO | 96/18179 A1 | 6/1996 |
| WO | 00/44018 A1 | 7/2000 |

* cited by examiner

*Primary Examiner* — Andrew Sasinowski
(74) *Attorney, Agent, or Firm* — Studebaker & Brackett PC

(57) ABSTRACT

In a touch screen, the number of dummy column block region patterns is made smaller than the number of plurality of detection block region patterns. The plurality of detection block region pattern are obtained as a result of dividing a crossing region where a column direction wire bunch and a row direction wire bunch cross each other. The dummy column block region patterns are obtained as a result of dividing a crossing region where a dummy column direction wire bunch and a row direction wire bunch cross each other.

12 Claims, 43 Drawing Sheets

FIG. 4
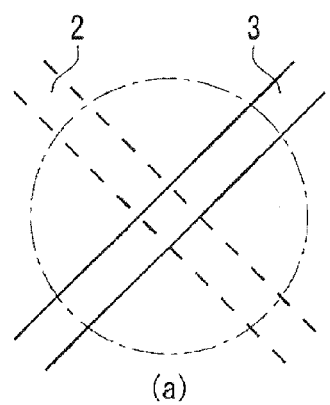
(a)
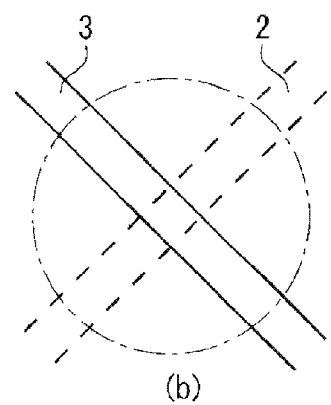
(b)
FIG. 5
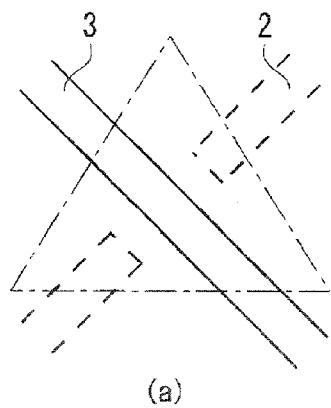
(a)
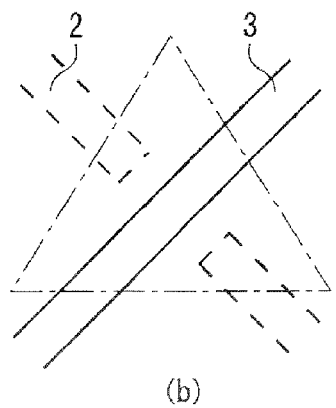
(b)
FIG. 6
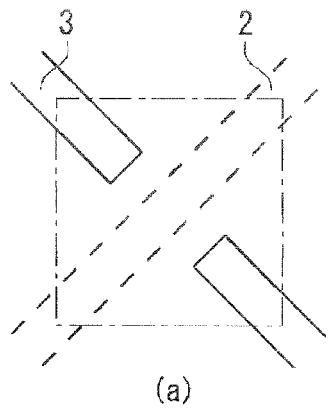
(a)
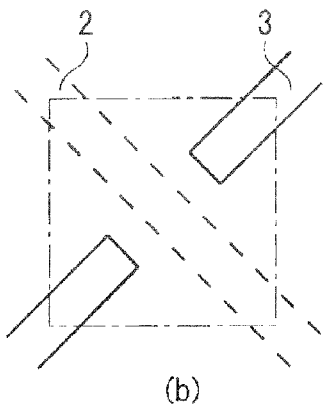
(b)

(a)　　　　　　　　　　(b)

F I G. 1 0
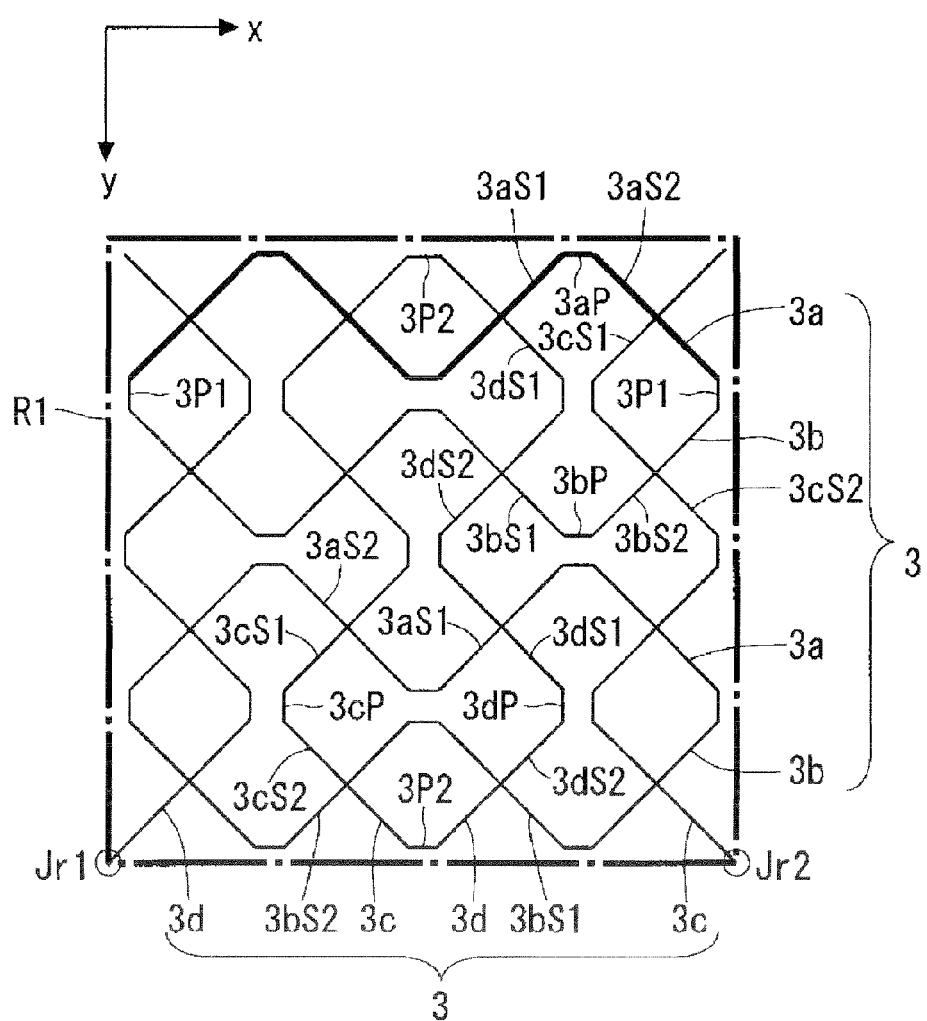

F I G. 2 0
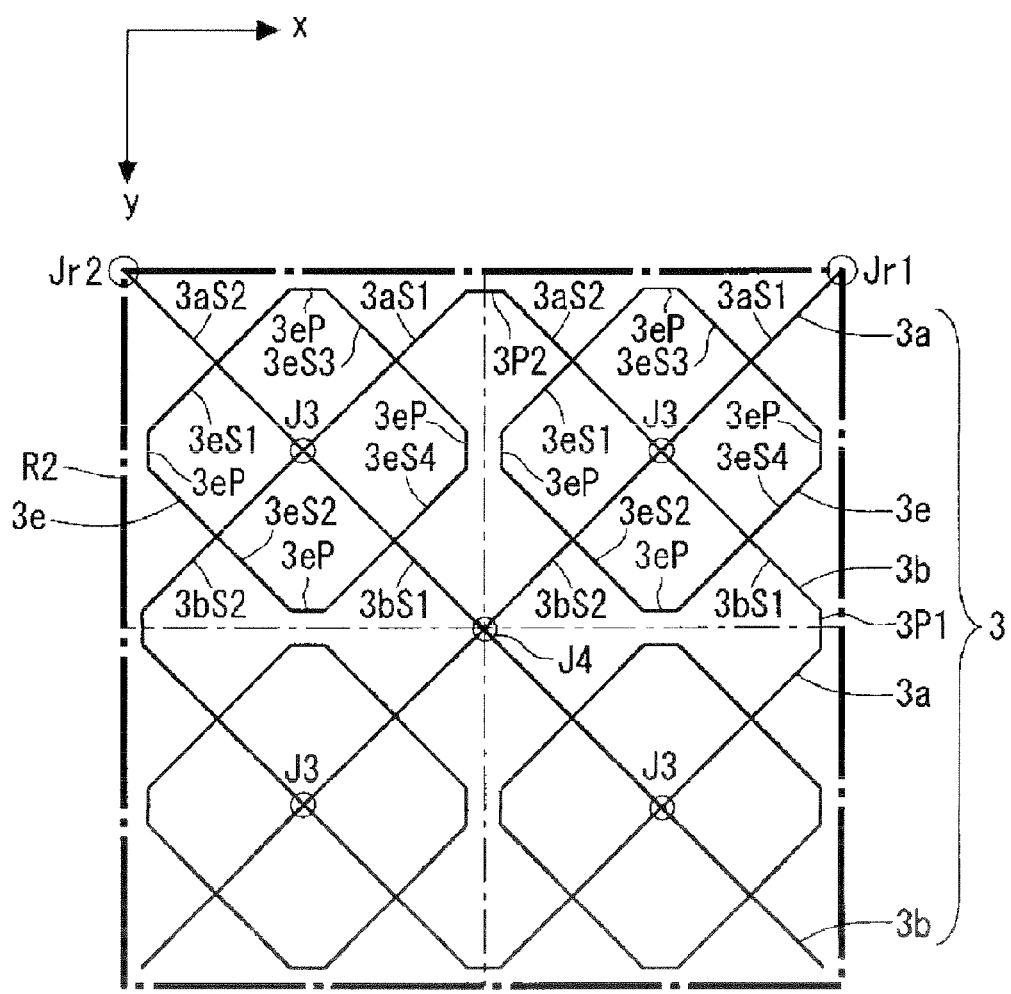

F I G. 2 4
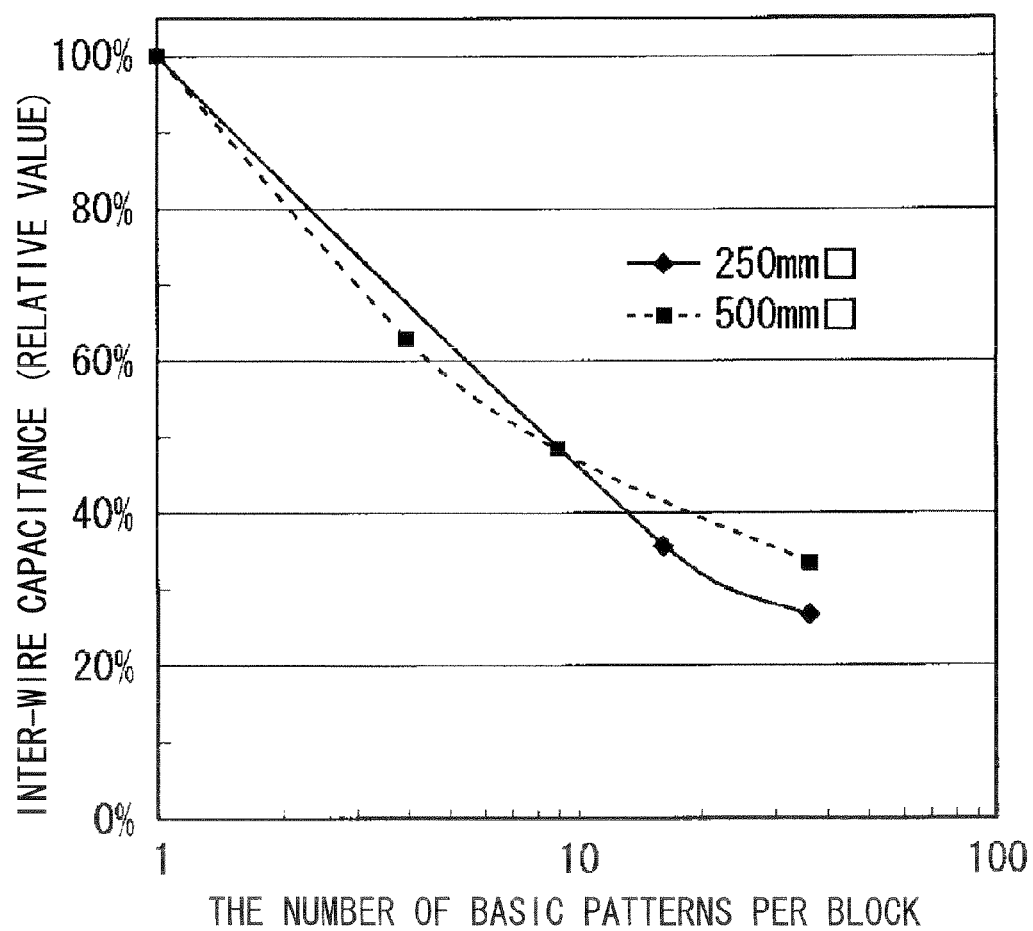

F I G. 2 5
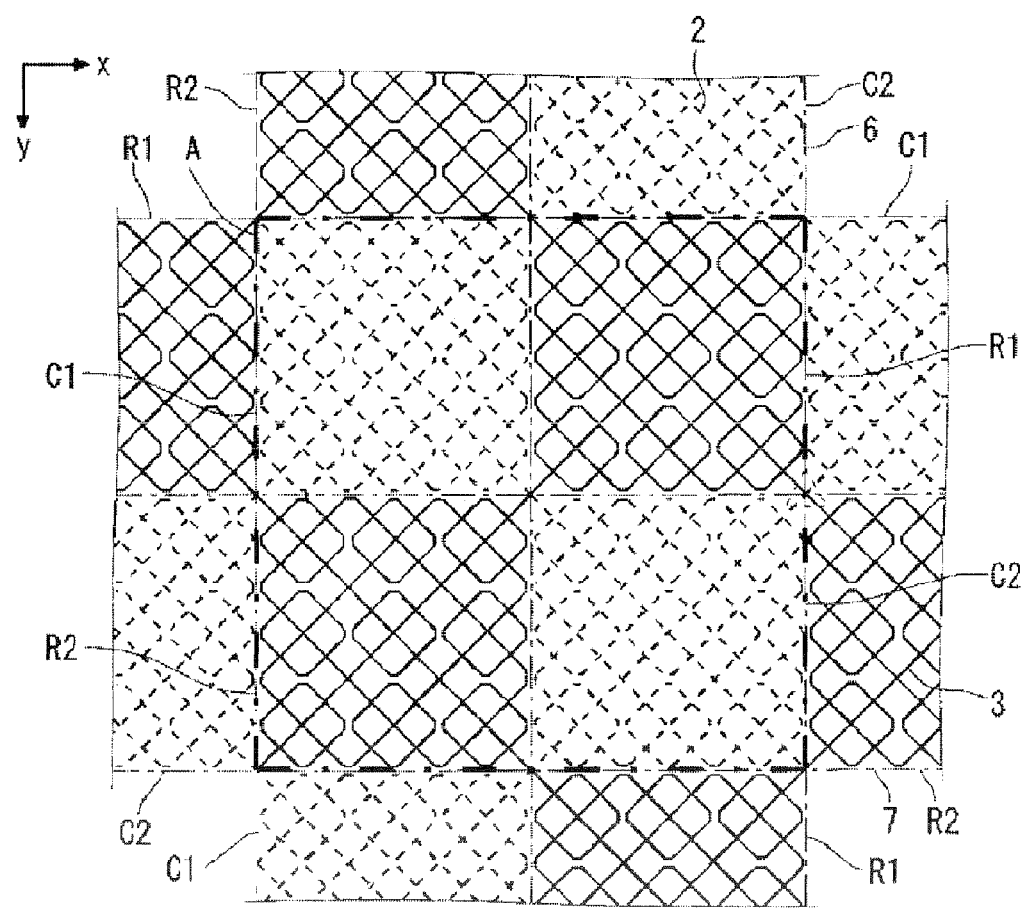

F I G. 2 9
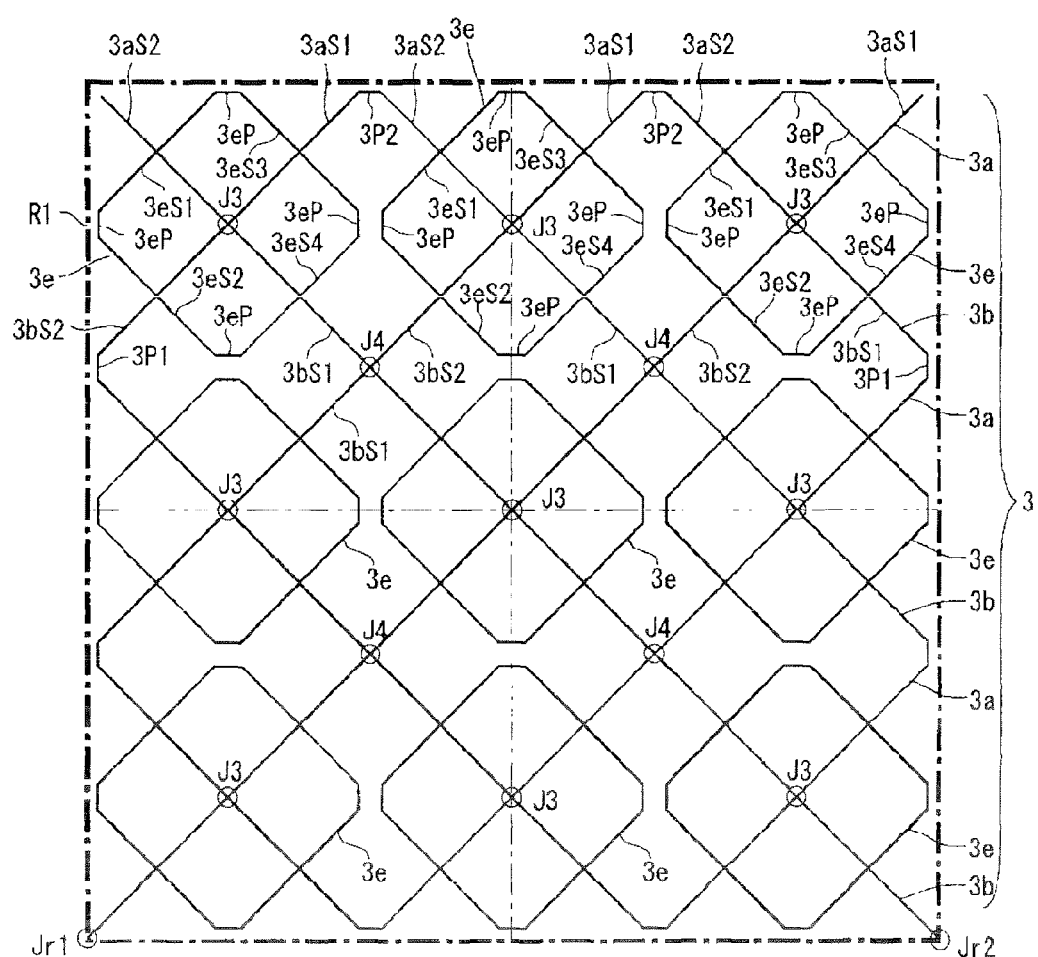

FIG. 38
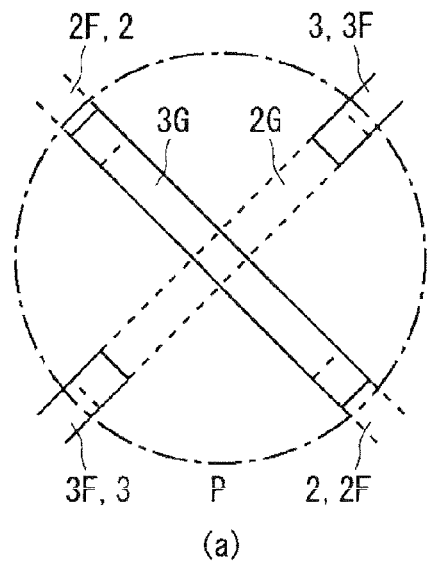
(a)
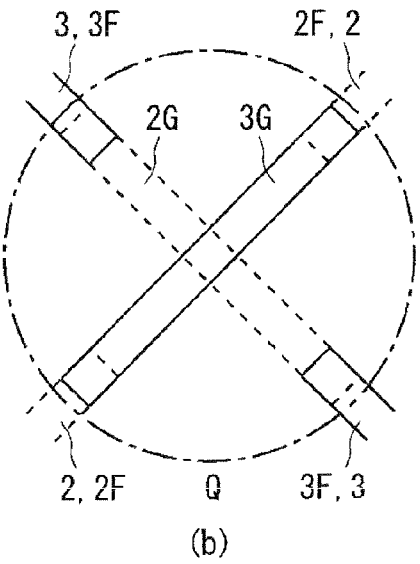
(b)
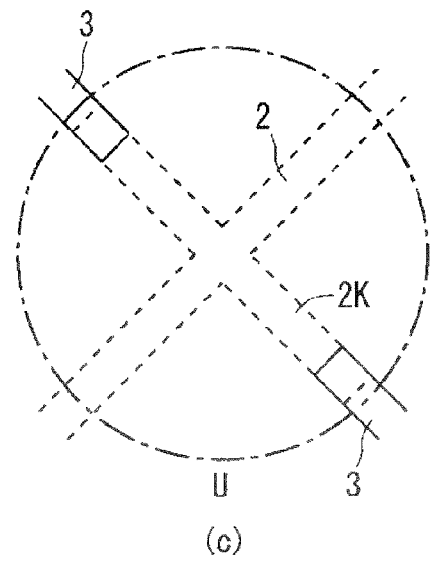
(c)
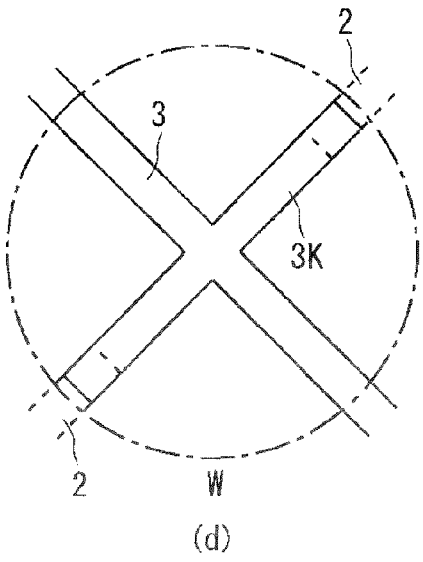
(d)

FIG. 40
(a)
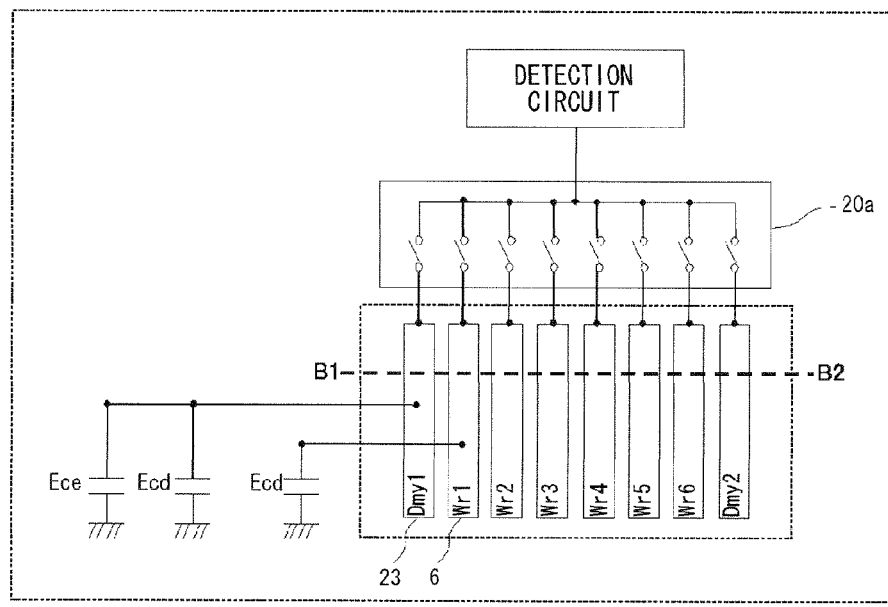
(b)
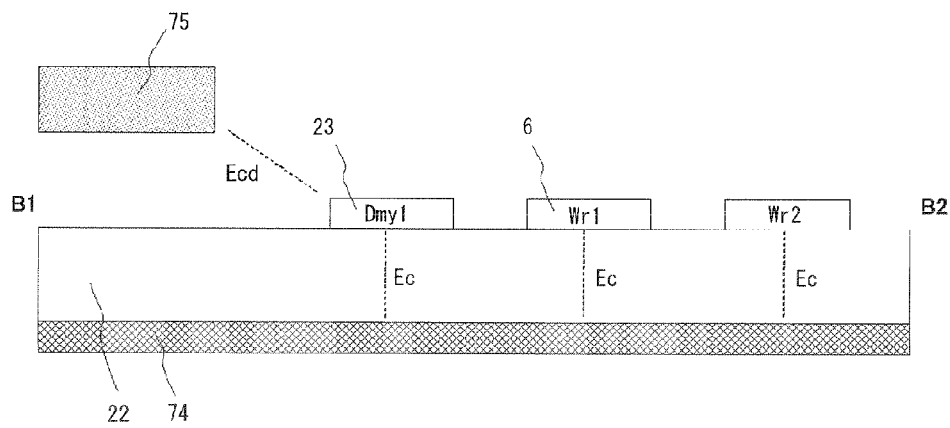
(c)
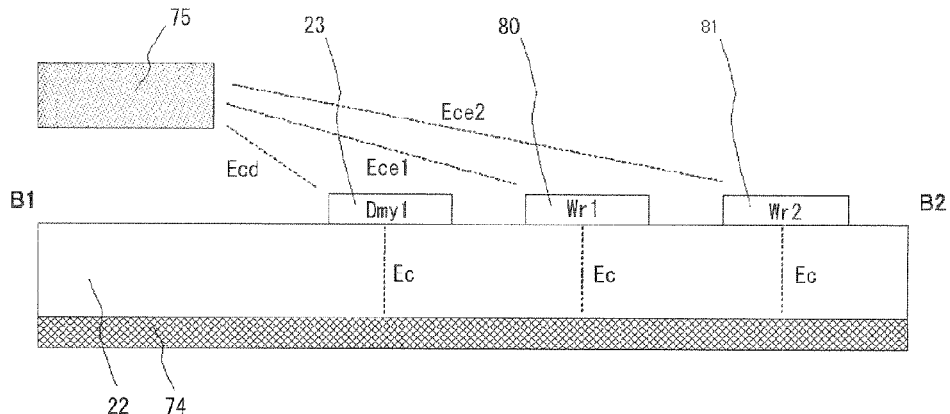

F I G. 4 2
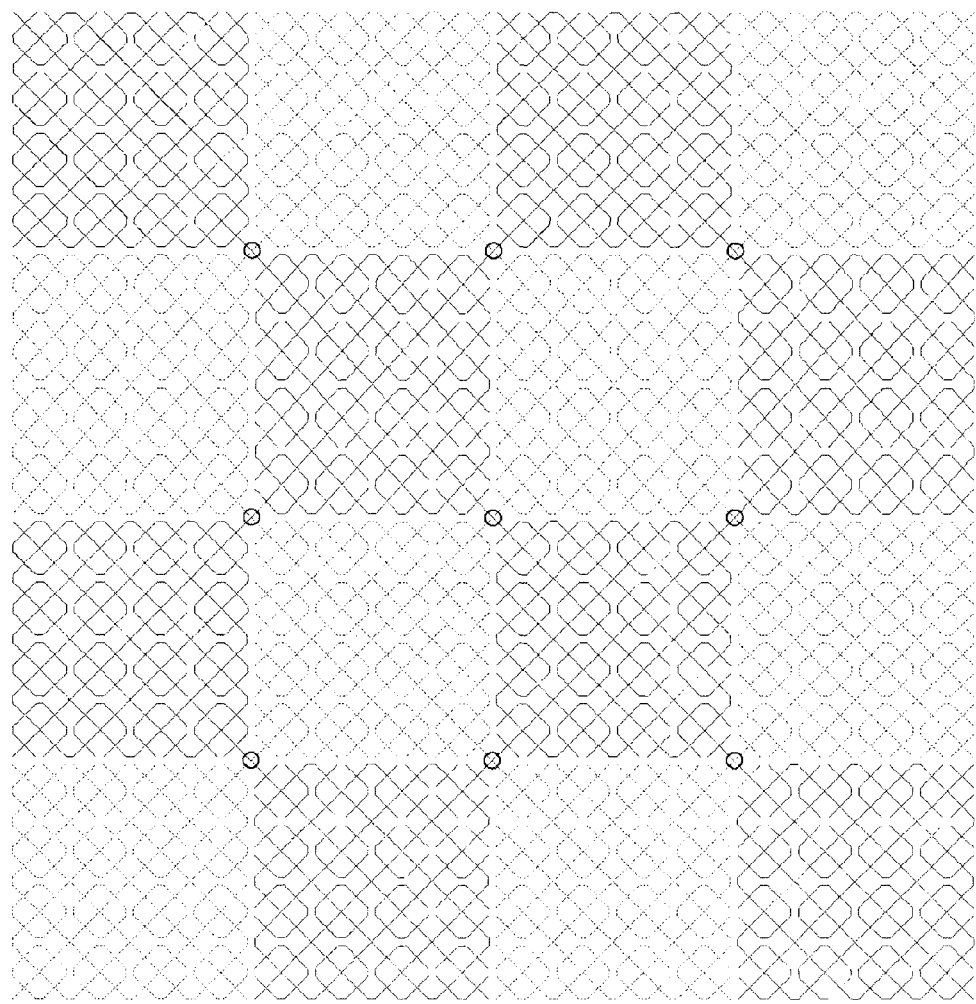

F I G. 4 3
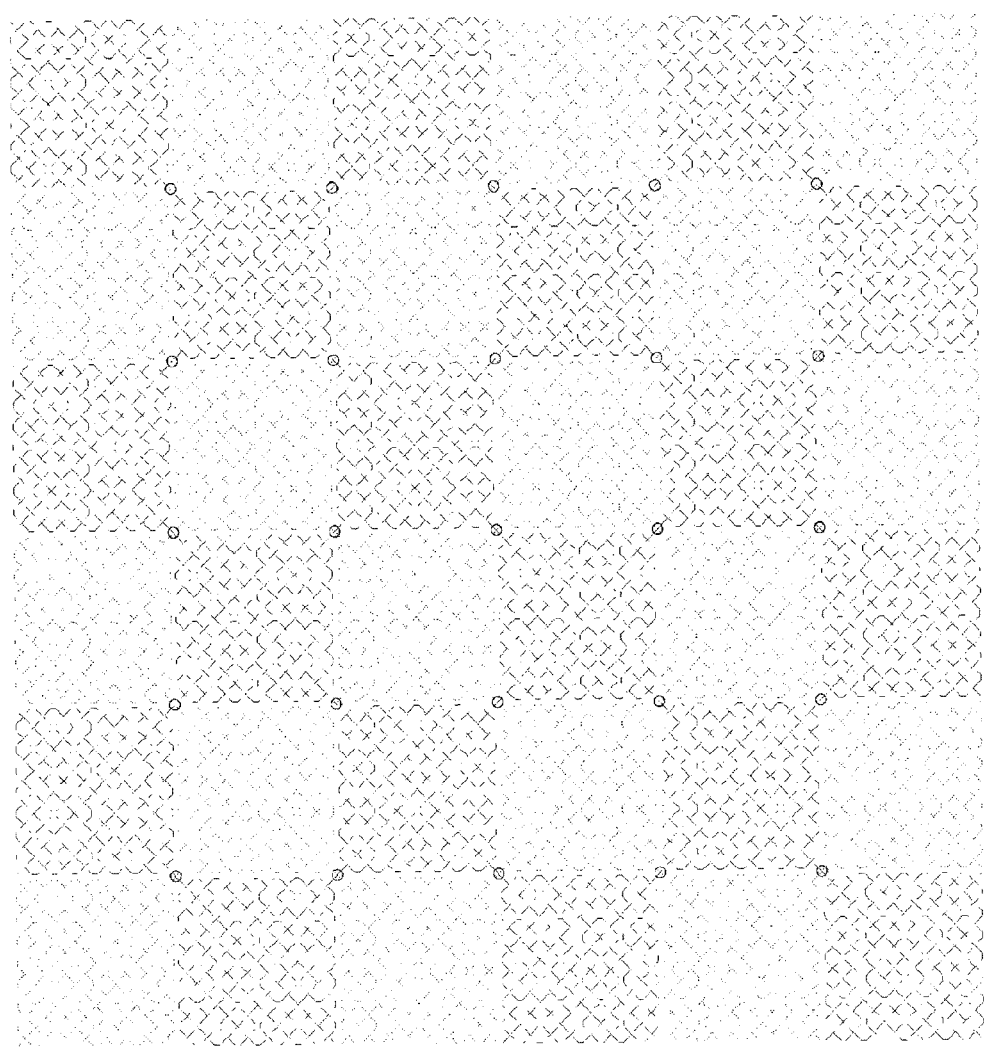

F I G. 4 7
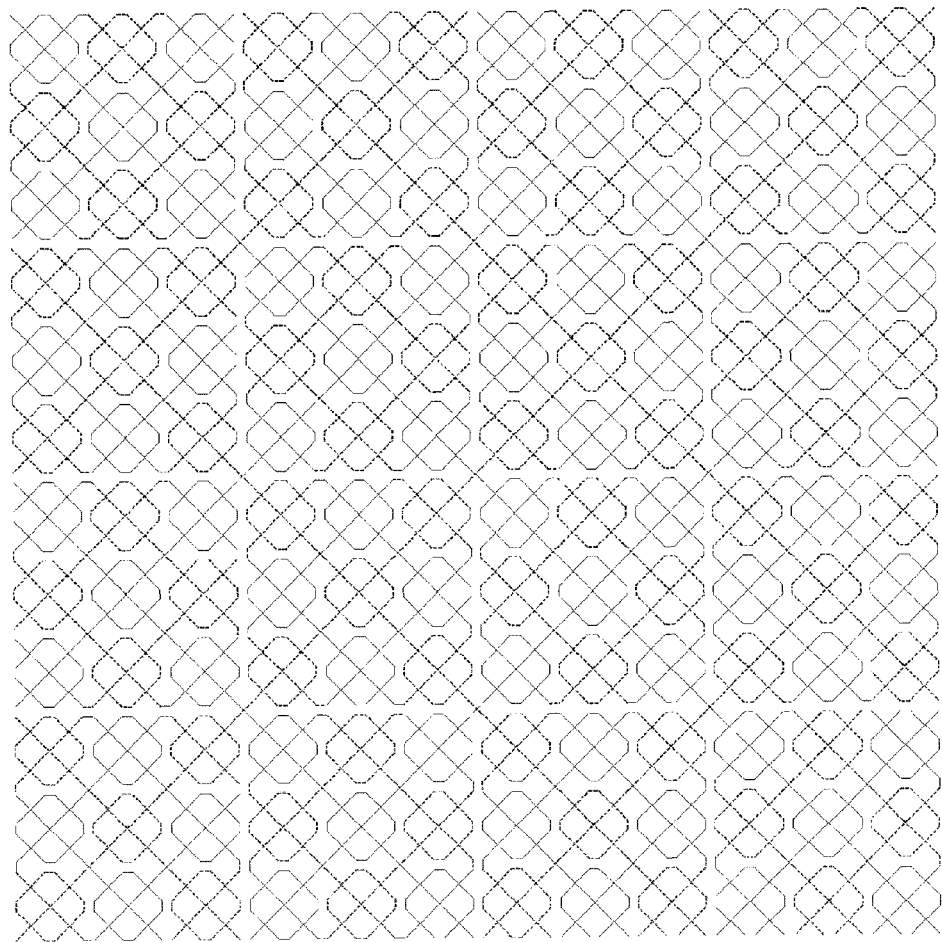

F I G. 4 8
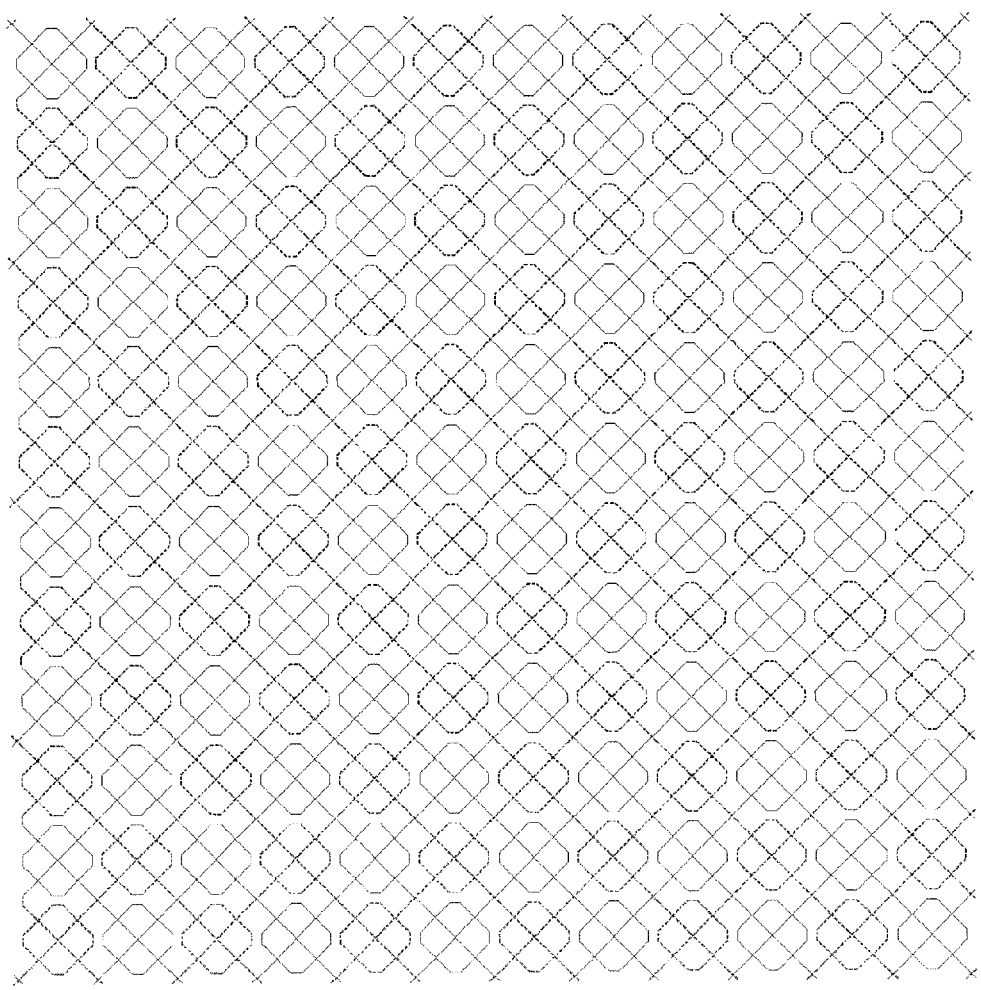

TOUCH SCREEN, TOUCH PANEL, AND DISPLAY DEVICE INCLUDING THE SAME

BACKGROUND OF THE INVENTION

1. Field of the Invention

The present invention relates a touch screen, a touch panel, and a display device including them.

2. Description of the Background Art

Conventionally, a touch panel that detects a touch made with an indicator such as a finger and identifies the position coordinates of the touch is attracting attention as one of excellent interface means. For this touch panel, various types including resistive types and capacitive types have been proposed and put into practice as commercial products.

As one kind of such capacitive type touch panels, a projected capacitive type touch panel is known, as disclosed in National Publication of Translation No. 9-511086 (1997). In this projected capacitive type touch panel, even when a front surface side of a touch screen having a touch sensor built therein is covered with a protection plate such as a glass plate having a thickness of about several mm, a touch to the protection plate with a finger, or the like, can be detected. This touch screen is advantageous in that it has excellent robustness, in that a touch can be detected even when a user wears gloves, in that no movable part is provided and therefore a long life is ensured, and so on. Therefore, various techniques therefor are proposed.

For example, a touch screen provided in a touch panel disclosed in National Publication of Translation No. 9-511086 (1997) includes, as a detection wire (detection electrode) for detecting an electrostatic capacitance, a first series conductive element and a second series conductive element. The first series conductive element is formed as a thin conductive film. The second series conductive element is formed on the first series conductive element with interposition of an insulating film therebetween. No electrical contact is made between the conductive elements, but a plurality of crossing points are formed therebetween. In this technique disclosed in National Publication of Translation No. 9-511086 (1997), an electrostatic capacitance formed between an indicator such as a finger and the conductive elements serving as the detection wire is detected by a detection circuit, and thereby position coordinates of a position touched with the indicator is identified. Furthermore, by using relative values of detected capacitances among one or more conductive elements, a touch position can be interpolated among the conductive elements.

A touch screen provided in a touch panel disclosed in Japanese Patent Application Laid-Open No. 2010-61502 includes a detection column wire and a detection row wire. Each of the wires is formed as a metal wire in a zigzag pattern such that the metal wire is repeatedly staggered with an inclined portion that is inclined at 45° in each of column and row directions. In this technique disclosed in Japanese Patent Application Laid-Open No. 2010-61502, the density of wires can be increased and thereby the sensitivity of touch detection can be improved, without increasing a parasitic capacitance between the detection wires.

A touch screen provided in a touch panel disclosed in Japanese Patent Application Laid-Open No. 2010-97536 includes a detection column wire and a detection row wire that are formed in a zigzag pattern, similarly to the touch screen disclosed in Japanese Patent Application Laid-Open No. 2010-61502. Additionally, the touch screen provided in the touch panel disclosed in Japanese Patent Application Laid-Open No. 2010-97536 further includes a wire between the detection column wire and the detection row wire.

National Publication of Translation No. 2003-526831 discloses a detection type generally called a mutual capacitance detection type. More specifically, a key matrix disclosed in National Publication of Translation No. 2003-526831 is composed of an array of a plurality of pairs of driving/receiving electrodes. A change in a coupling capacitance (capacitance between electrodes) involved in a change in an electric field between electrodes, which occurs in accordance with a contact to a substrate with an indicator such as a finger, is detected as the amount of charge.

A capacitance-based touch detection device disclosed in National Publication of Translation No. 11-505641 (1999) is provided with an electrode array including an X electrode and a Y electrode. A mutual capacitance between the X electrode and the Y electrode is detected by a capacitance measurement circuit. Then, a change in an output voltage indicating the measured capacitance is determined in accordance with a mutual capacitance, a known reference capacitance, a known change in a driving voltage.

The techniques disclosed in Japanese Patent Application Laid-Open No. 2010-61502 and Japanese Patent Application Laid-Open No. 2010-97536 mentioned above can increase the density of wires without increasing an inter-wire capacitance (hereinafter, "capacitance between row and column wires") formed between the detection column wire and the detection row wire. The detection wire arranged in a rectangular shape is advantageous in that a coordinates interpolation process based on a result of detection is more readily performed than a detection wire arranged in the shape of linked diamonds, or in that the linearity of coordinates obtained as a result of an interpolation process is high (particularly in an oblique direction).

In some detection methods, the capacitance between row and column wires, which changes in accordance with the presence or absence of a touch to a touch screen with an indicator such as a finger, is intimately associated the sensitivity of detection. For example, in the mutual capacitance detection type disclosed in National Publication of Translation No. 2003-526831, as a change in a capacitance between row and column wires (a change in the electric field between the electrodes) which occurs in accordance with a touch with an indicator such as a finger is higher, a higher sensitivity of detection is obtained.

However, in a case where a capacitance (electric field coupling) between the column direction wire bunch and the row direction wire bunch is high, for example, in a case where the detection method disclosed in Japanese Patent Application Laid-Open No. 2010-97536 is applied to the touch screen disclosed in Japanese Patent Application Laid-Open No. 2010-61502, it is not likely to cause a change in the electric field between the detection column wire and the detection row wire, that is, a change in the capacitance between row and column wires, which otherwise occurs in accordance with a touch with an indicator such as a finger. Accordingly, application of the mutual capacitance detection type to such a configuration causes a problem that the sensitivity of detection of a touch is low.

SUMMARY OF THE INVENTION

An object of the present invention is to provide a technique that can reduce a capacitance between a column direction wire bunch and a row direction wire bunch.

A touch screen according to the present invention includes: a transparent substrate; and a column direction wire bunch and a row direction wire bunch that are formed on the said transparent substrate, the column direction wire bunch having a rectangular shape and including a plurality of detection column wires electrically connected commonly to each other, the row direction wire bunch having a rectangular shape and including a plurality of detection row wires electrically connected commonly to each other.

In a plan view, a plurality of block regions obtained as a result of dividing a crossing region where said column direction wire bunch and said row direction wire bunch cross each other are specified. In each of said block regions, only said detection column wires or only said detection row wires are provided.

In the touch screen according to the present invention, the number of crossing portions where the detection column wires and the detection row wires cross each other can be reduced. Accordingly, an inter-wire capacitance between the column direction wire bunch and the row direction wire bunch can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2 to 11 are plan views each showing, on an enlarged scale, the configuration of the touch screen according to the preferred embodiment 1;

FIGS. 15 to 23 are plan views each showing, on an enlarged scale, a configuration of a touch screen according to a preferred embodiment 2;

FIG. 24 is a diagram showing an inter-wire capacitance in the touch screen according to the preferred embodiment 2;

FIGS. 25 to 30 are plan views each showing, on an enlarged scale, a configuration of a touch screen according to a preferred embodiment 3;

FIGS. 37 and 38 are plan views each showing, on an enlarged scale, a configuration of a touch screen according to a preferred embodiment 5;

FIG. 40 contains a plan view and a cross-sectional view showing the configuration of the touch screen according to the preferred embodiment 6;

FIGS. 41 to 46 are plan views each showing, on an enlarged scale, the configuration of the touch screen according to the preferred embodiment 6;

FIGS. 47 to 50 are plan views each showing, on an enlarged scale, a configuration of a touch screen according to a preferred embodiment 7;

DESCRIPTION OF THE PREFERRED EMBODIMENTS

<Preferred Embodiment 1>

Figure 1:
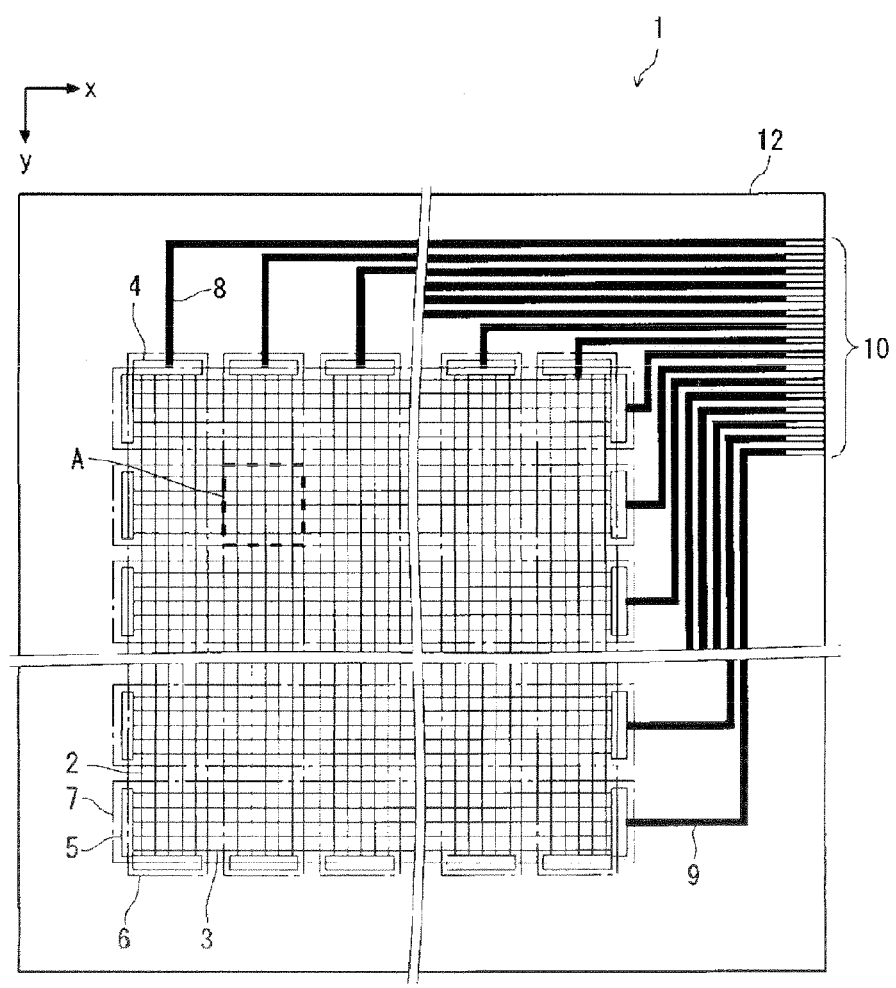
FIG. 1 is a plan view showing a configuration of a touch screen according to a preferred embodiment 1.

FIG. 1 is a plan view schematically showing a configuration of a touch screen 1 provided in a touch panel according to a preferred embodiment 1 of the present invention. In the following, a configuration, and the like, of the touch screen 1 according to this preferred embodiment will be described with reference to FIG. 1 and the like. Here, a reference sign given to a component part described in this preferred embodiment is also given to a component part of preferred embodiments 2 and 3 that is identical or similar to said component part of the preferred embodiment 1.

Figure 2:
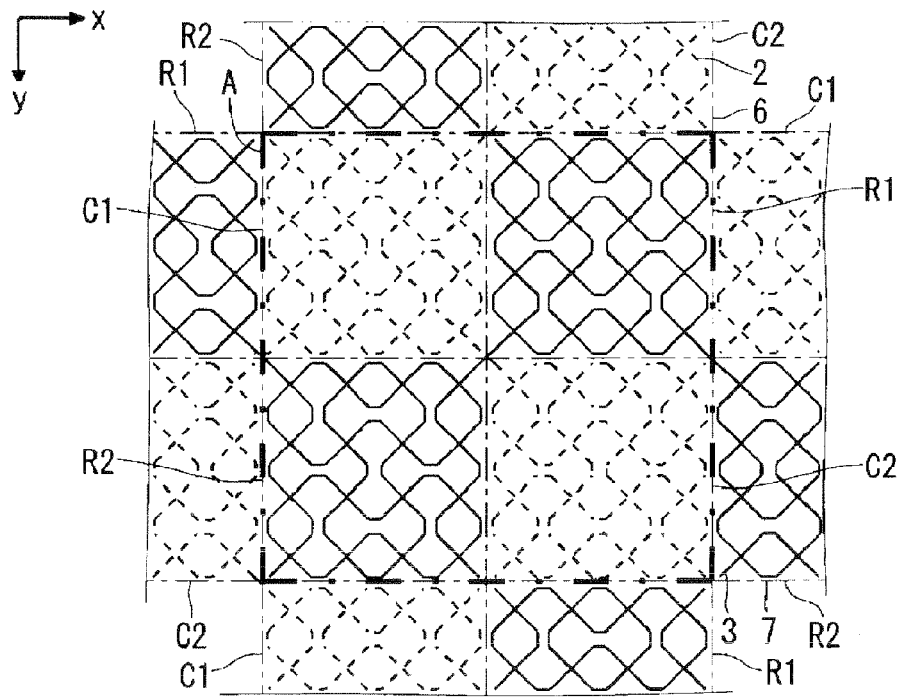

As shown in FIG. 1, the touch screen 1 includes a base substrate 12, (1) a plurality of detection column wires 2, and (2) a plurality of detection row wires 3. The base substrate 12 is a transparent substrate made of a transparent glass material or a transparent resin. The plurality of detection column wires 2 extend in a column direction (corresponding to the y direction in FIG. 1). The plurality of detection row wires 3 extend in a row direction (corresponding to the x direction in FIG. 1). The plurality of detection column wires 2 and the plurality of detection row wires 3 are formed on the base substrate 12. In FIG. 1, for the sake of convenience, the detection column wires 2 and the detection row wires 3 are illustrated with straight lines, but actually, they have a zigzag pattern as shown in FIG. 2 and the like.

A plurality of detection column wires 2 are electrically connected commonly to one another by, for example, a connection wire 4. In this preferred embodiment, the plurality of detection column wires 2 that are electrically connected commonly to one another are included in a column direction wire bunch 6 having a rectangular shape that extends in the column direction y. That is, the column direction wire bunch 6 includes a plurality of detection column wires 2 that are electrically connected commonly to one another. In the above-described case, the detection column wire 2 extends in the column direction y. However, this is not limiting. A wire that does not extend in the column direction y will be called the detection column wire 2, too, as long as the wire constitutes the column direction wire bunch 6.

In the same manner, a plurality of detection row wires 3 are electrically connected commonly to one another by, for example, a connection wire 5. In this preferred embodiment, the plurality of detection row wires 3 that are electrically connected commonly to one another are included in a row direction wire bunch 7 having a rectangular shape that extends in the row direction x. That is, the row direction wire bunch 7 includes a plurality of detection row wires 3 that are electrically connected commonly to one another. In the above-described case, the detection row wire 3 extends in the row direction x. However, this is not limiting. A wire that does not extend in the row direction x will be called the detection row wire 3, too, as long as the wire constitutes the row direction wire bunch 7.

As shown in FIG. 1, a plurality of the column direction wire bunches 6 and a plurality of the row direction wire bunches 7 are arranged in parallel to the column direction y and the row direction x, respectively. The plurality of the column direction wire bunches 6 and the plurality of the row direction wire bunches 7 are arranged in a matrix. The numbers of the column direction wire bunches 6 and the row direction wire bunches 7, the number of the detection column wires 2 included in each column direction wire bunch 6, and the number of the detection row wires 3 included in each row direction wire bunch 7 are appropriately selected and set based on a resolution required for the touch panel with respect to a touch position (touch coordinates value) touched with an indicator such as a finger.

The column direction wire bunches 6 and the row direction wire bunches 7 are connected, through drawn wires 8 and 9, to terminals 10 provided at an end portion of the base substrate 12. Here, for convenience of illustration, each of the drawn wires 8 and 9 is illustrated as a single wire. However, it may be acceptable that one drawn wire 8 is provided for each of the detection column wires 2 included in the column direction wire bunch 6, or that one drawn wire 9 is provided for each of the detection row wires 3 included in the row direction wire bunch 7.

The touch screen 1 having the above-described configuration can increase the density of the detection column wires 2 and the detection row wires 3. Accordingly, in a detection type (generally called a self capacitance detection type) that detects an electrostatic capacitance (touch capacitance) formed between the indicator and the column direction wire bunch 6 and between the indicator and the row direction wire bunch 7, a touch capacitance to be detected is increased.

Next, configurations of the column direction wire bunch 6 and the row direction wire bunch 7 will be described in detail.

FIG. 2 is a diagram showing, on an enlarged scale, a region where the column direction wire bunch 6 having a rectangular shape crosses the row direction wire bunch 7 having a rectangular shape in a plan view. More specifically, FIG. 2 is a diagram showing, on an enlarged scale, a region around a crossing region A that is illustrated with the thick broken line in FIG. 1. In the following description, the crossing region A may be also referred to as "grid A". In the subsequent drawings, the detection column wire 2 may be illustrated with a broken line while the detection row wire 3 is illustrated with a solid line.

In the touch screen 1 according to this preferred embodiment, a plurality of (here, four) block regions C1, C2, R1, and R2 each having a quadrangular shape are specified. The block regions C1, C2, R1, and R2, which are illustrated with the thin alternate long and short dash lines in FIG. 2, are obtained as a result of dividing the crossing region A (grid A), which is illustrated with the thick alternate long and short dash line in FIG. 2. In each of the block regions C1 and C2 (first block region), only the detection column wires 2 are provided as illustrated with the thin broken lines. In each of the block regions R1 and R2 (second block region), only the detection row wires 3 are provided as illustrated with the thin solid lines.

Here, within the grid A, the block region C1 is arranged upper left (at the −x and −y side), the block region C2 is arranged lower right (at the +x and +y side), the block region R1 is arranged upper right (at the +x and −y side), and the block region R2 is arranged lower left (at the −x and +y side).

In this preferred embodiment, such block regions C1, C2, R1, and R2 are specified over the entire column direction wire bunch 6 and the entire row direction wire bunch 7. That is, the block regions C1 and C2 (first block regions) in which only the detection column wires 2 are provided and the block regions R1 and R2 (second block regions) in which only the detection row wires 3 are provided are, as a whole, alternately arranged in the column direction y and the row direction x. Thereby, a checkered pattern is formed.

In this preferred embodiment, in one grid A, one detection column wire 2 that obliquely connects between the diagonally adjacent block regions C1 and C2 and one detection row wire 3 that, in a complementary manner, obliquely connects between the diagonally adjacent block regions R1 and R2 are configured to three-dimensionally cross each other. In one grid A, the three-dimensional crossing between the detection column wire 2 and the detection row wire 3 is provided only in only in one portion (one portion where the block regions C1, C2, R1, and R2 are in contact with one another), to which a broken line circle is given in FIG. 3. This point will be described in detail below.

Figure 3:
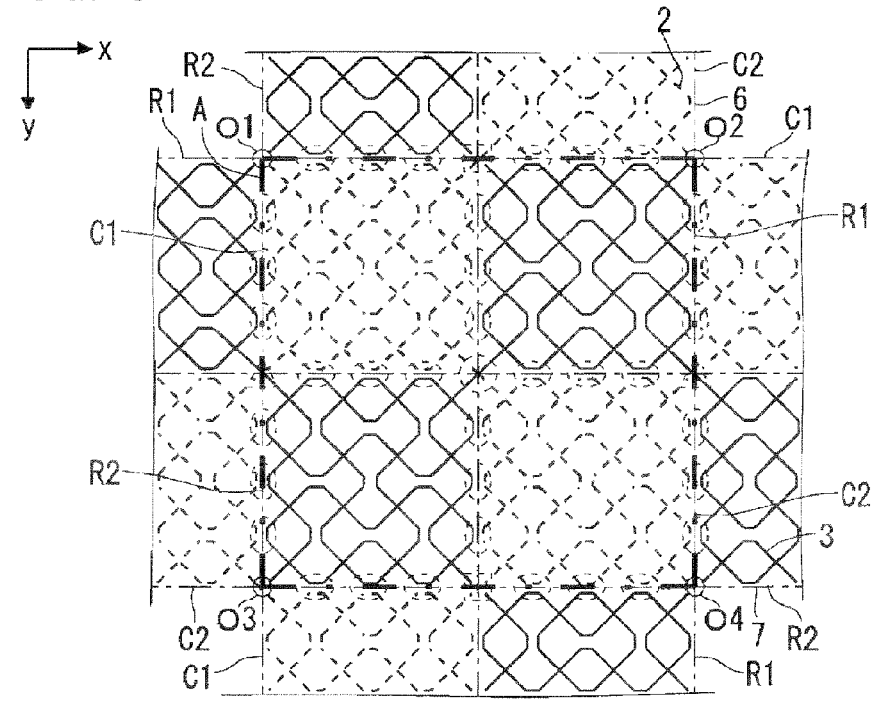

FIG. 4 is a diagram showing, on an enlarged scale, a portion to which the broken line circle is given in FIG. 3. In a case where the touch screen 1 is configured as shown in FIG. 3, an arrangement shown in a part (a) of FIG. 4 is adopted. Needless to say, however, the touch screen 1 may be configured with an arrangement shown in a part (b) of FIG. 4 (the same applies to FIGS. 5 to 7 which will be described later). As shown in FIG. 4, in the portion to which the broken line circle is given, one detection column wire 2 of the block region C1 and one detection column wire 2 of the block region C2 are coupled to each other, and one detection row wire 3 of the block region R1 and one detection row wire 3 of the block region R2 are coupled to each other.

Next, a description will be given to a portion to which a broken line triangle is given in FIG. 3, that is, to a portion where the block regions C1 and R2 of the grid A are in contact with the block regions R1 and C2 that are adjacent at the left side (−x side) to the block regions C1 and R2 of the grid A, and a portion where the block regions C2 and R1 of the grid A are in contact with the block regions R2 and C1 that are adjacent at the right side (+x side) to the block regions C2 and R1 of the grid A.

FIG. 5 is a diagram showing these portions on an enlarged scale. As shown in FIG. 5, in the portion to which the broken line triangle is given in FIG. 3, one detection row wire 3 of the block region R1 and one detection row wire 3 of the block region R2 are coupled to each other, with a coupling portion thereof being interposed between the detection column wire 2 of the block region C1 and the detection column wire 2 of the block region C2, so that the detection column wire 2 of the block region C1 and the detection column wire 2 of the block region C2 are not coupled to each other.

Next, a description will be given to a portion to which a broken line square is given in FIG. 3, that is, a portion where the block regions C1 and R1 of the grid A are in contact with the block regions R2 and C2 that are adjacent at the upper side (−y side) to the block regions C1 and R1 of the grid A, and a portion where the block regions C2 and R2 of the grid A are in contact with the block regions R1 and C1 that are adjacent at the lower side (+y side) to the block regions C2 and R2 of the grid A.

FIG. 6 is a diagram showing these portions on an enlarged scale. As shown in FIG. 6, in the portion to which the broken line square is given in FIG. 3, one detection column wire 2 of the block region C1 and one detection column wire 2 of the block region C2 are coupled to each other, with a coupling portion thereof being interposed between the detection row wire 3 of the block region R1 and the detection row wire 3 of the block region R2, so that the detection row wire 3 of the block region R1 and the detection row wire 3 of the block region R2 are not coupled to each other.

Next, a description will be given to portions O1 to O4 to which solid line circles are given in FIG. 3, that is, portions at the four corners of the grid A.

Figure 7:
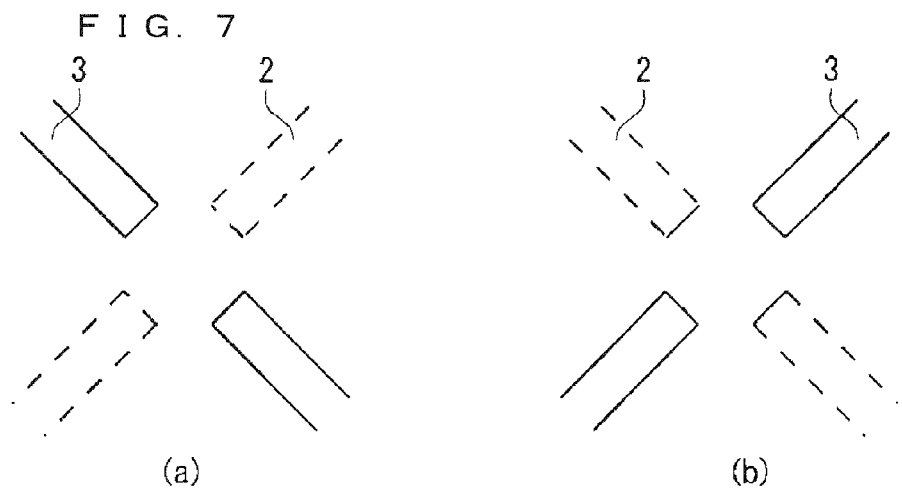

FIG. 7 is a diagram showing one of the portions on an enlarged scale. As shown in FIG. 7, in the portions O1 to O4 to which the solid line circles are given, the detection column wires 2 of the block regions C1 and C2 are spaced apart from and not coupled to each other, and the detection row wires 3 of the block regions R1 and R2 are spaced apart from and not coupled to each other.

Next, configurations of the detection column wires 2 provided in the block regions C1 and C2 will be described.

Figure 8:
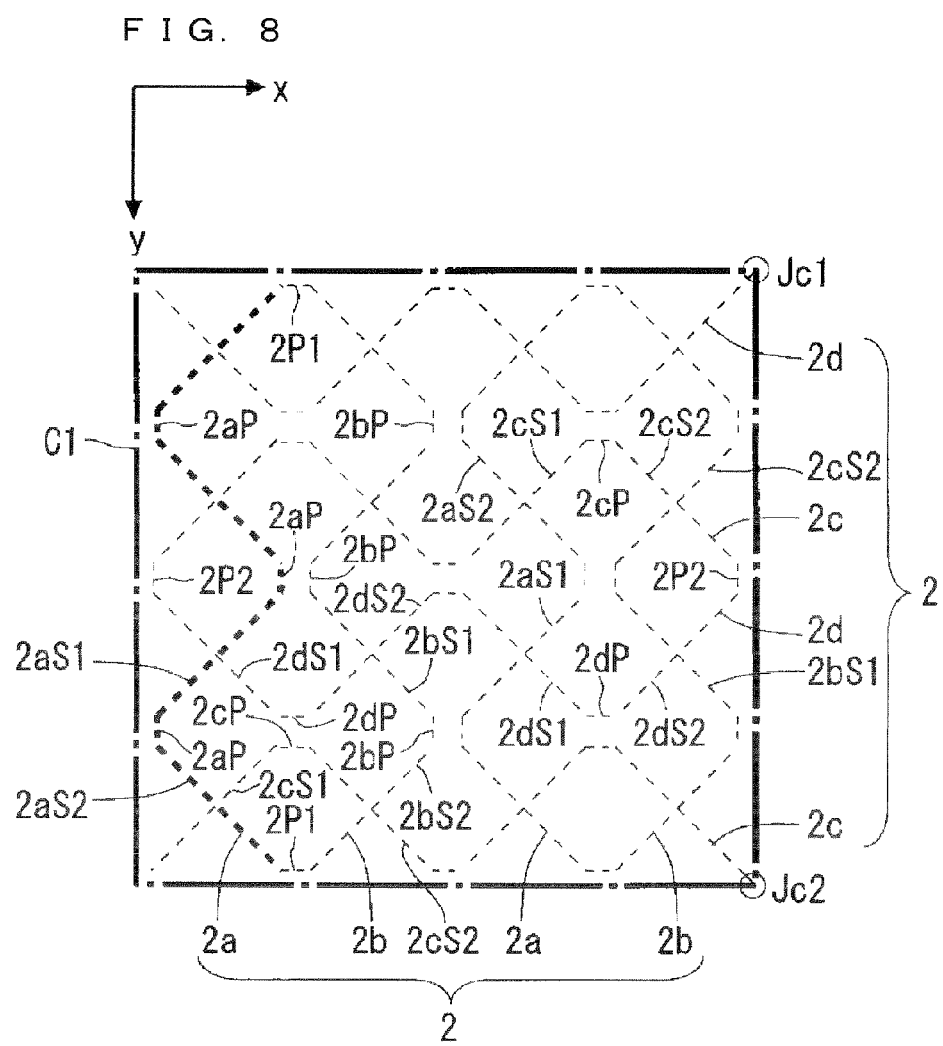
Figure 9:
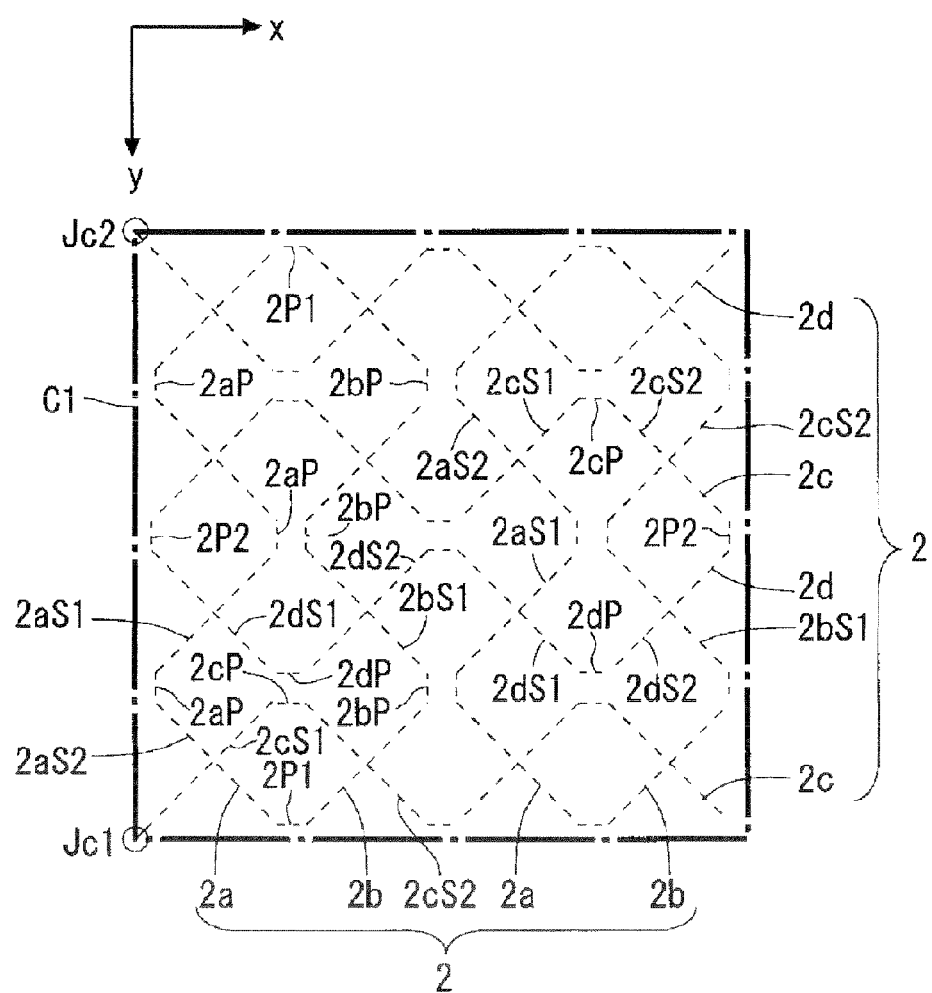

FIGS. 8 and 9 are diagrams each showing, on an enlarged scale, a configuration of the detection column wires 2 provided in each of the block regions C1 and C2. As shown in FIGS. 8 and 9, each of the detection column wires 2 provided in the block regions C1 and C2 includes inclined portions 2aS1, 2bS2, 2cS1, and 2dS2 that serve as a first inclined portion, and inclined portions 2aS2, 2bS1, 2cS2, and 2dS1 that serve as a second inclined portion.

Here, the first inclined portion (inclined portions 2aS1, 2bS2, 2cS1, and 2dS2) is a partial wire having a linear shape, and repeatedly arranged at predetermined pitches along the column direction y and the row direction x. The first inclined portion is inclined at an inclination angle of +45° (first angle) relative to the column direction y. The second inclined portion (inclined portions 2aS2, 2bS1, 2cS2, and 2dS1) is a partial wire having a linear shape, and repeatedly arranged at the above-described predetermined pitches along the column direction y and the row direction x. The second inclined portion is inclined, relative to the column direction y, reversely to the inclination direction of the first inclined portion. That is, the second inclined portion is inclined at an inclination angle of −45° relative to the column direction y.

The inclined portions 2aS1, 2aS2, 2bS1, and 2bS2 are crossing and connected to the inclined portions 2dS1, 2cS1, 2dS2, and 2cS2, respectively. Particularly, in this preferred embodiment, the inclined portions 2aS1, 2aS2, 2bS1, and 2bS2 are orthogonally connected to the inclined portions 2dS1, 2cS1, 2dS2, and 2cS2, respectively, and additionally these inclined portions cross each other at the midpoints thereof.

Next, the configuration of the detection column wires 2 provided in the block region C1 will be described in more detail with reference to FIG. 8.

The detection column wire 2 includes first zigzag wires 2a (first detection column wires) extending in the column direction y, second zigzag wires 2b (second detection column wires) extending in the column direction y, third zigzag wires 2c extending in the row direction x, and fourth zigzag wires 2d extending in the row direction x. In FIG. 8, only one first zigzag wire 2a is illustrated with the thick broken line.

The first zigzag wire 2a includes the inclined portion 2aS1 inclined at an inclination angle of +45° relative to the column direction y, the inclined portion 2aS2 inclined at an inclination angle of −45° relative to the column direction y, and a coupling portion 2aP that couples these inclined portions to each other. They are repeatedly arranged along the column direction y. The second zigzag wire 2b includes the inclined portion 2bS1 inclined at an inclination angle of −45° relative to the column direction y, the inclined portion 2bS2 inclined at an inclination angle of +45° relative to the column direction y, and a coupling portion 2bP that couples these inclined portions to each other. They are repeatedly arranged along the column direction y. The first and second zigzag wires 2a and 2b are line-symmetric to each other.

The neighboring first and second zigzag wires 2a and 2b have, at both ends thereof with respect to their extending direction, coupled to each other by coupling portions 2P1. In an example shown in FIG. 8, two first zigzag wires 2a and two second zigzag wires 2b are provided in one block region C1.

The third zigzag wire 2c includes the inclined portion 2cS1 inclined at an inclination angle of +45° relative to the row direction x, the inclined portion 2cS2 inclined at an inclination angle of −45° relative to the row direction x, and a coupling portion 2cP that couples these inclined portions to each other. They are repeated arranged along the row direction x. The fourth zigzag wire 2d includes the inclined portion 2dS1 inclined at an inclination angle of −45° relative to the row direction x, the inclined portion 2dS2 inclined at an inclination angle of +45° relative to the row direction x, and a coupling portion 2dP that couples these inclined portions to each other. They are repeatedly arranged along the row direction x. The third and fourth zigzag wires 2c and 2d are line-symmetric to each other.

In the example shown in FIG. 8, two third zigzag wires 2c and two fourth zigzag wires 2d are provided in one block region C1. Among them, except one third zigzag wire 2c located at the upper end (−y side end) of the block region C1 and one fourth zigzag wire 2d located at the lower end (+y side end) of the block region C1, the neighboring third and fourth zigzag wires 2c and 2d have, at both ends thereof with respect to their extending direction, coupled to each other by coupling portions 2P2. On the other hand, each of the third and fourth zigzag wires 2c and 2d located at the lower end (+y side end) and at the upper end (−y side end) is, at one end (here, the +x side end) thereof with respect to their extending direction, extending to each of vertices Jc2 and Jc1 of the block region C1. At these vertices Jc2 and Jc1, the detection column wires 2 of the block region C1 are coupled and electrically connected to the detection column wires 2 of the block regions C2 located lower right (at the +x and +y side) and upper right (at the +x and −y side).

Next, the configuration of the detection column wires 2 provided in the block region C2 will be described with reference to FIG. 9. The detection column wires 2 of the block region C2 are configured similarly to the detection column wires 2 of the block region C1 described above. However, in the block region C2, each of the third and fourth zigzag wires 2c and 2d located at the lower end (+y side end) and at the upper end (−y side end) is, at the other end (here, the −x side end) thereof with respect to their extending direction, extending to each of vertices Jc1 and Jc2 of the block region C2. At these vertices Jc1 and Jc2, the detection column wires 2 of the block region C2 are coupled and electrically connected to the detection column wires 2 of the block regions C1 located lower left (at the −x and +y side) and upper left (at the −x and −y side).

Next, configurations of the detection row wires 3 provided in the block regions R1 and R2 will be described. The configurations of the detection row wires 3 which will be described below are basically the same as the configurations of the detection column wires 2 described above.

Figure 11:
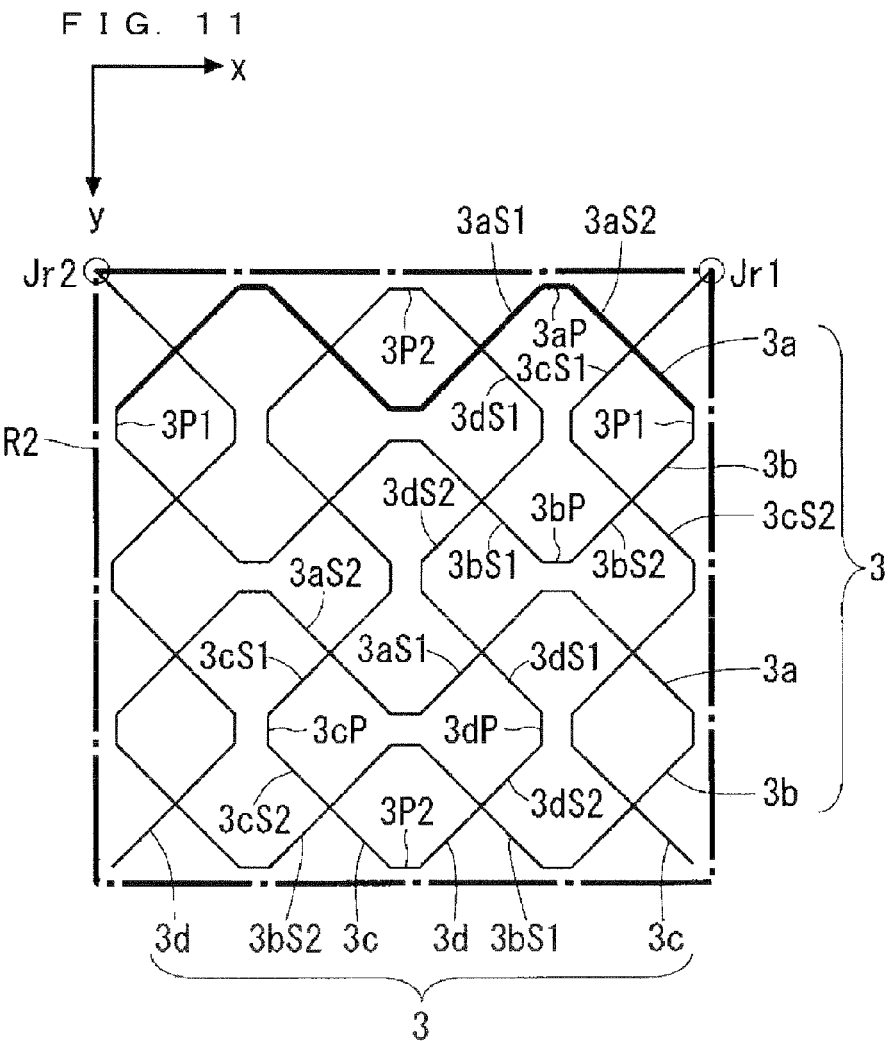

FIGS. 10 and 11 are diagrams each showing, on an enlarged scale, a configuration of the detection row wires 3 provided in each of the block regions R1 and R2. As shown in FIGS. 10 and 11, each of the detection row wires 3 provided in the block regions R1 and R2 includes inclined portions 3aS1, 3bS2, 3cS1, and 3dS2 that serve as a third inclined portion, and inclined portions 3aS2, 3bS1, 3cS2, and 3dS1 that serve as a fourth inclined portion.

Here, the third inclined portion (inclined portions 3aS1, 3bS2, 3cS1, and 3dS2) is a partial wire having a linear shape, and repeatedly arranged at the above-described predetermined pitches along the column direction y and the row direction x. The third inclined portion is inclined at an inclination angle of +45° (second angle) relative to the row direction x. The fourth inclined portion (inclined portions 3aS2, 3bS1, 3cS2, and 3dS1) is a partial wire having a linear shape, and repeatedly arranged at the above-described predetermined pitches along the column direction y and the row direction x. The fourth inclined portion is inclined, relative to the row direction x, reversely to the inclination direction of the third inclined portion. That is, the fourth inclined portion is inclined at an inclination angle of −45° relative to the row direction x.

The inclined portions 3aS1, 3aS2, 3bS1, and 3bS2 are crossing and connected to the inclined portions 3dS1, 3cS1, 3dS2, and 3cS2, respectively. Particularly, in this preferred embodiment, the inclined portions 3aS1, 3aS2, 3bS1, and 3bS2 are orthogonally connected to the inclined portions 3dS1, 3cS1, 3dS2, and 3cS2, respectively, and additionally these inclined portions cross each other at the midpoints thereof.

Next, the configuration of the detection row wires 3 provided in the block region R1 will be described in more detail with reference to FIG. 10.

The detection row wire 3 includes fifth zigzag wires 3a (first detection row wires) extending in the row direction x, sixth zigzag wires 3b (second detection row wires) extending in the row direction x, seventh zigzag wires 3c extending in the column direction y, and eighth zigzag wires 3d extending in the column direction y. In FIG. 10, only one fifth zigzag wire 3a is illustrated with the thick solid line.

The fifth zigzag wire 3a includes the inclined portion 3aS1 inclined at an inclination angle of +45° relative to the row direction x, the inclined portion 3aS2 inclined at an inclination angle of −45° relative to the row direction x, and a coupling portion 3aP that couples these inclined portions to each other. They are repeatedly arranged along the row direction x. The sixth zigzag wire 3b includes the inclined portion 3bS1 inclined at an inclination angle of −45° relative to the row direction x, the inclined portion 3bS2 inclined at an inclination angle of +45° relative to the row direction x, and a coupling portion 3bP that couples these inclined portions to each other. They are repeatedly arranged along the row direction x. The fifth and sixth zigzag wires 3a and 3b are line-symmetric to each other.

The neighboring fifth and sixth zigzag wires 3a and 3b have, at both ends thereof with respect to their extending direction, coupled to each other by coupling portions 3P1. In an example shown in FIG. 10, two fifth zigzag wires 3a and two sixth zigzag wires 3b are provided in one block region R1.

The seventh zigzag wire 3c includes the inclined portion 3cS1 inclined at an inclination angle of +45° relative to the column direction y, the inclined portion 3cS2 inclined at an inclination angle of −45° relative to the column direction y, and a coupling portion 3cP that couples these inclined portions to each other. They are repeatedly arranged along the column direction y. The eighth zigzag wire 3d includes the inclined portion 3dS1 inclined at an inclination angle of −45° relative to the column direction y, the inclined portion 3dS2 inclined at an inclination angle of +45° relative to the column direction y, and a coupling portion 3dP that couples these inclined portions to each other. They are repeatedly arranged along the column direction y. The seventh and eighth zigzag wires 3c and 3d are line-symmetric to each other.

In the example shown in FIG. 10, two seventh zigzag wires 3c and two eighth zigzag wires 3d are provided in one block region R1. Among them, except one seventh zigzag wire 3c located at the right end (+x side end) of the block region R1 and one eighth zigzag wire 3d located at the left end (−x side end) of the block region R1, the neighboring seventh and eighth zigzag wires 3c and 3d have, at both ends thereof with respect to their extending direction, coupled to each other by coupling portions 3P2. On the other hand, each of the seventh and eighth zigzag wires 3c and 3d located at the right end (+x side end) and at the left end (−x side end) is, at one end (here, the +y side end) thereof with respect to their extending direction, extending to each of vertices Jr2 and Jr1 of the block region R1. At these vertices Jr2 and Jr1, the detection row wires 3 of the block region R1 are coupled and electrically connected to the detection row wires 3 of the block regions R2 located lower right (at the +x and +y side) and lower left (at the −x and +y side).

Next, the configuration of the detection row wires 3 provided in the block region R2 will be described with reference to FIG. 11. The detection row wires 3 of the block region R2 are configured similarly to the detection row wires 3 of the block region R1 described above. However, in the block region R2, each of the seventh and eighth zigzag wires 3c and 3d located at the right end (+x side end) and at the left end (−x side end) is, at the other end (here, the −y side end) thereof with respect to their extending direction, extending to each of vertices Jr1 and Jr2 of the block region R2. At these vertices Jr1 and Jr2, the detection row wires 3 of the block region R2 are coupled and electrically connected to the detection row wires 3 of the block regions R1 located upper right (at the +x and −y side) and upper left (at the −x and −y side).

The touch screen 1 according to this preferred embodiment configured as described above makes it possible to reduce an inter-wire capacitance between the column direction wire bunch 6 and the row direction wire bunch 7. This point will be described below.

An inter-wire capacitance between the column direction wire bunch 6 and the row direction wire bunch 7 is composed of: (1) a coupling capacitance occurring near a crossing portion (the portion to which a broken line circle is given in FIG. 3) between the detection column wire 2 and the detection row wire 3; and (2) a coupling capacitance occurring near a parallel-extending portion (a portion to which a broken line ellipse is given in FIG. 3) of the coupling portion between the detection column wire 2 and the detection row wire 3. Accordingly, reduction in the coupling capacitances of (1) and (2) results in reduction in the inter-wire capacitance between the column direction wire bunch 6 and the row direction wire bunch 7.

To reduce the coupling capacitance of (1), it is effective to reduce the number of the crossing portions. In order to reduce this coupling capacitance, it is also conceivable to increase the thickness of the inter-layer insulating film 13. However, tests conducted by the inventors using TEG (Test Element Group) have revealed that such a configuration hardly reduces the inter-wire capacitance between the column direction wire bunch 6 and the row direction wire bunch 7. On the other hand, to reduce the coupling capacitance of (2), it is effective to ensure a large interval (space) between the coupling portions in the parallel-extending portion.

Figure 52:
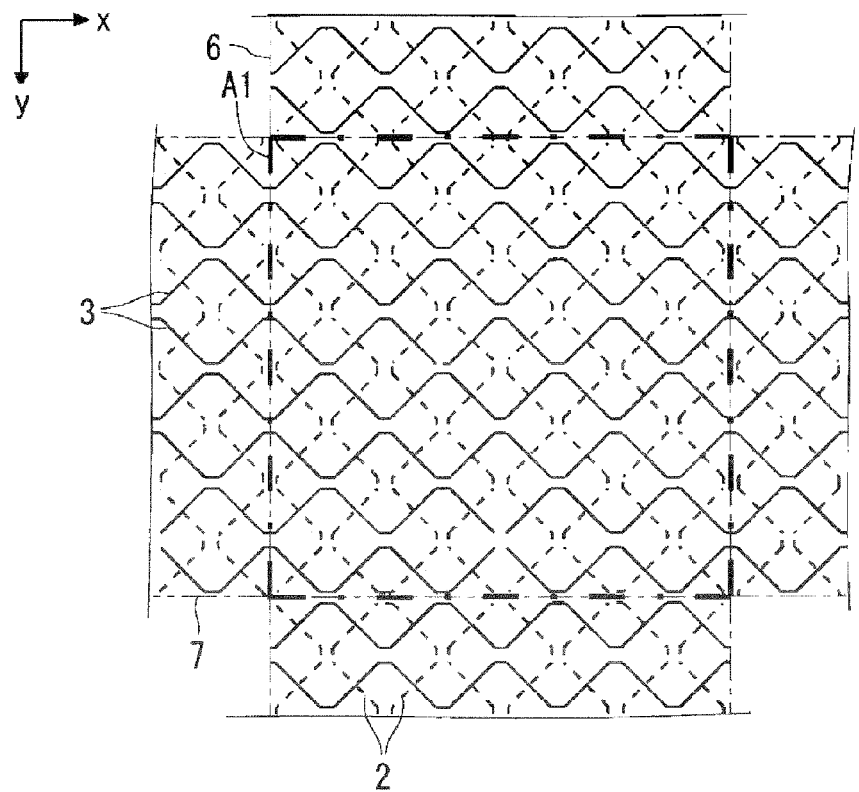
FIGS. 52 and 53 are plan views each showing, on an enlarged scale, a configuration of a comparative touch screen.

FIG. 52 shows a configuration of a touch screen (hereinafter referred to as "comparative touch screen") disclosed in Japanese Patent Application Laid-Open No. 2010-61502, for the comparison against this preferred embodiment. FIG. 52 is a diagram showing, on an enlarged scale, a portion (grid A1) of the comparative touch screen corresponding to the grid A described above. In the comparative touch screen, the pitches (corresponding to the above-described predetermined pitches of the inclined portions) at which a zigzag pattern of the detection column wire 2 and the detection row wire 3 is repeated in the grid A1 is ¼ of one side of the grid A1 having a square shape. These pitches are equivalent to the pitches of the detection column wire 2 and the detection row wire 3 in the grid A according to this preferred embodiment shown in FIG. 2.

Figure 53:
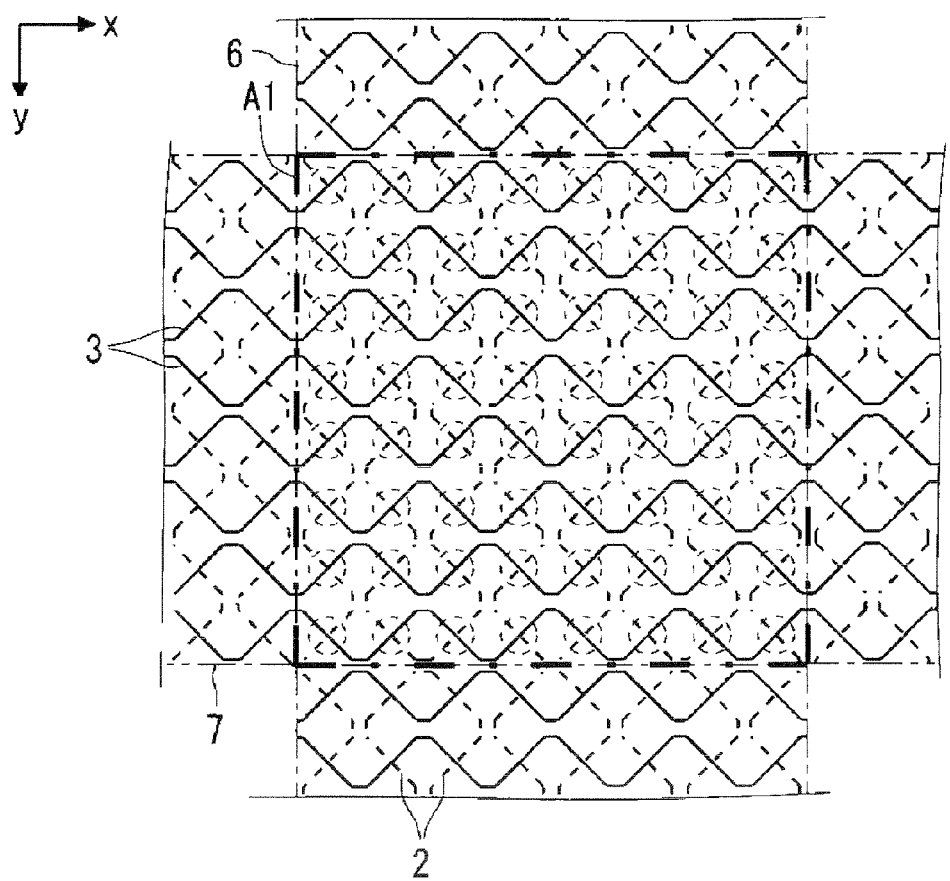

As shown in FIG. 53, in the comparative touch screen, the number of the crossing portions between the detection column wires 2 and the detection row wires 3 in the grid A1, that is, the number of portions to which broken line circles are given, is 64 (=8×8). On the other hand, as shown in FIG. 3, in the touch screen 1 according to this preferred embodiment, the number of the crossing portions in the grid A described above is only one. Accordingly, the touch screen 1 according to this preferred embodiment can reduce the number of the crossing portions between the detection column wires 2 and the detection row wires 3, as compared with the comparative touch screen. Thus, the coupling capacitance in the total crossing portions, and in other words, the coupling capacitance of (1) mentioned above, can be reduced.

As shown in FIG. 53, in the comparative touch screen, the number of the parallel-extending portions of the coupling portions in the grid A1 is zero. On the other hand, as shown in FIG. 3, in the touch screen 1 according to this preferred embodiment, the number of the parallel-extending portions of the coupling portions, to which the broken line ellipses are given, in the grid A, is twenty-four (here, the ellipse given to a parallel-extending portion existing at the boundary with the adjacent grid is counted as ½, and the same applies to the preferred embodiment 2, too). In the touch screen 1 according to this preferred embodiment, the number of the parallel-extending portions is greater than in the comparative touch screen. Therefore, the coupling capacitance in the total parallel-extending portions, that is, the coupling capacitance of (2) mentioned above, is somewhat increased.

However, as described above, increasing the interval between the coupling portions in the parallel-extending portions can reduce the coupling capacitance occurring in the parallel-extending portion. For example, TEG tests conducted by the inventors have revealed that increasing the interval between the detection column wire 2 and the detection row wire 3 from 10 μm to 130 μm can reduce, by about 40%, the coupling capacitance (inter-wire capacitance) between the detection column wire 2 and the detection row wire 3 in the parallel-extending portion.

From the above, in the touch screen 1 according to this preferred embodiment can reduce the coupling capacitance in the crossing portion while suppressing an increase in the coupling capacitance in the parallel-extending portion. As a result, the inter-wire capacitance between the column direction wire bunch 6 and the row direction wire bunch 7 can be reduced.

Figure 12:
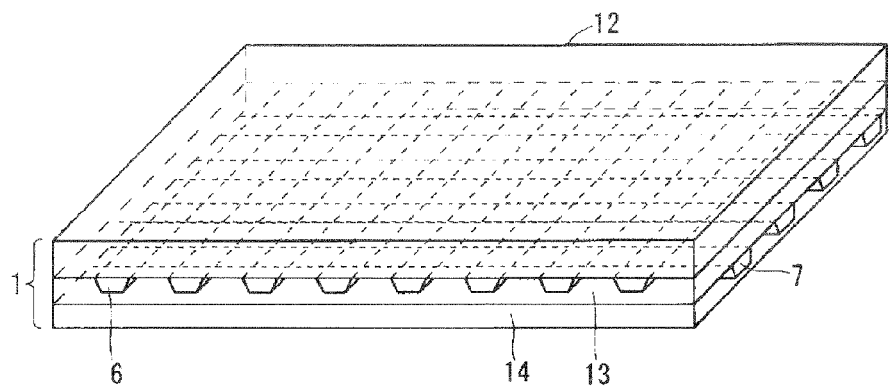
FIGS. 12 and 13 are perspective views each showing the configuration of the touch screen according to the preferred embodiment 1.

FIG. 12 is a perspective view schematically showing an example of a layered structure of the touch screen 1 according to this preferred embodiment. In FIG. 12, illustration of the drawn wires 8 and 9 and the terminals 10, which are shown in FIG. 1, is omitted. Next, the layered structure of the touch screen 1 will be described with reference to FIG. 12.

As shown in FIG. 12, an upper surface layer of the touch screen 1 is the above-described base substrate 12. On the base substrate 12 (in FIG. 12, on a lower surface of the base substrate 12), a plurality of column direction wire bunches 6 made of a metal wire material having an opacity and a high conductivity, such as aluminum, are formed. In FIG. 12, for the sake of convenience, each of the column direction wire bunches 6 is not illustrated in the above-described zigzag pattern, but illustrated as a straight line.

On the base substrate 12 (in FIG. 12, on the lower surface of the base substrate 12), a transparent inter-layer insulating film 13 such as a silicon nitride film or a silicon oxide film is formed so as to cover all the column direction wire bunches 6. On the inter-layer insulating film 13 (in FIG. 12, on a lower surface of the inter-layer insulating film 13), a plurality of row direction wire bunches 7 made of a metal wire material having an opacity and a high conductivity, such as aluminum, are formed. In FIG. 12, for the sake of convenience, each of the row direction wire bunches 7 is also not illustrated in the above-described zigzag pattern, but illustrated as a straight line. On the inter-layer insulating film 13 (in FIG. 12, on the lower surface of the inter-layer insulating film 13), a protection film 14 for protecting the row direction wire bunches 7 is formed.

In the configuration described herein, the column direction wire bunches 6, the inter-layer insulating film 13, and the row direction wire bunches 7 are formed in this order on the base substrate 12. In another possible configuration, however, the arrangement of the wires may be inverted, that is, the row direction wire bunches 7, the inter-layer insulating film 13, and the column direction wire bunches 6 may be formed in this order on the base substrate 12.

Figure 13:
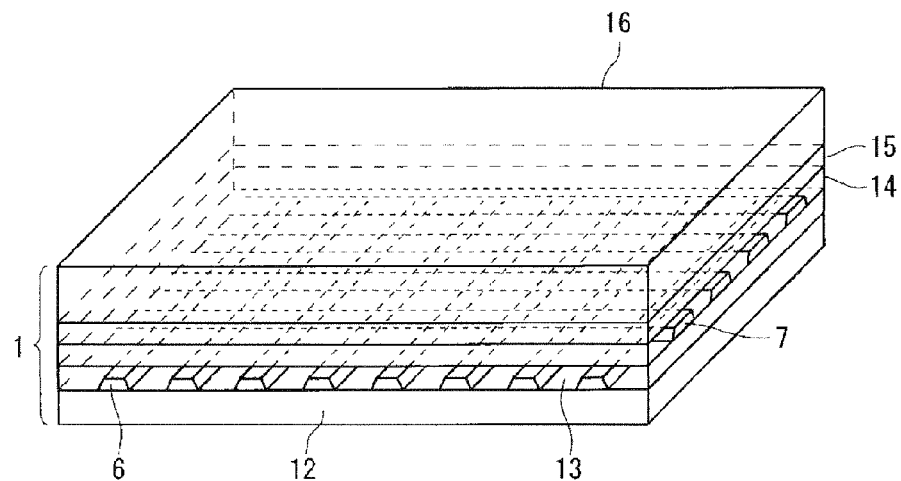

FIG. 13 is a perspective view schematically showing an example of a layered structure different from that of the touch screen 1 shown in FIG. 12. As compared with the touch screen 1 shown in FIG. 12, the touch screen 1 in FIG. 13 is upside down. Here, a protection glass 16 is adhesively fixed to the protection film 14 with an adhesive layer 15 interposed therebetween. Setting the thickness of the protection glass 16 to be about several mm can improve the strength of the touch screen 1. Thus, the touch screen 1 having excellent robustness is obtained.

Figure 14:
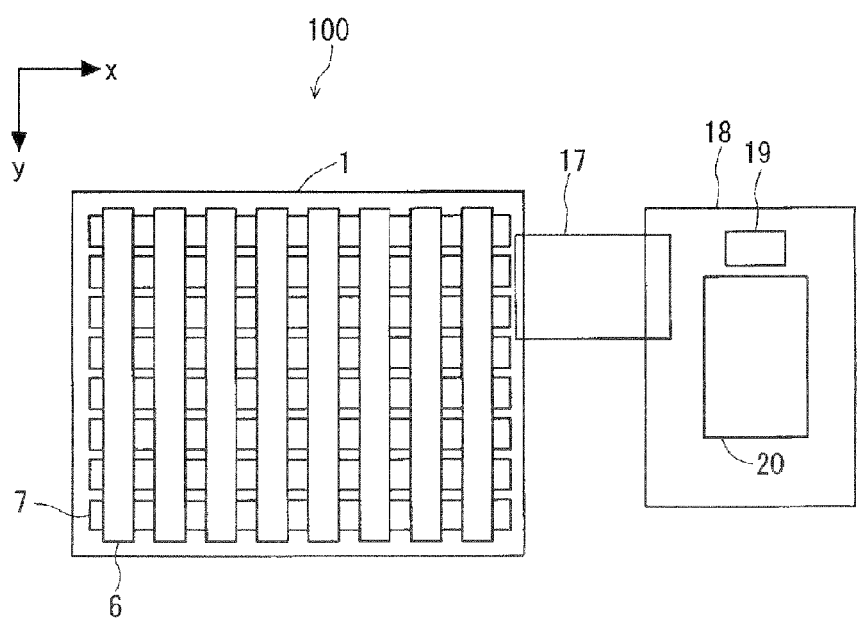
FIG. 14 is a diagram showing a configuration of a touch panel according to the preferred embodiment 1.

FIG. 14 is a diagram schematically showing an overall configuration of a touch panel 100 including the touch screen 1 according to this preferred embodiment. The touch panel 100 includes, in addition to the above-described touch screen 1, an FPC (Flexible Printed Circuit) 17, a controller substrate 18, a switch circuit 19, and a detection processing circuit 20. The switch circuit 19 and the detection processing circuit 20 are mounted on the controller substrate 18.

Each terminal of the FPC 17 is mounted to the corresponding terminal 10 of the touch screen 1 by means of, for example, an ACF (Anisotropic Conductive Film) (not shown). Through the FPC 17, a detection wire group (the column direction wire bunches 6 and the row direction wire bunches 7) of the touch screen 1 is electrically connected to circuits mounted on the controller substrate 18, such as the switch circuit 19 and the detection processing circuit 20. Thereby, the touch screen 1 functions as a main component part of the touch panel 100.

The switch circuit 19 sequentially selects each of the plurality of column direction wire bunches 6 and each of the plurality of row direction wire bunches 7. The detection processing circuit 20 detects touch coordinates on the touch screen 1 indicating a touch position on the touch screen 1 touched with the indicator.

Here, a method for detecting the indicator's touch coordinates, a self capacitance detection type and a mutual capacitance detection type may be mentioned.

In the self capacitance detection type, when the indicator touches a surface of the transparent base substrate 12 of the touch screen 1 (in a case where the layered structure shown in FIG. 12 is adopted) or when the indicator touches a surface of the protection glass 16 of the touch screen 1 (in a case where the layered structure shown in FIG. 13 is adopted), a touch capacitance formed between each detection column wire 2 and the indicator and a touch capacitance formed between each detection row wire 3 and the indicator are detected. Thereby, the touch coordinates are detected.

Accordingly, to achieve detection by the self capacitance detection type, the detection processing circuit 20 is implemented as a circuit that is able to perform a calculation process for calculating the indicator's touch coordinates based on a result of detection of an electrostatic capacitance formed between the indicator and the column direction wire bunch 6 selected by the switch circuit 19 and an electrostatic capacitance formed between the indicator and the row direction wire bunch 7 selected by the switch circuit 19. Then, the touch coordinates value calculated by the detection processing circuit 20 is outputted, as detected coordinates data, to an external device (such as a computer) (not shown).

On the other hand, in the mutual capacitance detection type, a change in a mutual capacitance between the detection column wire 2 and the detection row wire 3, which occurs at the touch position when the indicator touches the surface of the transparent base substrate 12 of the touch screen 1 (in a case where the layered structure shown in FIG. 12 is adopted) or when the indicator touches the surface of the protection glass 16 of the touch screen 1 (in a case where the layered structure shown in FIG. 13 is adopted), is detected. Thereby, the touch coordinates are detected.

Accordingly, to achieve detection by the mutual capacitance detection type, the detection processing circuit 20 is implemented as a circuit that is able to perform the calculation process for calculating the indicator's touch coordinates based on a result of detection of a change in the mutual capacitance between the column direction wire bunch 6 and the row direction wire bunch 7 selected by the switch circuit 19, which occurs in accordance with the touch to the touch screen 1 with the indicator. Then, the touch coordinates value calculated by the detection processing circuit 20 is outputted, as detected coordinates data, to an external device (such as a computer) (not shown).

In the touch screen 1 and the touch panel 100 according to this preferred embodiment configured described above, only the detection column wires 2 or only the detection row wires 3 are provided in each of the block regions C1, C2, R1, and R2. The block regions C1 and C2 (first block regions) in which only the detection column wires 2 are provided and the block regions R1 and R2 (second block regions) in which only the detection row wires 3 are provided are alternately arranged in the column direction y and the row direction x. This can reduce the number of the crossing portions between the detection column wires 2 and the detection row wires 3. Thus, the inter-wire capacitance between the column direction wire bunch 6 and the row direction wire bunch 7 is reduced.

In this preferred embodiment, one detection column wire 2 that obliquely connects between the diagonally adjacent first block regions (for example, the block regions C1 and C2) and one detection row wire 3 that, in a complementary manner, obliquely connects between the diagonally adjacent second block regions (for example, the block regions R1 and R2) are three-dimensionally cross each other. Thus, as compared with the comparative touch screen, the inter-wire capacitance between the column direction wire bunch 6 and the row direction wire bunch 7 is reduced.

Particularly, in this preferred embodiment, in the crossing region A (grid A), the three-dimensional crossing between the detection column wire 2 and the detection row wire 3 is provided only in one portion. Accordingly, the inter-wire capacitance between the column direction wire bunch 6 and the row direction wire bunch 7 can be appropriately reduced.

In this preferred embodiment, even in a case where the so-called mutual capacitance detection type is used in which the touch coordinates are detected based on a change (mutual capacitance change) in an electric field between the column direction wire bunch 6 and the row direction wire bunch 7 which occurs in accordance with a touch with the indicator, the inter-wire capacitance (electric field coupling) can be reduced in the same manner as described above. Therefore, the touch screen 1 having a high sensitivity is achieved.

In this preferred embodiment, even in a case of adopting the configuration disclosed in National Publication of Translation No. 11-505641 (1999), that is, even in a case of adopting a capacitance measurement circuit configured such that a voltage obtained as a result of capacitance-dividing a driving voltage by a mutual capacitance (capacitance between row and column wires in the crossing portion) and a known reference capacitance is applied to an input of a differential amplifier, the capacitance between row and column wires relative to the reference capacitance is reduced in the same manner as described above. This can suppress the capacitance-divided voltage, and therefore the detection can be performed with an effective use of a dynamic range of the circuit. Additionally, the reference capacitance that is in accordance with the inter-wire capacitance between the column direction wire bunch 6 and the row direction wire bunch 7 can be suppressed. This can suppress a wire resistance of the detection column wire 2 and the detection row wire 3, and a combined capacitance of the capacitance between the row and column and the reference capacitance. As a result, a time for setting a detection output voltage involved in charging/discharging can be shortened. That is, a time for detection can be shortened. Thus, the response of the touch panel 100 is improved.

In this preferred embodiment, the detection column wire 2 provided in each of the block regions C1 and C2 includes the first inclined portion (for example, the inclined portions 2$a$S1, 2$b$S2, 2$c$S1, and 2$d$S2) and the second inclined portion (for example, the inclined portions 2$a$S2, 2$b$S1, 2$c$S2, and 2$d$S1) that are arranged at the predetermined pitches along the column direction y and the row direction x. The detection row wire 3 provided in each of the block regions R1 and R2 includes the third inclined portion (for example, the inclined portions 3$a$S1, 3$b$S2, 3$c$S1, and 3$d$S2) and the fourth inclined portion (for example, the inclined portions 3$a$S2, 3$b$S1, 3$c$S2, and 3$d$S1) that are arranged at the predetermined pitches along the column direction y and the row direction x. Accordingly, the arrangement of the detection column wires 2 and the arrangement of the detection row wires 3 can be uniformized.

When such a touch screen 1 according to this preferred embodiment is mounted on a display panel such as a liquid crystal display panel, a part of each pixel of the display panel is uniformly covered with the detection column wires 2 and the detection row wires 3. As a result, even in a case where the detection column wires 2 and the detection row wires 3 are made of an opaque material having a high conductivity, it is possible to uniformize the transmittance at a time when a display light emitted from the entire display panel passes through the touch screen 1. Thus, occurrence of a moire pattern is suppressed.

In this preferred embodiment, the first inclined portion and the second inclined portion are orthogonal to each other, and the third inclined portion and the fourth inclined portion are orthogonal to each other. The inclination angle thereof is ±45°. Accordingly, the arrangement of the detection column wires 2 and the arrangement of the detection row wires 3 are uniformized. As a result, the transmittance of the touch screen 1 is further uniformized. Thus, occurrence of a moire pattern is further suppressed.

In this preferred embodiment, the first inclined portion and the second inclined portion cross each other at their midpoints, and the third inclined portion and the fourth inclined portion cross each other at their midpoints. Accordingly, the arrangement of the detection column wires 2 and the arrangement of the detection row wires 3 are further uniformized. As a result, the transmittance of the touch screen 1 is further uniformized. Thus, occurrence of a moire pattern is further suppressed.

<Preferred Embodiment 2>

A preferred embodiment 2 of the present invention is different from the preferred embodiment 1, in terms of the shapes of the detection column wires 2 and the detection row wires 3 provided in the block regions C1, C2, R1, and R2.

Figure 15:
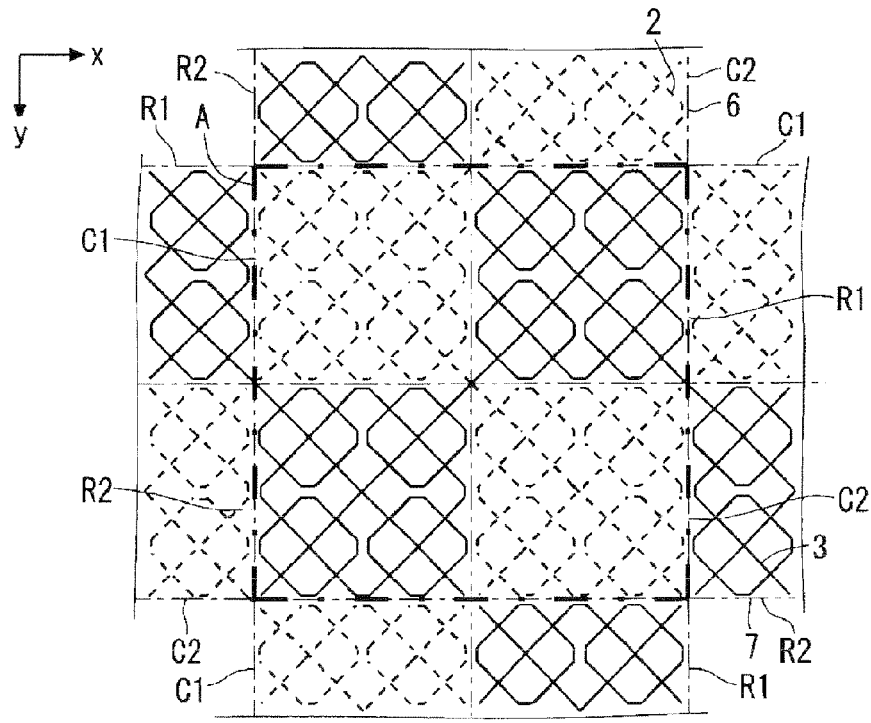

FIG. 15 is a diagram showing, on an enlarged scale, a region around the grid A in this preferred embodiment. Similarly to the preferred embodiment 1, a plurality of (here, four) block regions C1, C2, R1, and R2 each having a quadrangular shape are specified. The block regions C1, C2, R1, and R2 are obtained as a result of dividing the grid A. In each of the block regions C1 and C2 (first block region), only the detection column wires 2 are provided. In each of the block regions R1 and R2 (second block region), only the detection row wires 3 are provided. The block regions C1 and C2 in which the detection column wires 2 are provided and the block regions R1 and R2 in which the detection row wires 3 are provided are, as a whole, alternately arranged in the column direction y and the row direction x. Thereby, a checkered pattern is formed.

Figure 16:
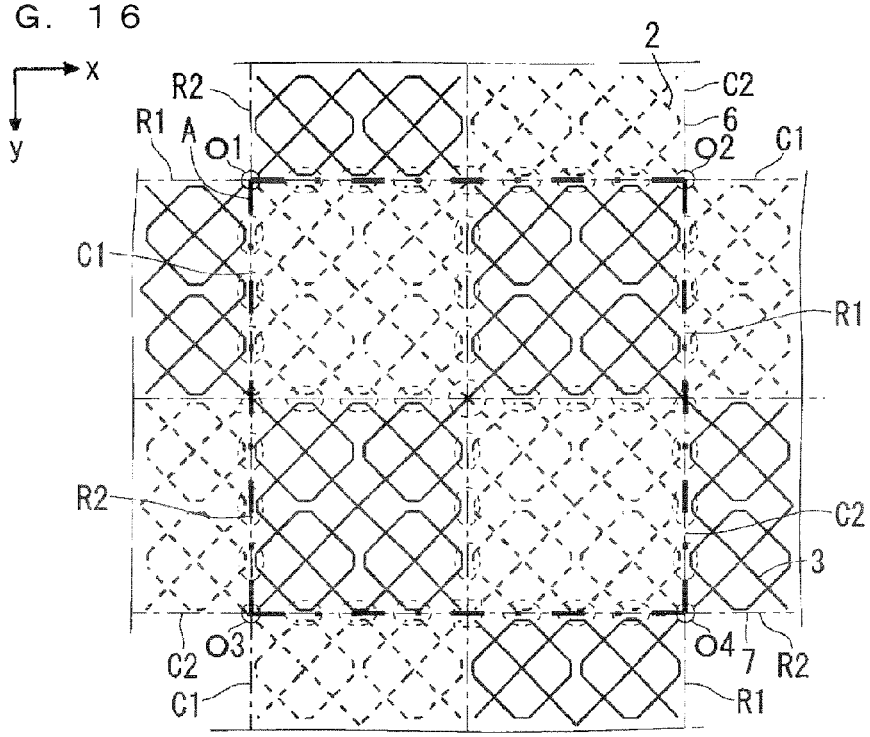

Similarly to the preferred embodiment 1, in one grid A, the three-dimensional crossing between the detection column wire 2 and the detection row wire 3 is provided only in one portion (one portion where the block regions C1, C2, R1, and R2 are in contact with one another), to which a broken line circle is given in FIG. 16. That is, in the portion to which the broken line circle is given in FIG. 16, one detection column wire 2 of the block region C1 and one detection column wire 2 of the block region C2 are coupled to each other, and one detection row wire 3 of the block region R1 and one detection row wire 3 of the block region R2 are coupled to each other.

In a portion to which a broken line triangle is given in FIG. 16, one detection row wire 3 of the block region R1 and one detection row wire 3 of the block region R2 are coupled to each other, with a coupling portion thereof being interposed between the detection column wire 2 of the block region C1 and the detection column wire 2 of the block region C2, so that the detection column wire 2 of the block region C1 and the detection column wire 2 of the block region C2 are not coupled to each other. In FIG. 16, in a portion to which a broken line square is given, one detection column wire 2 of the block region C1 and one detection column wire 2 of the block region C2 are coupled to each other, with a coupling portion thereof being interposed between the detection row wire 3 of the block region R1 and the detection row wire 3 of the block region R2, so that the detection row wire 3 of the block region R1 and the detection row wire 3 of the block region R2 are not coupled to each other. In FIG. 16, in four portions O1 to O4 to which solid line circles are given, the detection column wires 2 of the block regions C1 and C2 are spaced apart from and not coupled to each other, and additionally the detection row wires 3 of the block regions R1 and R2 are spaced apart from and not coupled to each other.

Figure 17:
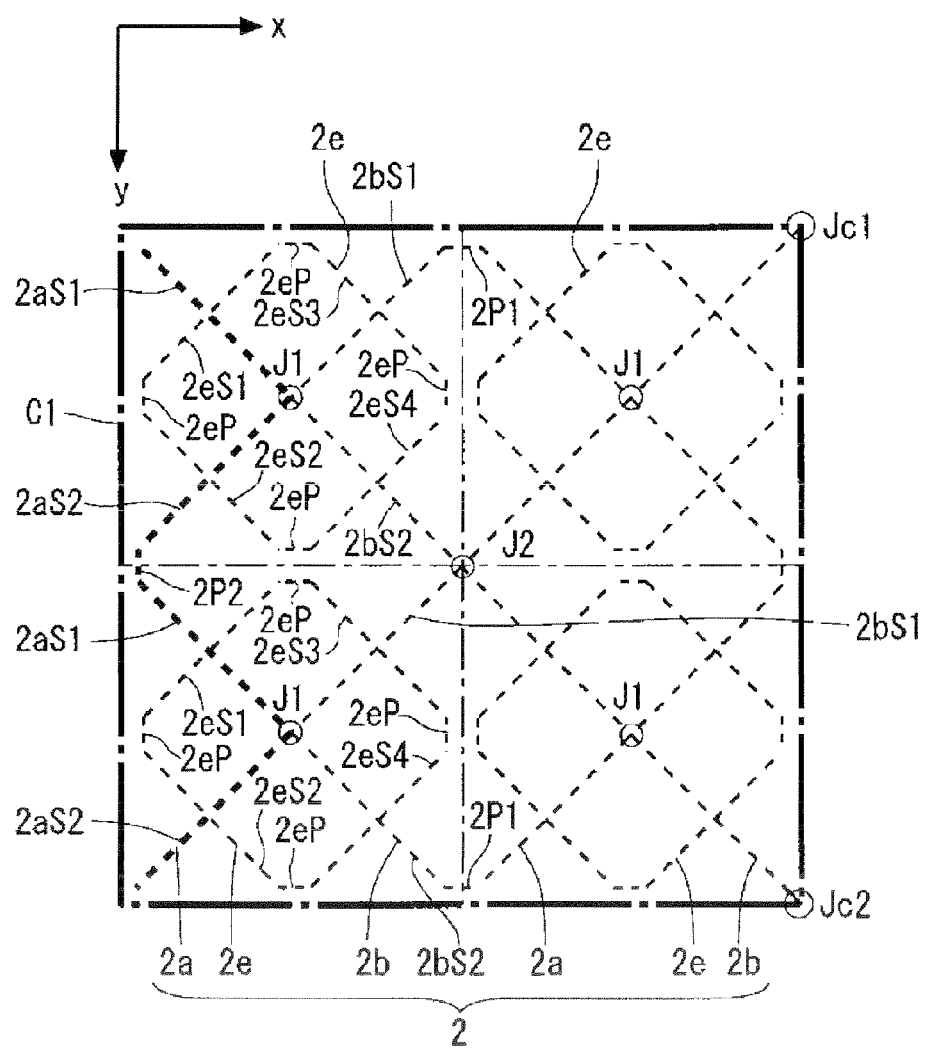
Figure 18:
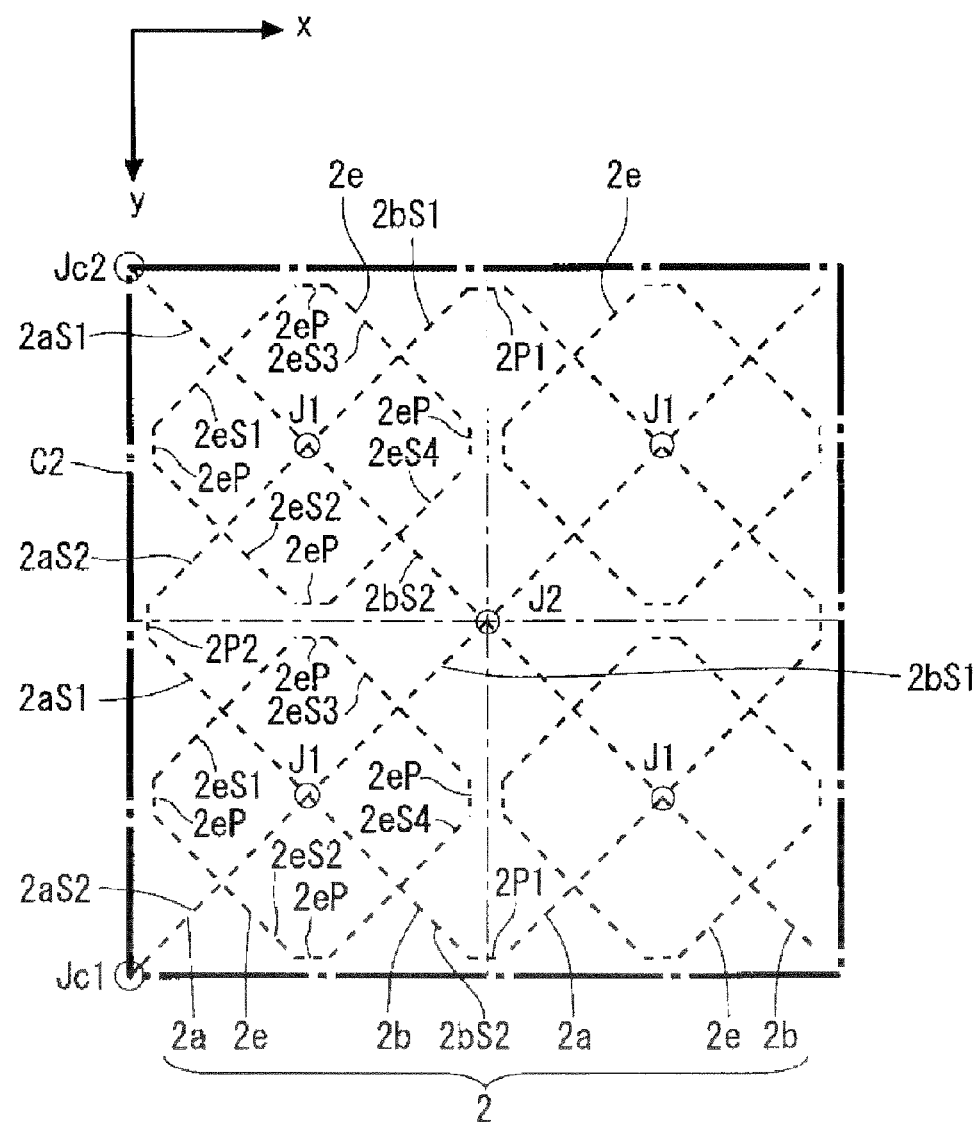

FIGS. 17 and 18 are diagrams each showing, on an enlarged scale, a configuration of the detection column wires 2 provided in each of the block regions C1 and C2. As shown in FIGS. 17 and 18, each of the detection column wires 2 provided in the block regions C1 and C2 includes inclined portions 2aS1 and 2bS2 that serve as the first inclined portion, and inclined portions 2aS2 and 2bS1 that serve as the second inclined portion.

Here, the first inclined portion (inclined portions 2aS1 and 2bS2) is a partial wire having a linear shape, and repeatedly arranged at predetermined pitches along the column direction y and the row direction x. One end of the first inclined portion is connected to a coupling point J1. The first inclined portion is inclined at an inclination angle of +45° (first angle) relative to the column direction y. In this preferred embodiment, the positive direction of the inclination angle relative to the column direction y on the drawings is reverse to the positive direction of the inclination angle relative to the column direction y on the drawings in the preferred embodiment 1.

The second inclined portion (inclined portions 2aS2 and 2bS1) is a partial wire having a linear shape, and repeatedly arranged at the above-described predetermined pitches along the column direction y and the row direction x. One end of the second inclined portion is connected to the coupling point J1. The second inclined portion is inclined, relative to the column direction y, reversely to the inclination direction of the first inclined portion. That is, the second inclined portion is inclined at an inclination angle of −45° relative to the column direction y.

Next, the configuration of the detection column wires 2 provided in the block region C1 will be described in more detail with reference to FIG. 17.

The detection column wire 2 includes first zigzag wires 2a (first detection column wires) extending in the column direction y and second zigzag wires 2b (second detection column wires) extending in the column direction y. In FIG. 17, only one first zigzag wire 2a is illustrated with the thick broken line. The detection column wire 2 also includes branch wires 2e (first branch wires) that connect the first zigzag wires 2a and the second zigzag wires 2b to each other.

The first zigzag wire 2a includes the inclined portion 2aS1 inclined at an inclination angle of +45° relative to the column direction y, the inclined portion 2aS2 inclined at an inclination angle of −45° relative to the column direction y, and the coupling portion 2P2 and the coupling point J1 that couple these inclined portions to each other. They are repeatedly arranged along the column direction y. The second zigzag wire 2b includes the inclined portion 2bS1 inclined at an inclination angle of −45° relative to the column direction y, the inclined portion 2bS2 inclined at an inclination angle of +45° relative to the column direction y, and coupling points J1 and J2 that couple these inclined portions to each other. They are repeatedly arranged along the column direction y. The first and second zigzag wires 2a and 2b are line-symmetric to each other.

The first and second zigzag wires 2a and 2b are alternately arranged along the row direction x within the block region C1, and coupled to each other by the coupling point J1, the coupling portion 2P1, and the coupling point J2. In this preferred embodiment, one set of the first and second zigzag wires 2a and 2b and the other set of the first and second zigzag wires 2a and 2b are arranged at positions laterally line-symmetric to each other with respect to a center line of the block region C1 that extends along the column direction y.

The second zigzag wire 2b located at the right end (+x side end) is, at both ends (the −y side end and the +y side end) thereof with respect to their extending direction, extending to the vertices Jc2 and Jc1 of the block region C1. At these vertices Jc2 and Jc1, the detection column wire 2 of the block region C1 is coupled and electrically connected to the detection column wires 2 of the block regions C2 located lower right (at the +x and +y side) and upper right (at the +x and −y side).

The branch wire 2e includes an inclined portion (inclined portions 2eS2 and 2eS3) similar to the first inclined portion (inclined portions 2aS1 and 2bS2), an inclined portion (inclined portions 2eS1 and 2eS4) similar to the second inclined portion (inclined portions 2aS2 and 2bS1), and coupling portions 2eP each coupling two of the inclined portions 2eS1 to 2eS4 to each other. In the branch wire 2e having such a configuration, the inclined portions 2eS2 and 2eS3 are parallel to the inclined portions 2aS1 and 2bS2, and the inclined portions 2eS1 and 2eS4 are parallel to the inclined portions 2aS2 and 2bS1.

Next, the configuration of the detection column wires 2 provided in the block region C2 will be described with reference to FIG. 18. The detection column wires 2 of the block region C2 are configured in the same manner as the detection column wires 2 of the block region C1 described above. However, in the block region C2, the first zigzag wire 2a located at the left end (−x side end) is, at both ends (here, the −y side end and the +y side end) thereof with respect to their extending direction, extending to the vertices Jc1 and Jc2 of the block region C2. At these vertices Jc1 and Jc2, the detection column wire 2a of the block region C2 is coupled and electrically connected to the detection column wires 2 of the block regions C1 located lower left (at the −x and +y side) and upper left (at the −x and −y side). In the block regions C1 and C2, the detection column wire 2 is configured such that, even though the detection column wire 2 is rotated by 90° about the coupling point J2, the shape thereof is substantially the same. They are point-symmetric with respect to the coupling point J2.

Figure 19:
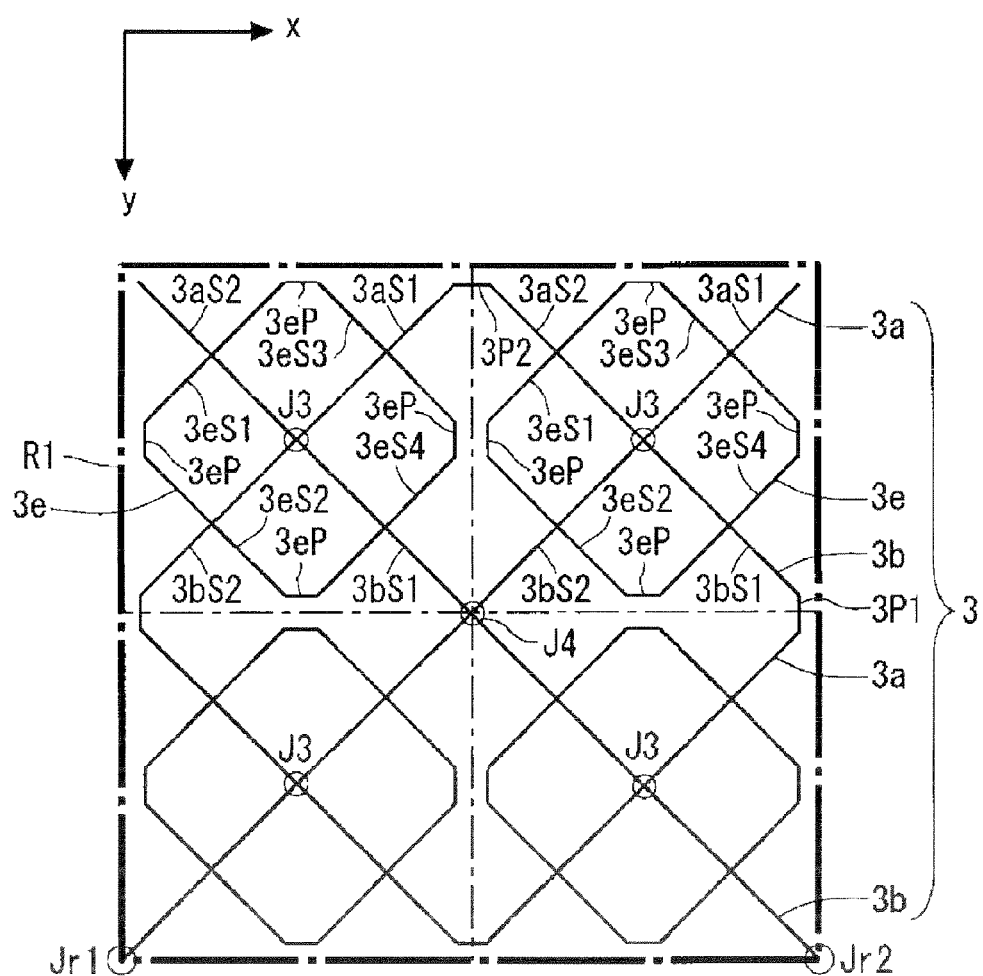

FIGS. 19 and 20 are diagrams each showing, on an enlarged scale, a configuration of the detection row wires 3 provided in each of the block regions R1 and R2. The configurations of the detection row wires 3 provided in the block regions R1 and R2 are the same as the configurations of the detection column wires 2 provided in the block regions C1 and C2 shown in FIGS. 17 and 18.

To be specific, in the block regions R1 and R2, the detection row wire 3 includes the third inclined portion (inclined portions 3aS1 and 3bS2) and the fourth inclined portion (inclined portions 3aS2 and 3bS1). The third inclined portion is repeatedly arranged at the above-described predetermined pitches along the column direction y and the row direction x, and inclined at an inclination angle of +45° relative to the row direction x. The fourth inclined portion is repeatedly arranged at the above-described predetermined pitches along the column direction y and the row direction x, and inclined at an inclination angle of −45° relative to the row direction x. The detection row wire 3 provided in the block regions R1 and R2 includes fifth zigzag wires 3a (first detection row wires) having inclined portions 3aS1 and 3aS2 and extending in the row direction x, and sixth zigzag wires 3b (second detection row wires) having inclined portions 3bS1 and 3bS2 and extending in the row direction x. The fifth and sixth zigzag wires 3a and 3b are line-symmetric to each other.

The detection row wire 3 provided in the block regions R1 and R2 also includes branch wires 3e (second branch wires) that connect the fifth zigzag wires 3a and the sixth zigzag wires 3b to each other. The branch wire 3e includes an inclined portion (inclined portions 3eS1 and 3eS4) similar to the third inclined portion (inclined portions 3aS1 and 3bS2), and an inclined portion (inclined portions 3eS2 and 3eS3) similar to the fourth inclined portion (inclined portions 3aS2 and 3bS1).

In the detection row wire 3 of the block region R1, a lower left portion (at the −x and +y side) and a lower right portion (at the +x and +y side) extend to the vertices Jr1 and Jr2 of the block region R1. At these vertices Jr1 and Jr2, the detection row wire 3 of the block region R1 is coupled to the detection row wires 3 of the block regions R2 located lower left (at the −x and +y side) and lower right (at the +x and +y side). In the detection row wire 3 of the block region R2, an upper left portion (at the −x and −y side) and an upper right portion (at the +x and −y side) extend to the vertices Jr2 and Jr1 of the block region R2. At these vertices Jr1 and Jr2, the detection row wire 3 of the block region R2 is coupled to the detection row wires 3 of the block regions R1 located upper left (at the −x and −y side) and upper right (at the +x and −y side).

Figure 21:
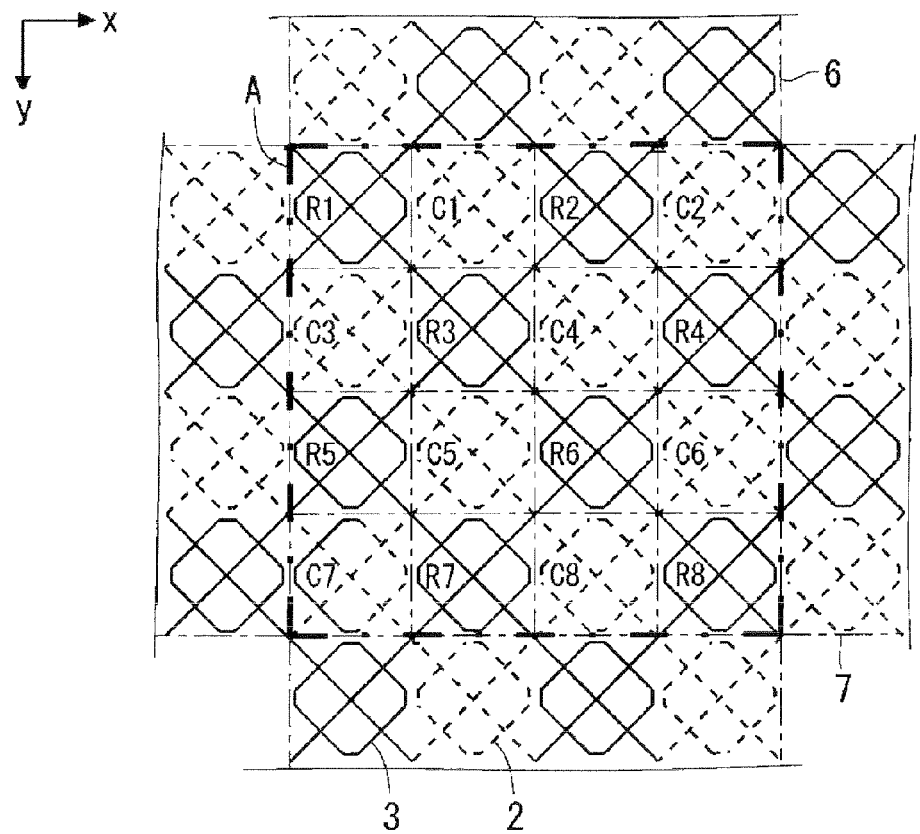

FIG. 21 shows a configuration of, among touch screens according to this preferred embodiment, a touch screen (hereinafter, referred to as "another touch screen") different from the above-described one. FIG. 21 is a diagram showing, on an enlarged scale, the grid A of another touch screen. In another touch screen shown in FIG. 21, as will be described later, the number of block regions in the grid A is greater than in the touch screen 1 shown in FIG. 15. In another touch screen, the pitches (corresponding to the above-described predetermined pitches of the inclined portions) at which a zigzag pattern of the detection column wire 2 and the detection row wire 3 is repeated in the grid A is ¼ of one side of the grid A having a square shape. These pitches are equivalent to the pitches of the detection column wire 2 and the detection row wire 3 in the grid A shown in FIG. 15.

Figure 22:
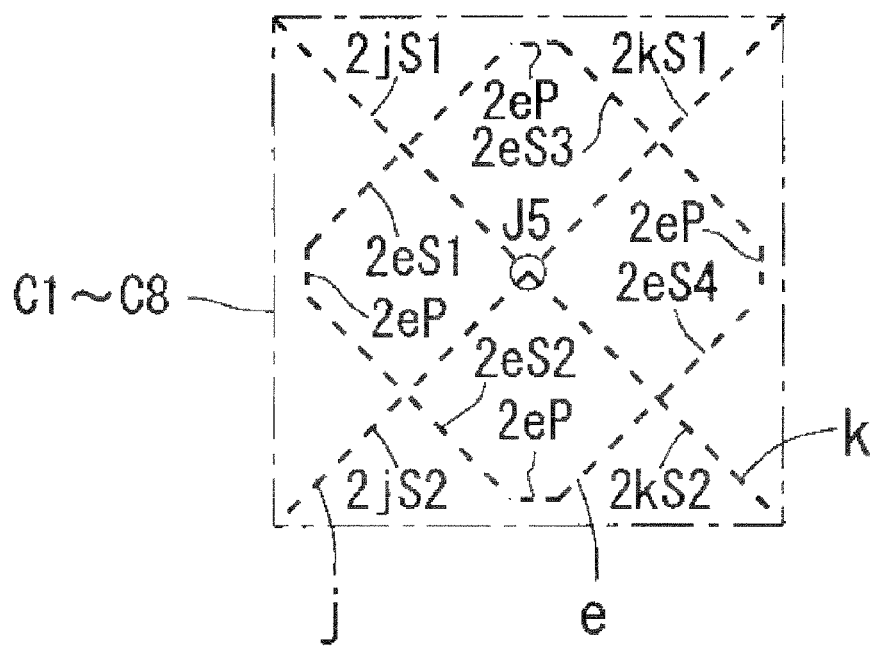

FIG. 22 is a diagram showing a basic wire pattern of the detection column wires 2 in block regions C1 to C8 of another touch screen shown in FIG. 21. Although FIG. 22 shows the detection column wire 2, the same applies to the detection row wire 3.

The basic wire pattern shown in FIG. 22 includes a zigzag wire j, a zigzag wire k, and a branch wire e. The zigzag wire j includes inclined portions 2jS1 and 2jS2, and a coupling point J that couples them to each other. The zigzag wire k includes inclined portions 2kS1 and 2kS2, and a coupling point J that couples them to each other. The branch wire e includes inclined portions 2eS1 to 2eS4, and a coupling portion 2eP that couples them to each other. The zigzag wire j and the zigzag wire k are coupled to each other at a coupling point J5. The branch wire e is arranged so as to form a substantially diamond shape as a whole. Each inclined portion of the branch wire e is orthogonal to any of the inclined portions of the zigzag wires j and k. As seen from FIG. 22, in another touch screen, the length of one side of the block region is equal to the predetermined pitch of the inclined portion (first to fourth inclined portion).

In another touch screen having such a configuration shown in FIGS. 21 and 22, as described above, the number of block regions specified in the grid A is greater than in the touch screen 1 shown in FIG. 15. More specifically, in one grid A shown in FIG. 21, sixteen block regions in total, four in the column direction y and four in the row direction x, are provided. In the one grid A shown in FIG. 15, on the other hand, four block regions in total, two in the column direction y and two in the row direction x, are provided.

Figure 23:
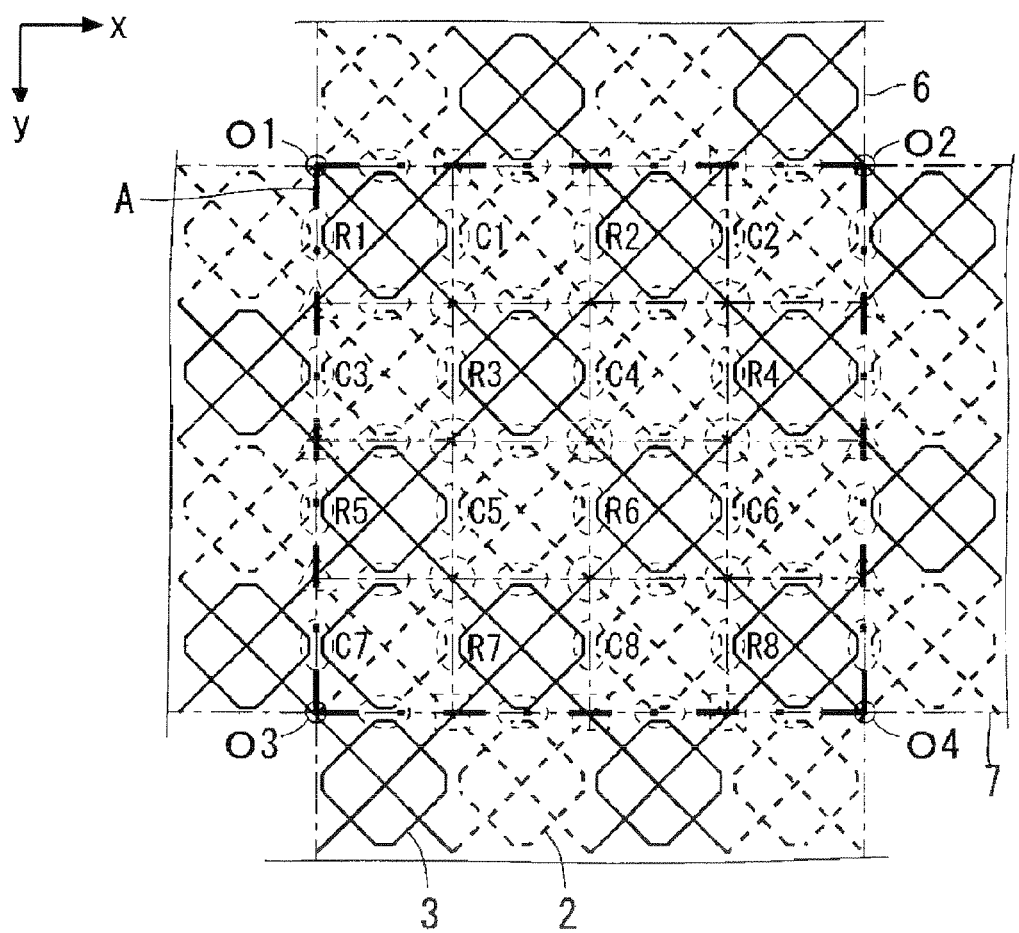

Next, a result of comparison between another touch screen shown in FIG. 21 and the touch screen 1 shown in FIG. 15 will be described with reference to FIGS. 23 and 16. As shown in FIG. 23, in the grid A of another touch screen, the number of the crossing portions between the detection column wire 2 and the detection row wire 3, that is, the number of portions to which broken line circles are given, is 9 (=3×3). As shown in FIG. 16, in the grid A of the touch screen 1 shown in FIG. 15, the number of the above-described crossing portions is only one.

As shown in FIG. 23, in the grid A of another touch screen, the number of the parallel-extending portions of the coupling portions, that is, the number of portions to which broken line ellipse are given, is thirty-two. As shown in FIG. 16, in the grid A of the touch screen 1 shown in FIG. 15, the number of the above-described parallel-extending portions is twenty-four.

As seen from the above, when the number of block regions in the grid A is reduced, the number of the crossing portions between the detection column wires 2 and the detection row wires 3 decreases. This enhances the effect of reducing the coupling capacitance in the total crossing portions (the coupling capacitance of (1) described above). Additionally, the number of the parallel-extending portions of the coupling portions also decreases. This enhances the effect of reducing the coupling capacitance of the total parallel-extending portions (the coupling capacitance of (2) described above). Accordingly, in order to reduce the above-described coupling capacitances (1) and (2) and thereby enhance the effect of reducing the inter-wire capacitance between the column direction wire bunch 6 and the row direction wire bunch 7, it is desirable that the length of one side of the block region is made longer than the predetermined pitch of the inclined portion (first to fourth inclined portion) so that the number of block regions in the grid A is reduced as shown in FIG. 15.

FIG. 24 shows a tendency of the inter-wire capacitance in the touch screen 1 according to this preferred embodiment. This is a result of a TEG evaluation conducted by the inventors. Here, there are shown an inter-wire capacitance obtained when each of the longitudinal and lateral sizes of the grid A is set to be about 5 mm and each of the longitudinal and lateral sizes of a basic pattern (pitches at which the zigzag wire is repeated) is set to be 250 µm, and an inter-wire capacitance obtained when each of the longitudinal and lateral sizes of the grid A is set to be about 5 mm and each of the longitudinal and lateral sizes of the basic pattern is set to be 500 µm. Each of the length of the parallel-extending portion of the coupling portion and the intervals of the parallel-extending portions is set to be 20 µm.

The result shown in FIG. 24 has consistency with the above-described comparison result. That is, increasing the number of basic patterns per block region means that the length of one side of the block region is made longer than the predetermined pitch of the inclined portion (first to fourth inclined portion). In any case, enhancement of the effect of reducing the inter-wire capacitance between the column direction wire bunch 6 and the row direction wire bunch 7 is shown.

Needless to say, when, in the grid A, the number of block regions in which the detection column wires 2 are provided and the number of block regions in which the detection row wires 3 are provided are not two, an equivalent effect is obtained. Therefore, the numbers are not limited thereto.

As described above, this preferred embodiment includes the branch wire 2e that electrically connects the first zigzag wire 2a and the second zigzag wire 2b to each other, and the branch wire 3e that electrically connects the fifth zigzag wire 3a and the sixth zigzag wire 3b to each other. Accordingly, in a case where disconnection occurs in a part of the plurality of detection column wires 2 and the plurality of detection row wires 3, an increase in the resistance of the column direction wire bunch 6 and the row direction wire bunch 7 is suppressed. Thus, detection of the touch position with a high reliability is achieved.

The branch wires 2e and 3e include the inclined portions similar to the first and second inclined portions. Accordingly, the arrangement of the detection column wires 2 and the arrangement of the detection row wires 3 can be uniformized. As a result, even in a case where the detection column wires 2 and the detection row wires 3 are made of an opaque material having a high conductivity, it is possible to uniformized the transmittance at a time when a display light emitted from the display panel passes through the touch screen 1. Thus, occurrence of a moire pattern is suppressed.

<Preferred Embodiment 3>

In the preferred embodiments 1 and 2 described above, the detection column wire 2 provided in each of the block regions C1 and C2 that constitute the grid A includes two sets of the first and second zigzag wires 2a and 2b, and the detection row wire 3 provided in each of the block regions R1 and R2 that constitute the grid A includes two sets of the fifth and sixth zigzag wires 3a and 3b. However, the number of the sets of these zigzag wires included in each block region is not limited to two. Three or more sets may be provided. Therefore, in this preferred embodiment, a configuration will be described in which the number of sets of zigzag wires is an odd number (here, three).

FIG. 25 is a diagram showing, on an enlarged scale, a region around the grid A in this preferred embodiment. Here, similarly to the preferred embodiments 1 and 2, a plurality of (here, four) block regions C1, C2, R1, and R2 each having a quadrangular shape and obtained as a result of dividing the grid A are specified. In each of the block regions C1 and C2 (first block region), only the detection column wires 2 are provided, and in each of the block regions R1 and R2 (second block region), only the detection row wires 3 are provided. The block regions C1 and C2 in which the detection column wires 2 are provided and the block regions R1 and R2 in which the detection row wires 3 are provided are, as a whole, alternately arranged in the column direction y and the row direction x. Thereby, a checkered pattern is formed.

Figure 26:
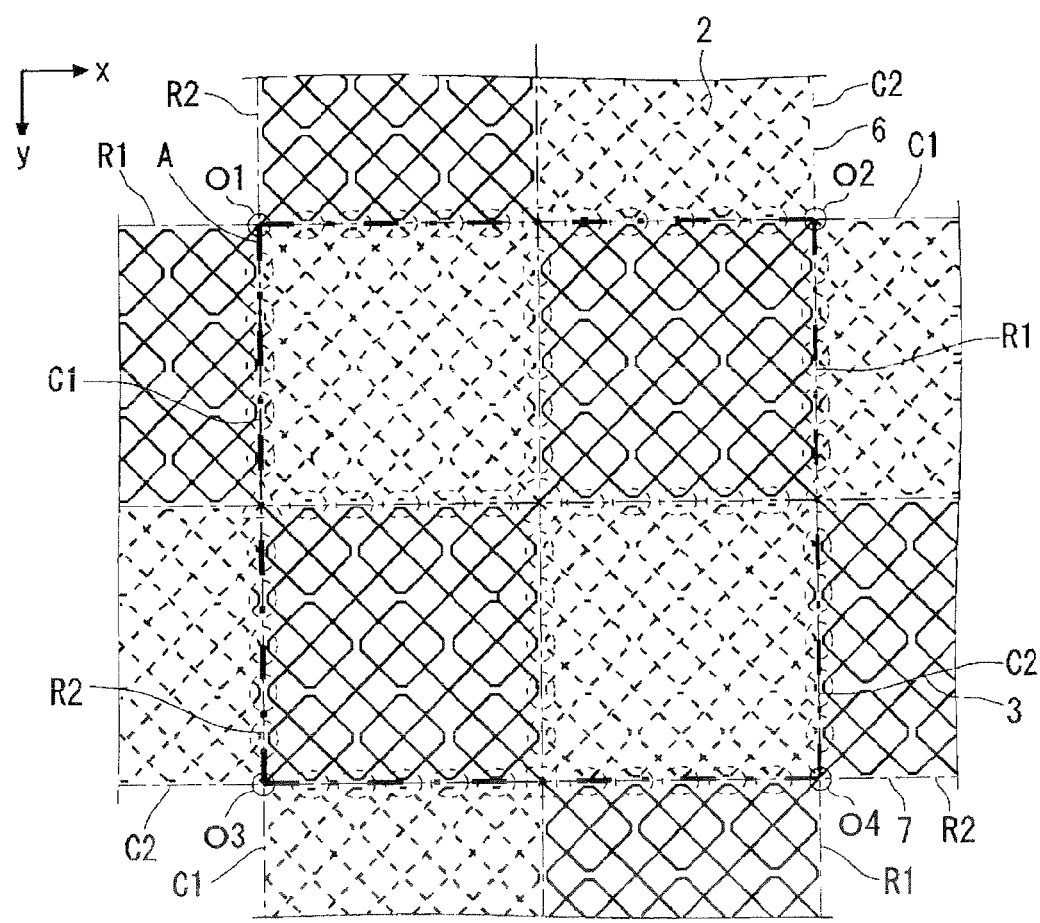

Similarly to the preferred embodiments 1 and 2, in one grid A, the three-dimensional crossing between the detection column wire 2 and the detection row wire 3 is provided only in one portion (one portion where the block regions C1, C2, R1, and R2 are in contact with one another), to which a broken line circle is given in FIG. 26. That is, in the portion to which the broken line circle is given in FIG. 26, one detection column wire 2 of the block region C1 and one detection column wire 2 of the block region C2 are coupled to each other, and one detection row wire 3 of the block region R1 and one detection row wire 3 of the block region R2 are coupled to each other.

In a portion to which a broken line triangle is given in FIG. 26, one detection row wire 3 of the block region R1 and one detection row wire 3 of the block region R2 are coupled to each other, with a coupling portion thereof being interposed between the detection column wire 2 of the block region C1 and the detection column wire 2 of the block region C2, so that the detection column wire 2 of the block region C1 and the detection column wire 2 of the block region C2 are not coupled to each other. In a portion to which a broken line square is given in FIG. 26, one detection column wire 2 of the block region C1 and one detection column wire 2 of the block region C2 are coupled to each other, with a coupling portion thereof being interposed between the detection row wire 3 of the block region R1 and the detection row wire 3 of the block region R2, so that the detection row wire 3 of the block region R1 and the detection row wire 3 of the block region R2 are not coupled to each other. In four portions O1 to O4 to which solid line circles are given in FIG. 26, the detection column wires 2 of the block regions C1 and C2 are spaced apart from and not coupled to each other, and the detection row wires 3 of the block regions R1 and R2 are spaced apart from and not coupled to each other.

Figure 27:
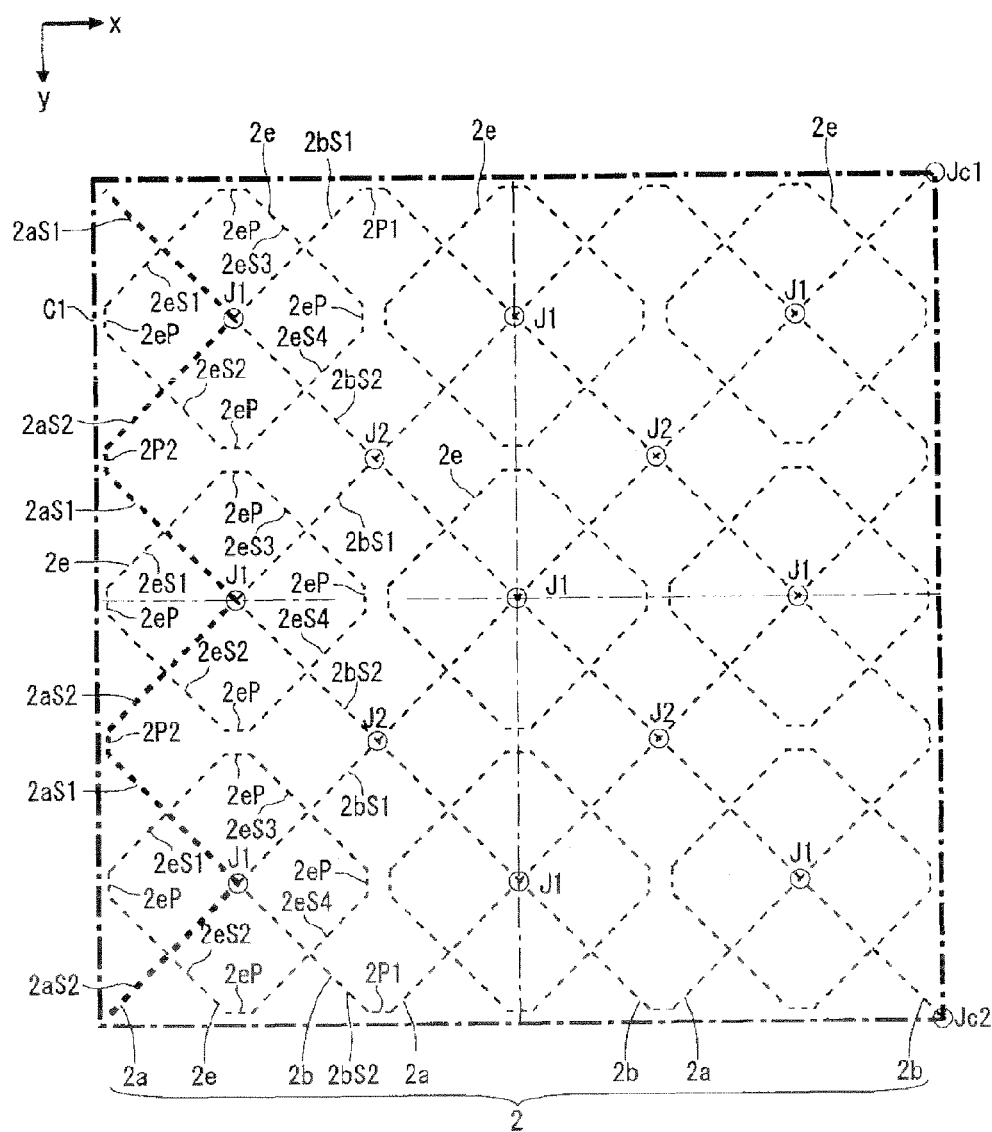
Figure 28:
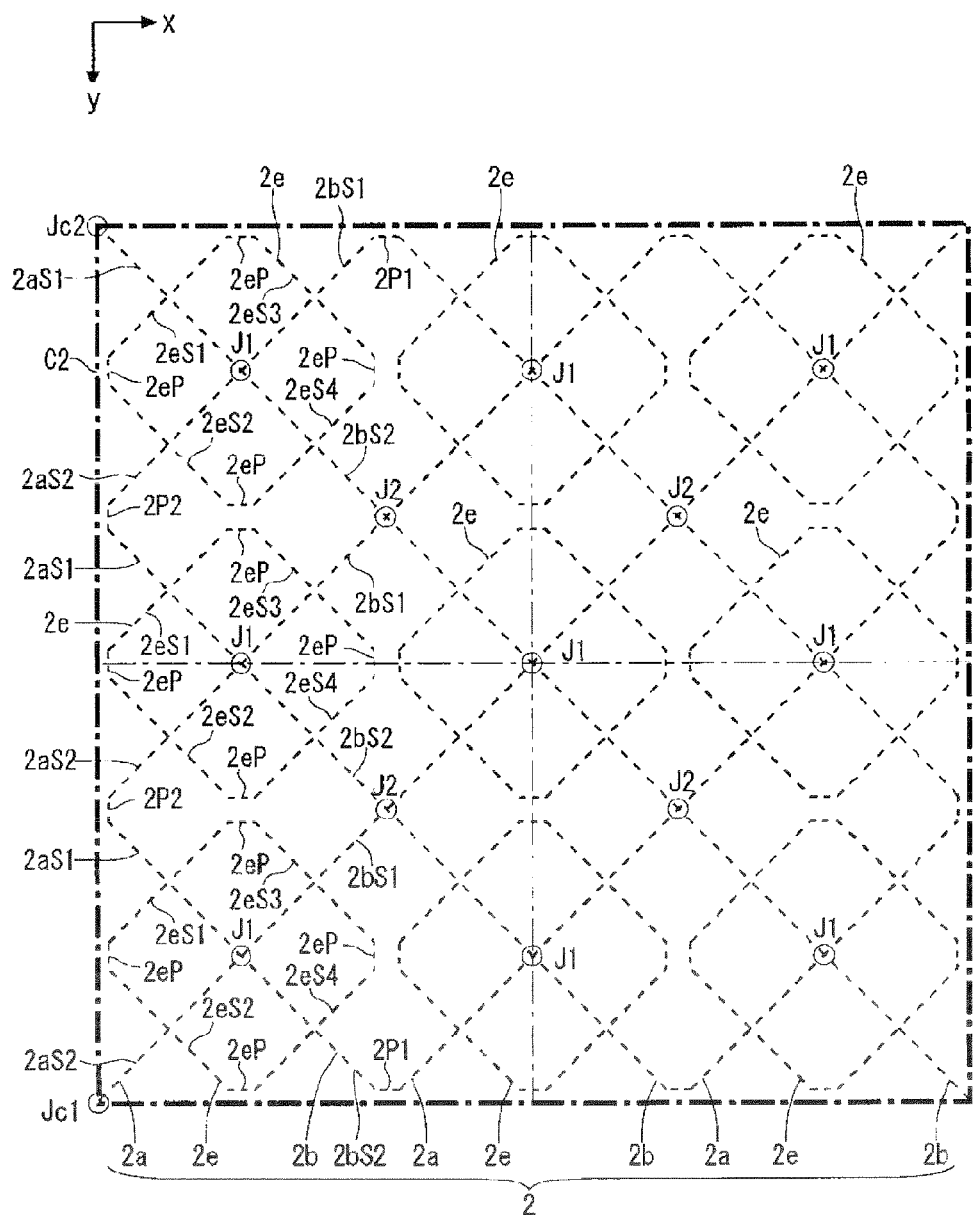

FIGS. 27 and 28 are diagrams each showing, on an enlarged scale, a configuration of the detection column wires 2 provided in each of the block regions C1 and C2. As shown in FIGS. 27 and 28, each of the detection column wires 2 provided in the block regions C1 and C2 includes inclined portions 2aS1 and 2bS2 that serve as the first inclined portion, and inclined portions 2aS2 and 2bS1 that serve as the second inclined portion.

Here, the first inclined portion (inclined portions 2aS1 and 2bS2) is a partial wire having a linear shape, and repeatedly arranged at predetermined pitches along the column direction y and the row direction x. One end of the first inclined portion is connected to the coupling point J1. The first inclined portion is inclined at an inclination angle of +45° (first angle) relative to the column direction y. In this preferred embodiment, the positive direction of the inclination angle relative to the column direction y on the drawings is reverse to the positive direction of the inclination angle relative to the column direction y on the drawings in the preferred embodiment 1.

The second inclined portion (inclined portions 2aS2 and 2bS1) is a partial wire having a linear shape, and repeatedly arranged at the above-described predetermined pitches along the column direction y and the row direction x. One end of the second inclined portion is connected to the coupling point J1. The second inclined portion is inclined, relative to the column direction y, reversely to the inclination direction of the first inclined portion. That is, the second inclined portion is inclined at an inclination angle of −45° relative to the column direction y.

Next, the configuration of the detection column wires 2 provided in the block region C1 will be described in more detail with reference to FIG. 27.

The detection column wire 2 includes first zigzag wires 2a (first detection column wires) extending in the column direction y and second zigzag wires 2b (second detection column wires) extending in the column direction y. In FIG. 27, only one first zigzag wire 2a is illustrated with the thick broken line. The detection column wire 2 also includes branch wires 2e (first branch wires) that connect the first zigzag wires 2a and the second zigzag wires 2b to each other.

The first zigzag wire 2a includes the inclined portion 2aS1 inclined at an inclination angle of +45° relative to the column direction y, the inclined portion 2aS2 inclined at an inclination angle of −45° relative to the column direction y, and the coupling portion 2P2 and the coupling point J1 that couple these inclined portions to each other. They are repeatedly arranged along the column direction y. The second zigzag wire 2b includes the inclined portion 2bS1 inclined at an inclination angle of −45° relative to the column direction y, the inclined portion 2bS2 inclined at an inclination angle of +45° relative to the column direction y, and coupling points J1 and J2 that couple these inclined portions to each other. They are repeatedly arranged along the column direction y. The first and second zigzag wires 2a and 2b are line-symmetric to each other.

The first and second zigzag wires 2a and 2b are alternately arranged along the row direction x within the block region C1, and coupled to each other by the coupling point J1, the coupling portion 2P1, and the coupling point J2. In this preferred embodiment, three sets of first and second zigzag wires 2a and 2b are arranged along the row direction x. The first zigzag wire 2a in the first set, the second zigzag wire 2b in the first set, and the first zigzag wire 2a in the second set, and the second zigzag wire 2b in the third set, the first zigzag wire 2a in the third set, and the second zigzag wire 2b in the second set are arranged at positions laterally line-symmetric to each other with respect to a center line of the block region C1 that extends along the column direction y.

The second zigzag wire 2b located at the right end (+x side end) is, at both ends (at the −y side end and the +y side end) thereof with respect to their extending direction, extending to the vertices Jc2 and Jc1 of the block region C1. At these vertices Jc2 and Jc1, the detection column wire 2 of the block region C1 is coupled and electrically connected to the detection column wires 2 of the block regions C2 located lower right (at the +x and +y side) and upper right (at the +x and −y side).

The branch wire 2e includes an inclined portion (inclined portions 2eS2 and 2eS3) similar to the first inclined portion (inclined portions 2aS1 and 2bS2), an inclined portion (inclined portions 2eS1 and 2eS4) similar to the second inclined portion (inclined portions 2aS2 and 2bS1), and a coupling portion 2eP each coupling two of the inclined portions 2eS1 to 2eS4. In the branch wire 2e having such a configuration, the inclined portions 2eS2 and 2eS3 are parallel to the inclined portions 2aS1 and 2bS2, and the inclined portions 2eS1 and 2eS4 are parallel to the inclined portions 2aS2 and 2bS1.

Next, the configuration of the detection column wires 2 provided in the block region C2 will be described with reference to FIG. 28. The detection column wires 2 of the block region C2 are configured in the same manner as the detection column wires 2 of the block region C1 described above. However, in the block region C2, the first zigzag wire 2a located at the left end (−x side end) is, at both ends (here, at the −y side end and the +y side end) thereof with respect to their extending direction, extending to the vertices Jc1 and Jc2 of the block region C2. At these vertices Jc1 and Jc2, the detection column wire 2 of the block region C2 is coupled and electrically connected to the detection column wires 2 of the block regions C1 located lower left (at the −x and +y side) and upper left (at the −x and −y side). In the block regions C1 and C2, the detection column wire 2 is configured such that, even though the detection column wire 2 is rotated by 90° about the coupling point J1 which is located at the center of each of the regions, the shape thereof is substantially the same. They are point-symmetric with respect to the coupling point J1.

Figure 30:
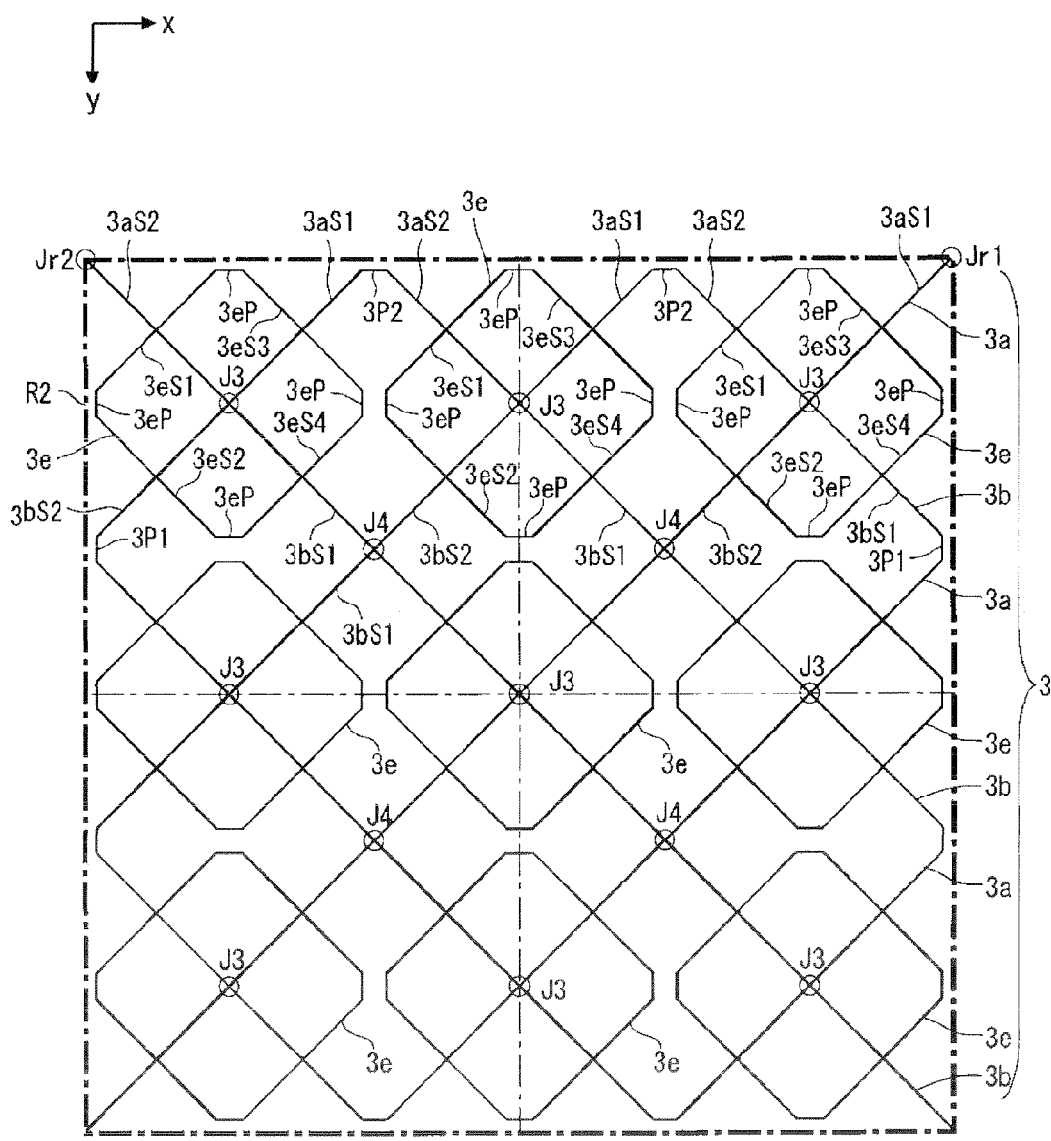

FIGS. 29 and 30 are diagrams each showing, on an enlarged scale, a configuration of the detection row wires 3 provided in each of the block regions R1 and R2. The configurations of the detection row wires 3 provided in the block regions R1 and R2 are the same as the configurations of the detection column wires 2 provided in the block regions C1 and C2 shown in FIGS. 27 and 28.

To be specific, in the block regions R1 and R2, the detection row wire 3 includes the third inclined portion (inclined portions 361 and 3bS2) and the fourth inclined portion (inclined portions 3aS2 and 3bS1). The third inclined portion is repeatedly arranged at the above-described predetermined pitches along the column direction y and the row direction x, and inclined at an inclination angle of +45° relative to the row direction x. The fourth inclined portion is repeatedly arranged at the above-described predetermined pitches along the column direction y and the row direction x, and inclined at an inclination angle of −45° relative to the row direction x. The detection row wire 3 provided in the block regions R1 and R2 includes fifth zigzag wires 3a (first detection row wires) having inclined portions 3aS1 and 3aS2 and extending in the row direction x, and sixth zigzag wires 3b (second detection row wires) having inclined portions 3bS1 and 3bS2 and extending in the row direction x. The fifth and sixth zigzag wires 3a and 3b are line-symmetric to each other.

The detection row wire 3 provided in the block regions R1 and R2 also includes branch wires 3e (second branch wires) that connect the fifth zigzag wires 3a and the sixth zigzag wires 3b to each other. The branch wire 3e includes an inclined portion (inclined portions 3eS1 and 3eS4) similar to the third inclined portion (inclined portions 3aS1 and 3bS2), and an inclined portion (inclined portions 3eS2 and 3eS3) similar to the fourth inclined portion (inclined portions 3aS2 and 3bS1).

In the detection row wire 3 of the block region R1, a lower left portion (at the −x and +y side) and a lower right portion (at the +x and +y side) extend to the vertices Jr1 and Jr2 of the block region R1. At these vertices Jr1 and Jr2, the detection row wire 3 of the block region R1 is coupled to the detection row wires 3 of the block regions R2 located lower left (at the −x and +y side) and lower right (at the +x and +y side). In the detection row wire 3 of the block region R2, an upper left portion (at the −x and −y side) and an upper right portion (at the +x and −y side) extend to the vertices Jr2 and Jr1 of the block region R2. At these vertices Jr1 and Jr2, the detection row wire 3 of the block region R2 is coupled to the detection row wires 3 of the block regions R1 located upper left (at the −x and −y side) and upper right (at the +x and −y side).

As described above, in this preferred embodiment, three sets of the first zigzag wires 2a and the second zigzag wires 2b are provided in each of the block regions C1 and C2, while in the preferred embodiments 1 and 2, two sets of the first zigzag wires 2a and the second zigzag wires 2b are provided in each of the block regions C1 and C2. Likewise, three sets of the first zigzag wires 3a and the second zigzag wires 3b are provided in each of the block regions R1 and R2.

As described above, in this preferred embodiment, similarly to the preferred embodiments 1 and 2, the crossing region (grid A) between the column direction wire bunch 6 and the row direction wire bunch 7 is divided into a plurality of block regions each including only one of the detection column wires 2 and the detection row wires 3, and a block region including only the detection column wires 2 and a block region including only the detection row wires 3 are alternately arranged in the row and column directions. This can considerably reduce the number of crossings between the detection column wires 2 and the detection row wires 3. Thus, the inter-wire capacitance between the detection column wire 2 and the detection row wire 3 occurring in the vicinity of the crossing portion is reduced.

<Preferred Embodiment 4>

The detection column wires 2 provided in the block regions C1 and C2 and the detection row wires 3 provided in the block regions R1 and R2 described above are wires in different wire layers. Therefore, even when wire patterns of the respective block regions C1, C2, R1, and R2 are equivalent, differences in a transmittance for a display light emitted from a display device that is used in combination therewith, in a reflectance for the outside light, and also in a wavelength spectrum of transmitted light and reflected light, may occur between the block regions C1, C2 and the block regions R1, R2 because of, for example, a slight difference in a wire width of the detection column wire 2 and a wire width of the detection row wire 3 caused by a limitation in manufacturing and the like. This causes a problem that a difference in the degree of shading and coloring between the block regions C1, C2 and the block regions R1, R2 is visually recognized as a pattern.

Therefore, in this preferred embodiment, the detection column wires 2 of the block regions C1 and C2 in the grid A of the preferred embodiment 3 are partially replaced with a floating wire 3F that is in the same layer as the detection row wire 3, and the detection row wires 3 of the block regions R1 and R2 are replaced with a floating wire 2F that is in the same layer as the detection column wire 2. Accordingly, in this preferred embodiment, regions having different degrees of shading and coloring are made smaller than the block regions, and in other words, the frequency (the number of times) of repeating a shading pattern and a coloring pattern is made higher, thereby making it difficult that the difference is visually recognized.

Figure 31:
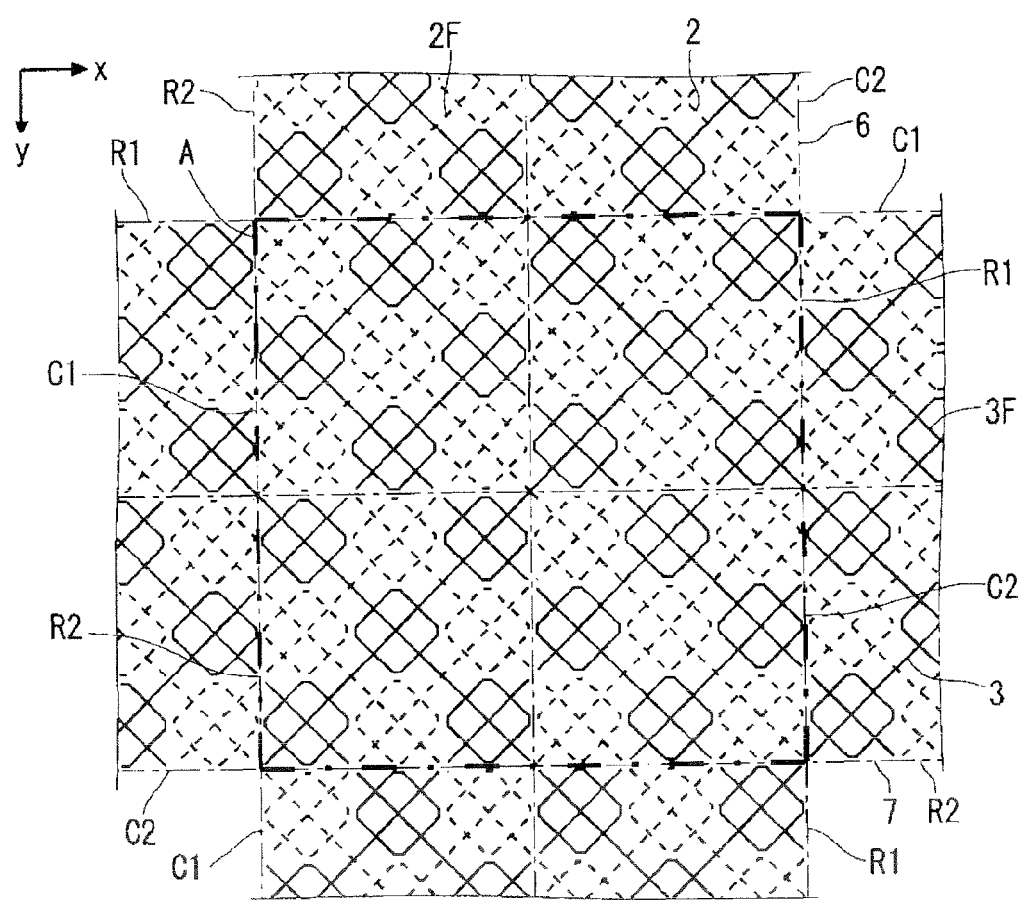
FIGS. 31 to 36 are plan views each showing, on an enlarged scale, a configuration of a touch screen according to a preferred embodiment 4.

FIG. 31 is a diagram showing, on an enlarged scale, a region around the grid A in this preferred embodiment. Similarly to the preferred embodiments 1 to 3, a plurality of (here, four) block regions C1, C2, R1, and R2 each having a quadrangular shape and obtained as a result of dividing the grid A are specified. In each of the block regions C1 and C2 (first block region), there are provided the detection column wires 2 and the floating wires 3F (first floating wire) formed in the same wire layer as the row direction wire bunch 7 (detection row wire 3). The floating wire 3F is a wire that is in the same wire layer as the detection row wire 3, but does not constitute a part of the row direction wire bunch 7. The floating wire 3F is not connected to the column direction wire bunch 6 and the row direction wire bunch 7. That is, the floating wire 3F is in a floating state.

In each of the block regions R1 and R2 (second block region), there are provided the detection row wires 3 and the floating wires 2F (second floating wire) formed in the same wire layer as the column direction wire bunch 6 (detection column wire 2). The floating wire 2F is a wire that is in the same wire layer as the detection column wire 2, but does not constitute a part of the column direction wire bunch 6. The floating wire 2F is not connected to the column direction wire bunch 6 and the row direction wire bunch 7. That is, the floating wire 2F is in a floating state.

Moreover, the block regions C1 and C2 in which the detection column wires 2 are provided and the block regions R1 and R2 in which the detection row wires 3 are provided are, as a whole, alternately arranged in the column direction y and the row direction x. Thereby, a checkered pattern is formed.

Figure 32:
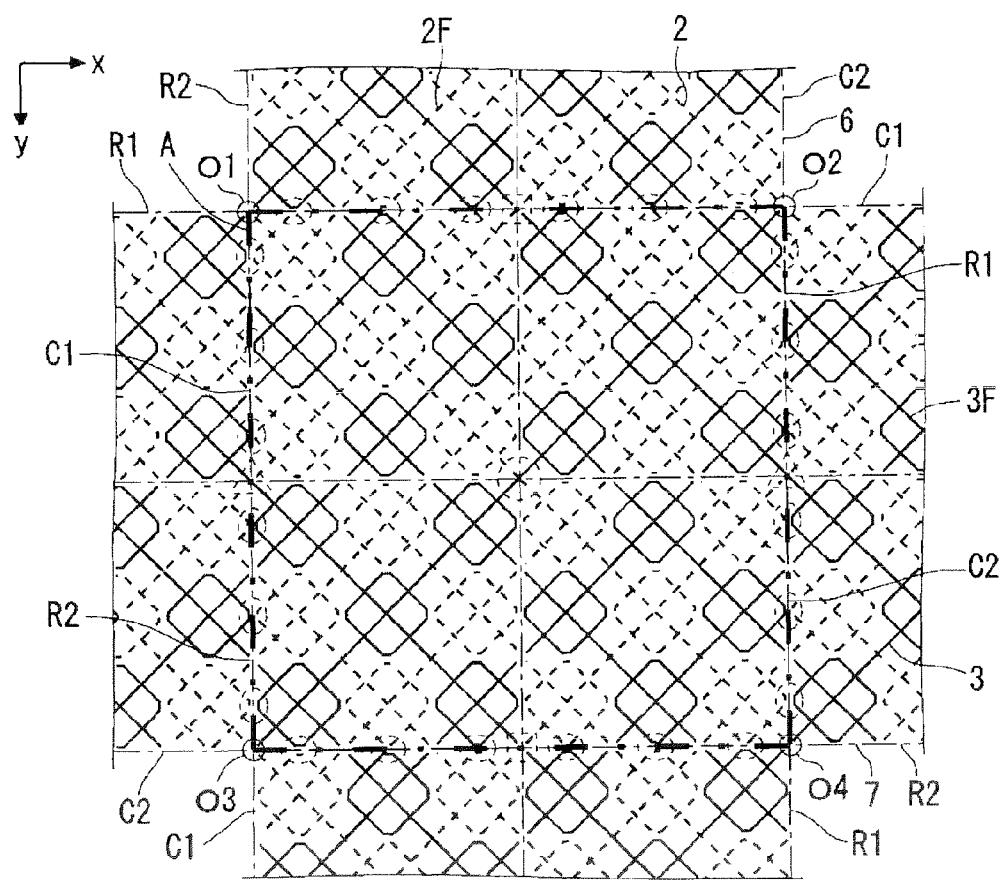

Similarly to the preferred embodiments 1 to 3, in one grid A, the three-dimensional crossing between the detection column wire 2 and the detection row wire 3 is provided only in one portion (one portion where the block regions C1, C2, R1, and R2 are in contact with one another), to which a broken line circle is given in FIG. 32. That is, in the portion to which the broken line circle is given in FIG. 32, one detection column wire 2 of the block region C1 and one detection column wire 2 of the block region C2 are coupled to each other, and one detection row wire 3 of the block region R1 and one detection row wire 3 of the block region R2 are coupled to each other.

In a portion to which a broken line triangle is given in FIG. 32, one detection row wire 3 of the block region R1 and one detection row wire 3 of the block region R2 are coupled to each other, with a coupling portion thereof being interposed between the detection column wire 2 of the block region C1 and the detection column wire 2 of the block region C2, so that the detection column wire 2 of the block region C1 and the detection column wire 2 of the block region C2 are not coupled to each other. In a portion to which a broken line square is given in FIG. 32, one detection column wire 2 of the block region C1 and one detection column wire 2 of the block region C2 are coupled to each other, with a coupling portion thereof being interposed between the detection row wire 3 of the block region R1 and the detection row wire 3 of the block region R2, so that the detection row wire 3 of the block region R1 and the detection row wire 3 of the block region R2 are not coupled to each other. In four portions O1 to O4 to which solid line circles are given in FIG. 32, the detection column wires 2 of the block regions C1 and C2 are spaced apart from and not coupled to each other, and the detection row wires 3 of the block regions R1 and R2 are spaced apart from and not coupled to each other.

Figure 33:
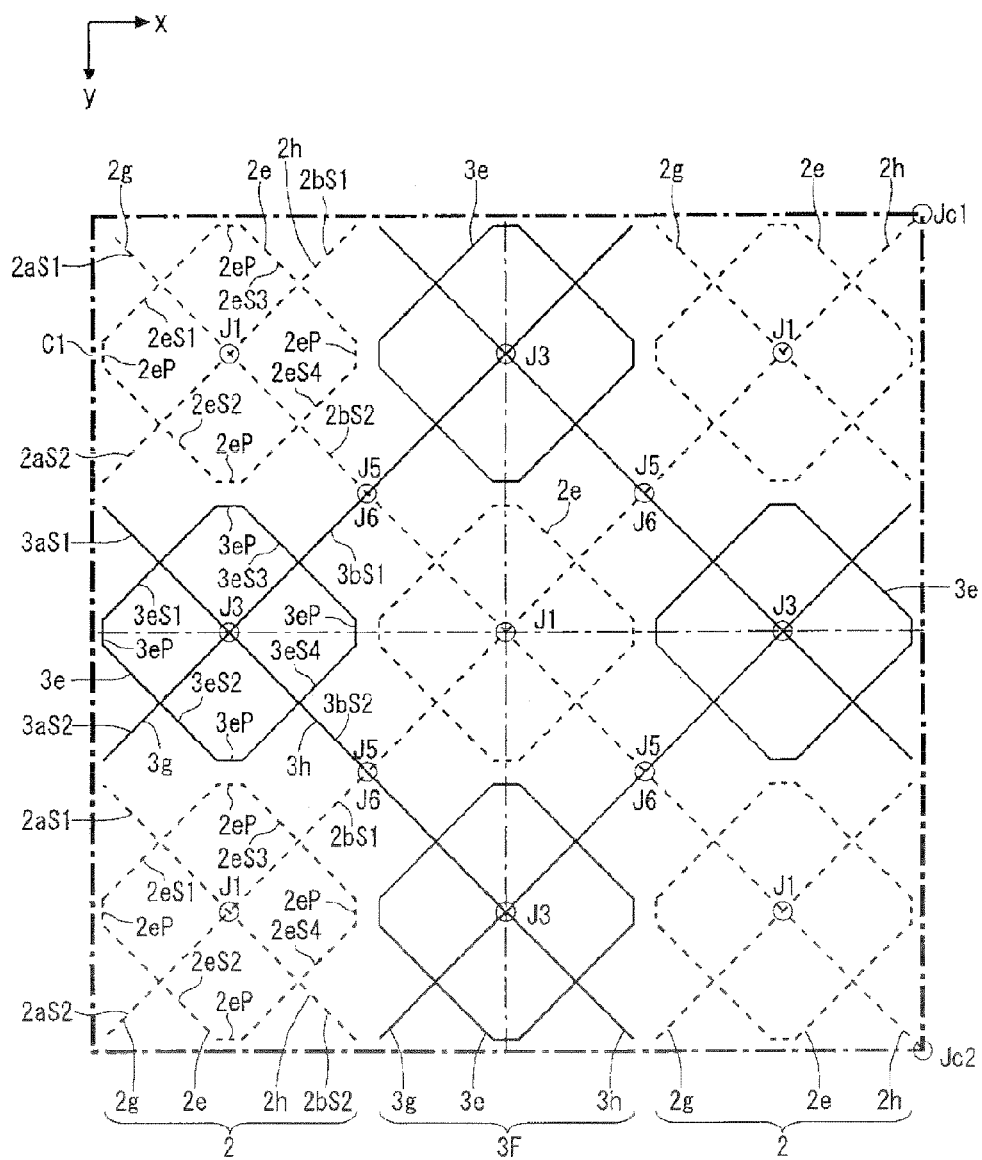
Figure 34:
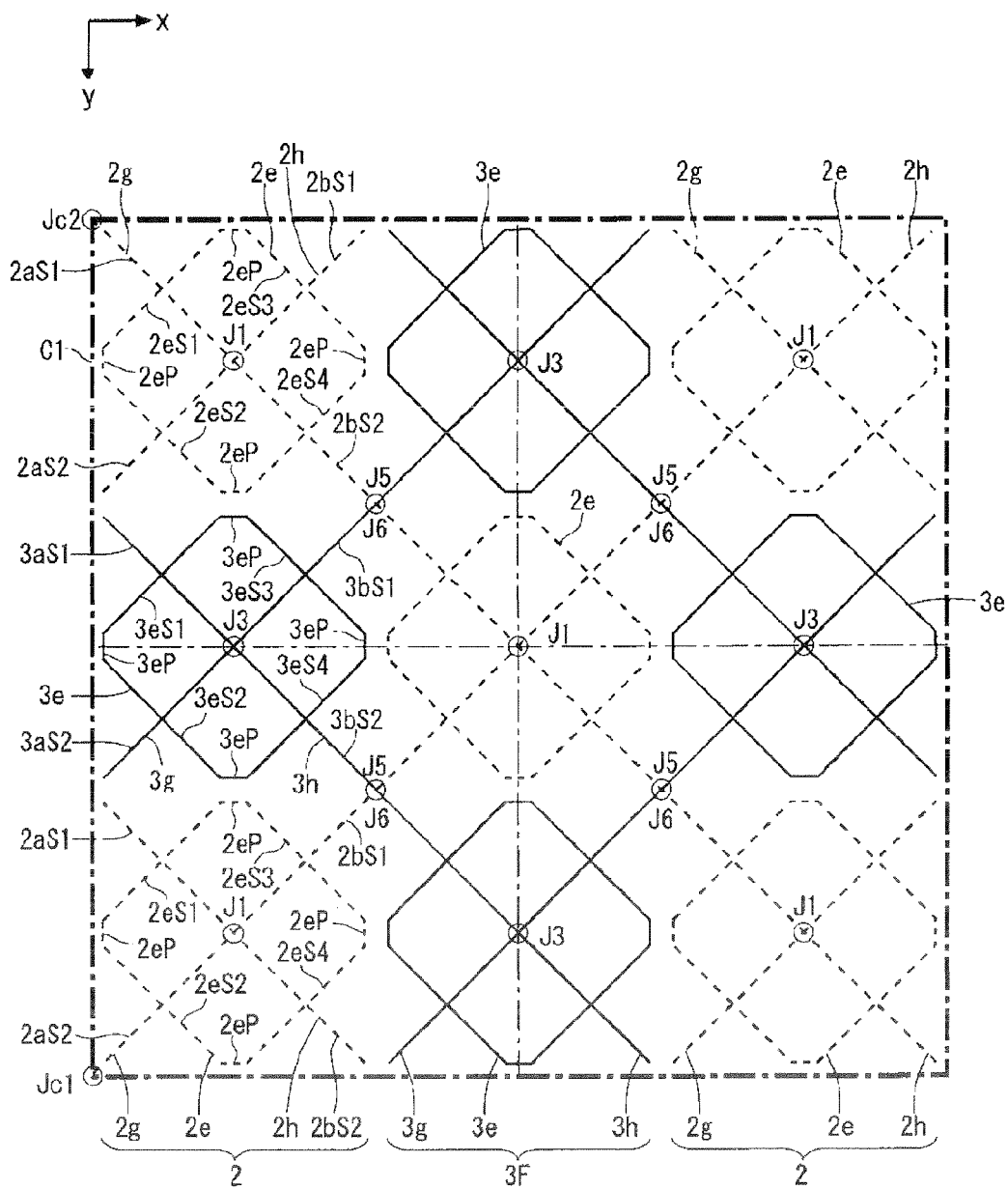

FIGS. 33 and 34 are diagrams each showing, on an enlarged scale, configurations of the detection column wires 2 and the floating wires 3F provided in each of the block regions C1 and C2. As shown in FIGS. 33 and 34, each of the detection column wires 2 provided in the block regions C1 and C2 includes inclined portions 2aS1 and 2bS2 that serve as the first inclined portion and inclined portions 2aS2 and 2bS1 that serve as the second inclined portion.

In the same manner, each of the floating wires 3F provided in the block regions C1 and C2 includes inclined portions 3aS1 and 3bS2 that are inclined portions similar to the first inclined portion (inclined portions 2aS1 and 2bS2) and inclined portions 3aS2 and 3bS1 that are inclined portions similar to the second inclined portion (inclined portions 2aS2 and 2bS1).

The inclined portion 2aS1 and the inclined portion 2aS2 of the detection column wire 2 form a left-open V-shaped wire 2g having the shape of ">". The inclined portion 3aS1 and the inclined portion 3aS2 of the floating wire 3F form a left-open V-shaped wire 3g having the shape of ">". The left-open V-shaped wire 2g and the left-open V-shaped wire 3g are alternately and repeatedly arranged at predetermined pitches along the column direction y and the row direction x.

Likewise, the inclined portion 2bS2 and the inclined portion 2bS1 of the detection column wire 2 form a right-open V-shaped wire 2h having the shape of "<". The inclined portion 3bS2 and the inclined portion 3bS1 of the floating wire 3F form a right-open V-shaped wire 3h having the shape of "<". The right-open V-shaped wire 2h and the right-open V-shaped wire 3h are alternately and repeatedly arranged at predetermined pitches along the column direction y and the row direction x.

The left-open V-shaped wire 2g (first detection column wire) and the right-open V-shaped wire 2h (second detection column wire) of the detection column wire 2 are line-symmetric to each other. The left-open V-shaped wire 3g (first partial floating wire) and the right-open V-shaped wire 3h (second partial floating wire) of the floating wire 3F are line-symmetric to each other.

Here, the first inclined portion (inclined portions 2aS1 and 2bS2) of the detection column wire 2, and the inclined portion (inclined portions 3aS1 and 3bS2) of the floating wire 3F similar to the first inclined portion, are inclined at an inclination angle of +45° (first angle) relative to the column direction y.

The second inclined portion (inclined portions 2aS2 and 2bS1) of the detection column wire 2, and the inclined portion (inclined portions 3aS2 and 3bS1) of the floating wire 3F similar to the second inclined portion, are inclined, relative to the column direction y, reversely to the inclination direction of the first inclined portion. That is, these inclined portions (inclined portions 2aS2, 2bS1, 3aS2, and 3bS1) are inclined at an inclination angle of −45° relative to the column direction y.

Next, the configurations of the detection column wire 2 and the floating wire 3F provided in the block region C1 will be described in more detail with reference to FIG. 33.

The configuration shown in FIG. 33 is identical to the configuration of the block region C1 described in the preferred embodiment 3 with reference to FIG. 27, except that the detection column wires 2 are partially replaced with the floating wire 3F that is in the same layer as the detection row wire 3. As described above, the floating wire 3F is a wire in the same layer as the detection row wire 3, but does not constitute a part of the row direction wire bunch 7. The floating wire 3F is a wire whose wire connection is closed in this block. That is, the floating wire 3F is in a floating state.

As shown in FIG. 33, in this preferred embodiment, the coupling portions 2P1 and 2P2 in the preferred embodiment 3 are not provided. The left-open V-shaped wire 2g including the inclined portion 2aS1 and the inclined portion 2aS2 and the right-open V-shaped wire 2h including the inclined portion 2bS2 and the inclined portion 2bS1 are coupled to each other at the coupling point J1. In the block region C1, such detection wire patterns extend while being coupled to one another at angles of +45° and −45° at the coupling points J5.

The detection column wire 2 also includes branch wires 2e (first branch wires) that connect the left-open V-shaped wires 2g and the right-open V-shaped wires 2h to each other. The left-open V-shaped wire 2g and the right-open V-shaped wire 2h are line-symmetric to each other.

On the other hand, at a coupling point J3, the left-open V-shaped wire 3g including the inclined portion 3aS1 and the inclined portion 3aS2 of the floating wire 3F that is in the same layer as the detection row wire 3 is coupled to the right-open V-shaped wire 3h including the inclined portion 3bS2 and the inclined portion 3bS1. In the block region C1, such floating wire patterns extend while being coupled to one another at angles of +45° and −45° at coupling points J6.

Here, the detection wire pattern having the left-open V-shaped wire 2g and the right-open V-shaped wire 2h being coupled at the coupling point J1, and the floating wire pattern having the left-open V-shaped wire 3g and the right-open V-shaped wire 3h being coupled at the coupling point J3, are alternately arranged in a checkered pattern within the block region C1.

An upper end (−y side end) of the right-open V-shaped wire 2h located at the upper right end (the +x and −y side end) of the block region C1 extends to the vertex Jc1 of the block region C1. Moreover, a lower end (+y side end) of the right-open V-shaped wire 2h located at the lower right end (the +x and +y side end) of the block region C1 extends to the vertex Jc2 of the block region C1. At these vertices Jc2 and Jc1, the detection column wire 2 of the block region C1 is coupled and electrically connected to the detection column wires 2 of the block regions C2 located lower right (at the +x and +y side) and upper right (at the +x and −y side).

As described above, the detection column wire 2 according to this preferred embodiment includes the branch wire 2e (first branch wire) that connects the left-open V-shaped wire 2g and the right-open V-shaped wire 2h, which are coupled at the coupling point J1, to each other. The branch wire 2e includes the inclined portion (inclined portions 2eS2 and 2eS3) similar to the first inclined portion (inclined portions 2aS1 and 2bS2), the inclined portion (inclined portions 2eS1 and 2eS4) similar to the second inclined portion (inclined portions 2aS2 and 2bS1), and the coupling portion 2eP that couples two of the inclined portions 2eS1 to 2eS4 to each other. In the branch wire 2e having such a configuration, the inclined portions 2eS2 and 2eS3 are parallel to the inclined portions 2aS1 and 2bS2, and the inclined portions 2eS1 and 2eS4 are parallel to the inclined portions 2aS2 and 2bS1.

In the same manner, the floating wire 3F according to this preferred embodiment includes the branch wire 3e (third branch wire) that connects the left-open V-shaped wire 3g and the right-open V-shaped wire 3h, which are coupled at the coupling point J3, to each other. The branch wire 3e includes the inclined portion (inclined portions 3eS2 and 3eS3) similar to the first inclined portion (inclined portions 2aS1 and 2bS2)

and the inclined portion (inclined portions 3eS1 and 3eS4) similar to the second inclined portion (inclined portions 2aS2 and 2bS1).

Next, the configurations of the detection column wire 2 and the floating wire 3F provided in the block region C2 will be described in more detail with reference to FIG. 34. The detection column wires 2 and the floating wires 3F provided in the block region C2 are configured in the same manner as the detection column wires 2 and the floating wires 3F provided in the block region C1 described above.

However, in the block region C2, an upper end (−y side end) of the left-open V-shaped wire 2g located at the upper left end (the −x and −y side end) extends to the vertex Jc2 of the block region C2. Moreover, a lower end (+y side end) of the left-open V-shaped wire 2g located at the lower left end (at the −x and +y side end) of the block region C2 extends to the vertex Jc1 of the block region C2.

At these vertices Jc1 and Jc2, the detection column wire 2 of the block region C2 is coupled and electrically connected to the detection column wires 2 of the block regions C1 located lower left (at the −x and +y side) and upper left (at the −x and −y side). In the block regions C1 and C2, the detection column wire 2 is configured such that, even though the detection column wire 2 is rotated by 90° about the coupling point J1 which is located at the center of each of the regions, the shape thereof is substantially the same. They are point-symmetric with respect to the coupling point J1.

Figure 35:
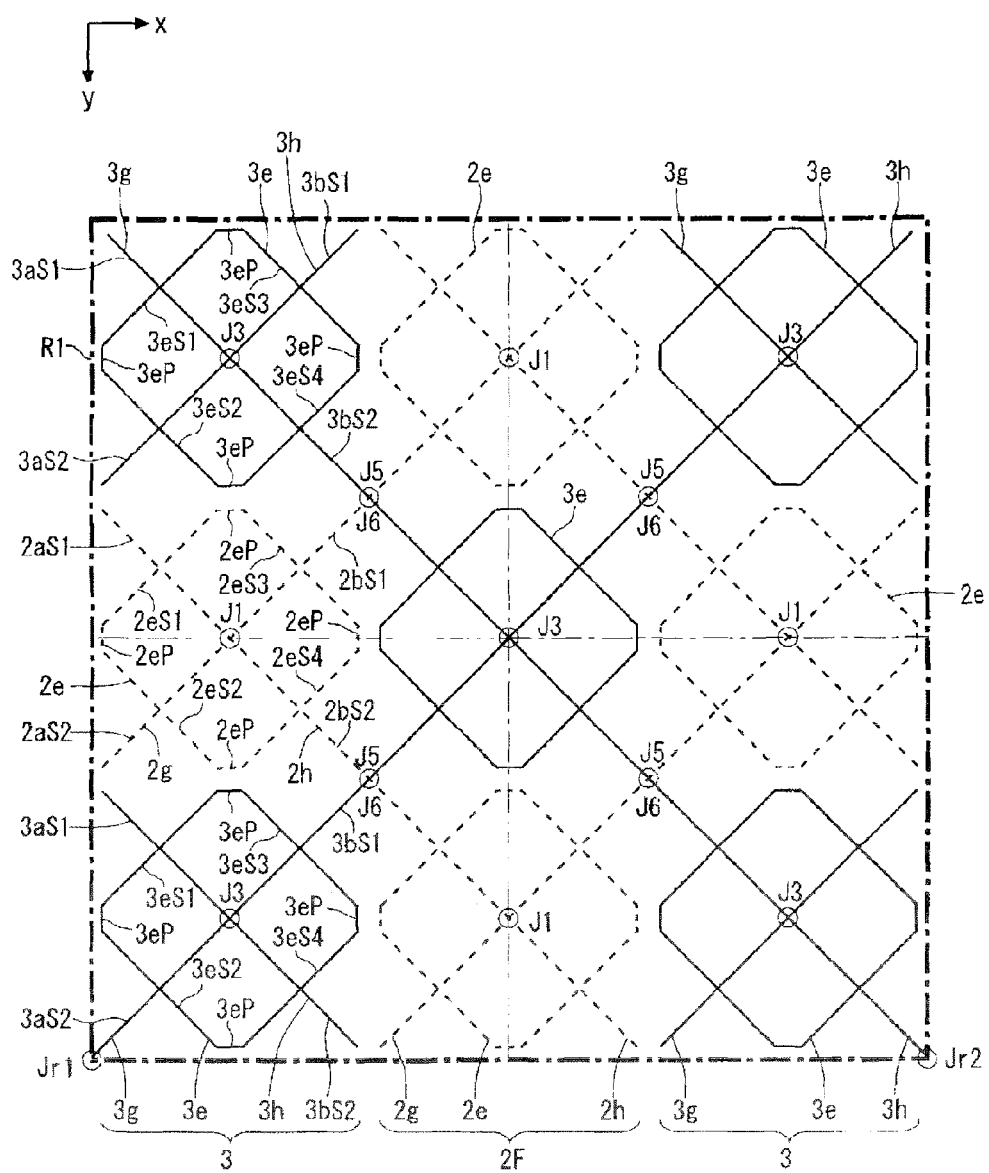
Figure 36:
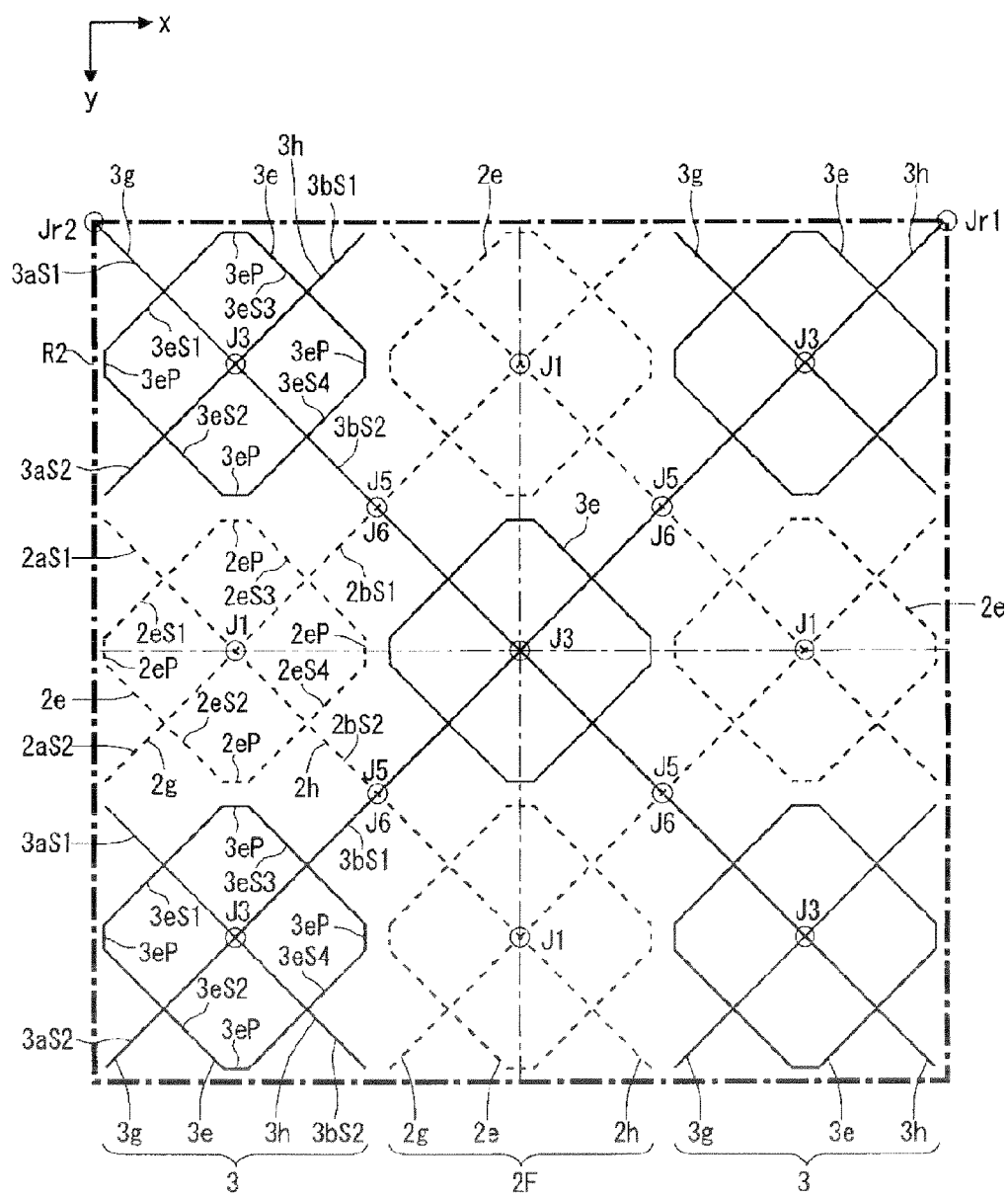

FIGS. 35 and 36 are diagrams each showing, on an enlarged scale, configurations of the detection row wires 3 and the floating wires 2F provided in the block regions R1 and R2. The configurations of the detection row wires 3 and the floating wires 2F provided in the block regions R1 and R2 are similar to the configurations of the detection column wires 2 and the floating wires 3F provided in the block regions C1 and C2 shown in FIGS. 33 and 34. That is, the configurations shown in FIGS. 35 and 36 are identical to the configurations of the block regions R1 and R2 described in the preferred embodiment 3 with reference to FIGS. 29 and 30, except that the detection row wires 3 are partially replaced with the floating wire 2F that is in the same layer as the detection column wire 2. As described above, the floating wire 2F is a wire that is in the same layer as the detection column wire 2, but does not constitute a part of the column direction wire bunch 6. The floating wire 2F is a wire whose wire connection is closed in this block. That is, the floating wire 2F is in a floating state.

In the block regions R1 and R2, the detection row wire 3 includes the third inclined portion (inclined portions 3aS1 and 3bS2) and the fourth inclined portion (inclined portions 3aS2 and 3bS1). The third inclined portion is inclined at an inclination angle of +45° relative to the row direction x. The fourth inclined portion is inclined at an inclination angle of −45° relative to the row direction x.

Likewise, in the block regions R1 and R2, the floating wire 2F includes the inclined portions 2aS1 and 2bS2 similar to the third inclined portion (inclined portions 3aS1 and 3bS2) and the inclined portions 2aS2 and 2bS1 similar to the fourth inclined portion (inclined portions 3aS2 and 3bS1).

The left-open V-shaped wire 3g having the shape of ">" and including the inclined portion 3aS1 and the inclined portion 3aS2 of the detection row wire 3, and the left-open V-shaped wire 2g having the shape of ">" and including the inclined portion 2aS1 and the inclined portion 2aS2 of the floating wire 2F, are alternately and repeatedly arranged at predetermined pitches along the column direction y and the row direction x.

Likewise, the right-open V-shaped wire 3h having the shape of "<" and including the inclined portion 3bS2 and the inclined portion 3bS1 of the detection row wire 3, and the right-open V-shaped wire 2h having the shape of "<" and including the inclined portion 2bS2 and the inclined portion 2bS1 of the floating wire 2F, are alternately and repeatedly arranged at predetermined pitches along the column direction y and the row direction x.

The left-open V-shaped wire 3g (first detection row wire) and the right-open V-shaped wire 3h (second detection row wire) of the detection row wire 3 are line-symmetric to each other. The left-open V-shaped wire 2g (third partial floating wire) and the right-open V-shaped wire 2h (fourth partial floating wire) of the floating wire 2F are line-symmetric to each other. Thus, the line-symmetry relationship is established again.

The detection row wire 3 according to this preferred embodiment includes the branch wire 3e (second branch wire) that connects the left-open V-shaped wire 3g and the right-open V-shaped wire 3h, which are coupled at the coupling point J3, to each other. The branch wire 3e includes the inclined portion (inclined portions 3eS2 and 3eS3) similar to the third inclined portion (inclined portions 3aS1 and 3bS2) and the inclined portion (inclined portions 3eS1 and 3eS4) similar to the fourth inclined portion (inclined portions 3aS2 and 3bS1).

The floating wire 2F according to this preferred embodiment includes the branch wire 2e (fourth branch wire) that connects the left-open V-shaped wire 2g and the right-open V-shaped wire 2h, which are coupled at the coupling point J1, to each other. The branch wire 2e includes the inclined portion (inclined portions 2eS2 and 2eS3) similar to the third inclined portion (inclined portions 3aS1 and 3bS2), and the inclined portion (inclined portions 2eS1 and 2eS4) similar to the fourth inclined portion (inclined portions 3aS2 and 3bS1).

In the detection row wire 3 of the block region R1, a lower left portion (at the −x and +y side) and a lower right portion (at the +x and +y side) extend to the vertices Jr1 and Jr2 of the block region R1. At these vertices Jr1 and Jr2, the detection row wire 3 of the block region R1 is coupled to the detection row wires 3 of the block regions R2 located lower left (at the −x and +y side) and lower right (at the +x and +y side). In the detection row wire 3 of the block region R2, an upper left portion (at the −x and −y side) and an upper right portion (at the +x and −y side) extend to the vertices Jr2 and Jr1 of the block region R2. At these vertices Jr1 and Jr2, the detection row wire 3 of the block region R2 is coupled to the detection row wires 3 of the block regions R1 located upper left (at the −x and −y side) and upper right (at the +x and −y side).

As described above, in this preferred embodiment, the detection column wires 2 of the block regions C1 and C2 are partially replaced with the floating wires that are in the same wire layer as the detection row wires 3, and the detection row wires 3 of the block regions R1 and R2 are partially replaced with the floating wires that are in the same wire layer as the detection column wires 2. This can improve the problem that a block region pattern is visually recognized due to differences between the block regions C1, C2 and the block regions R1, R2 in the transmittance, the reflectance, and the wavelength spectrum, which are caused by, for example, a slight difference in a wire width of the detection column wire 2 and a wire width of the detection row wire 3 because of a limitation in manufacturing and the like. That is, a region pattern having different degrees of shading and coloring is made smaller than the block region pattern, and in other words, the frequency of repeating a shading pattern and a coloring pattern is made higher, thereby making it difficult that the difference is visually recognized. Moreover, effects similar to the effects of the preferred embodiments 1 to 3 are obtained.

In this preferred embodiment, there are provided the branch wire 2e that electrically connects the first zigzag wire 2a and the second zigzag wire 2b to each other, and the branch wire 3e that electrically connects the fifth zigzag wire 3a and the sixth zigzag wire 3b to each other. Accordingly, in a case where disconnection occurs in a part of the plurality of detection column wires 2 and the plurality of detection row wires 3, an increase in the resistance of the column direction wire bunch 6 and the row direction wire bunch 7 is suppressed. Thus, detection of the touch position with a high reliability is achieved.

The branch wires 2e and 3e include the inclined portions similar to the first and second inclined portions. Accordingly, the arrangement of the detection column wires 2 and the arrangement of the detection row wires 3 can be uniformized. As a result, even in a case where the detection column wires 2 and the detection row wires 3 are made of an opaque material having a high conductivity, it is possible to uniformized the transmittance at a time when a display light emitted from the display panel passes through the touch screen 1. Thus, occurrence of a moire pattern is suppressed.

Here, it is not always necessary that the patterns of the floating wire 3F, in which the left-open V-shaped wire 3g and the right-open V-shaped wire 3h are coupled at the coupling point J3, are connected to each other at the coupling point J6. The patterns may be isolated from each other.

<Preferred Embodiment 5>

In the configuration described in the preferred embodiment 4, the coupling portions 2P1, 2P2, 3P1, and 3P2 provided in the configuration of the preferred embodiment 3 are not provided. Therefore, it is likely that non-uniformity in the wire patterns caused by co-existence of coupling portions and non-coupling portions of these diagonal wires is visually recognized. Moreover, the pitch at which the coupling portion is repeated in the x direction and the y direction in the preferred embodiment 4 is two times larger than that in the preferred embodiment 3. Therefore, it is likely that the coupling portions themselves are visually recognized.

In the preferred embodiments described above, at the coupling points Jc1, Jc2, Jr1, and Jr2, the detection column wires 2 or the detection row wires 3 are spaced apart from one another. Accordingly, it is likely that non-uniformity relative to the crossing portions of the diagonal wires within the block region is visually recognized.

In this preferred embodiment, therefore, a dummy coupling wire is provided in such a non-coupling portion of the diagonal wire, thereby making it difficult that non-uniformity in the wire pattern is visually recognized.

Figure 37:
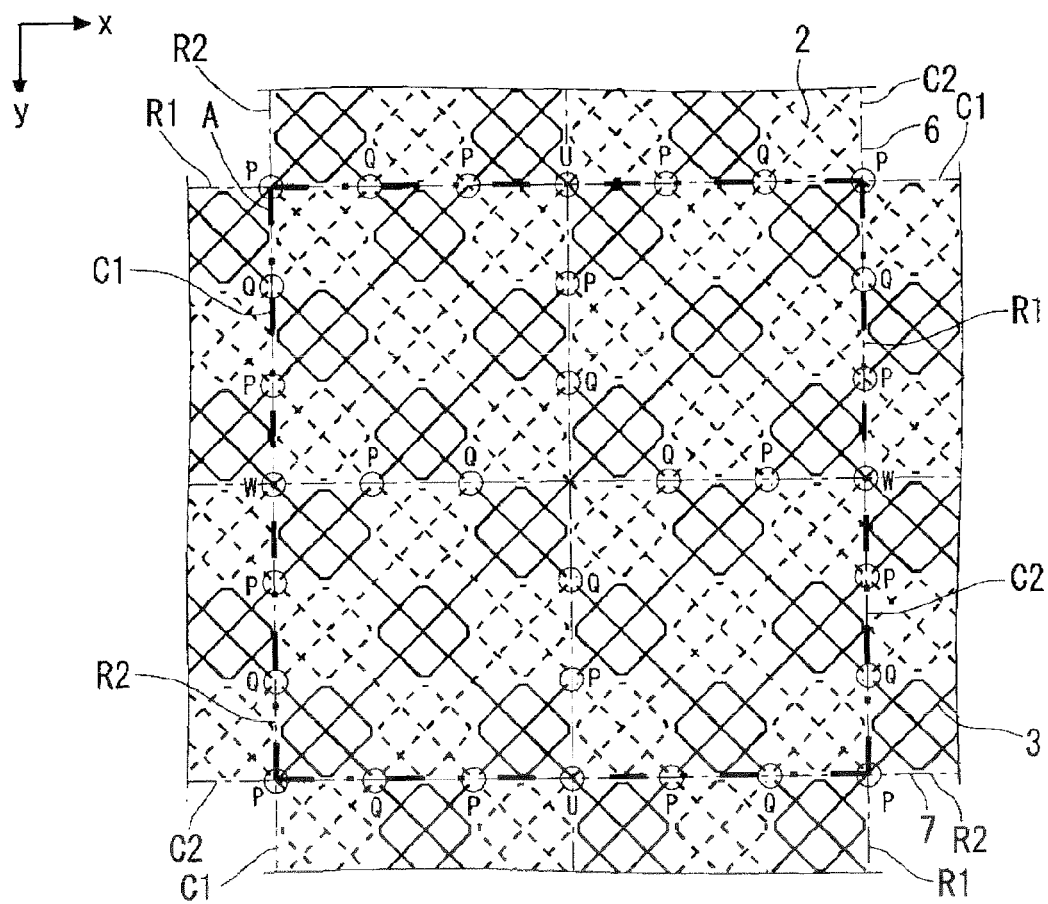

FIG. 37 is a diagram showing, on an enlarged scale, a region around the grid A in this preferred embodiment. The configurations of the block regions C1, C2, R1, and R2, and the configurations of the detection column wires 2, the detection row wires 3, and the floating wires 2F, 3F within the block region, are equivalent to the configurations described in the preferred embodiment 4. As shown in FIG. 37, this preferred embodiment is identical to the preferred embodiment 4 described above, except that dummy coupling wires 2G and 3G are provided in portions (to which solid line circles P, Q, U, and W are given in FIG. 37) existing at the boundary of the block region in which the diagonal wires having angles of +45° and −45° are spaced apart from each other.

Parts (a) to (d) of FIG. 38 are diagrams each showing, on an enlarged scale, each of spaced-apart portions P, Q, U, and W of the diagonal wire. The parts (a) and (b) of FIG. 38 are diagrams showing, on an enlarged scale, the spaced-apart portions P and Q existing on the boundary between a pair of block regions (two neighboring block regions C1, R1, two neighboring block regions C1, R2, two neighboring block regions C2, R1, or two neighboring block regions C2, R2). The part (c) of FIG. 38 is a diagram showing, on an enlarged scale, the spaced-apart portion U existing on the boundary between two obliquely neighboring block regions R1 and R2. The part (d) of FIG. 38 is a diagram showing, on an enlarged scale, the spaced-apart portion W existing on the boundary between two obliquely neighboring block regions C1 and C2.

As shown in the part (a) of FIG. 38, in the touch screen 1 according to this preferred embodiment, the dummy coupling wire 3G (first dummy wire) is provided in a spaced-apart portion (spaced-apart portion P) existing at the boundary between a pair of block regions (one block region and the other block region). That is, in the touch screen 1, the dummy coupling wire 3G that is formed in a wire layer different from the wire layer of the first and second end portions is provided in the spaced-apart portion (spaced-apart portion P) existing between the first end portion of the detection column wire 2 provided in one block region and the second end portion of the floating wire 2F provided in the other block region.

Likewise, in the touch screen 1 according to this preferred embodiment, the dummy coupling wire 2G (second dummy wire) is provided in a spaced-apart portion (spaced-apart portion P) existing at the boundary between a pair of block regions (one block region and the other block region). That is, in the touch screen 1, the dummy coupling wire 2G that is formed in a wire layer different from the wire layer of the third and fourth end portions is provided in the spaced-apart portion (spaced-apart portion P) existing between the third end portion of the detection row wire 3 provided in one block region and the fourth end portion of the floating wire 3F provided in the other block region.

The dummy coupling wire 3G is arranged such that, in a plan view, both end portions thereof partially overlap the first end portion of the detection column wire 2 and the second end portion of the floating wire 2F, respectively. The dummy coupling wire 2G is arranged such that, in a plan view, both end portions thereof partially overlap the third end portion of the detection row wire 3 and the fourth end portion of the floating wire 3F, respectively. The dummy coupling wires 3G and 2G, which are in such different wire layers, are arranged so as to cross each other. Both of the dummy coupling wires 2G and 3G are in a floating state. The dummy coupling wire 3G is inclined at +45 relative to the column direction y. The dummy coupling wire 2G is inclined at −45° relative to the column direction y.

Likewise, as shown in the part (b) of FIG. 38, in the touch screen 1 according to this preferred embodiment, the dummy coupling wire 3G is provided in a spaced-apart portion (spaced-apart portion Q) existing at the boundary between a pair of block regions. That is, in the touch screen 1, the dummy coupling wire 3G that is formed in a wire layer different from the wire layer of the first and second end portions is provided in the spaced-apart portion (spaced-apart portion Q) existing between the first end portion of the detection column wire 2 provided in one block region and the second end portion of the floating wire 2F provided in the other block region.

Likewise, in the touch screen 1 according to this preferred embodiment, the dummy coupling wire 2G is provided in a spaced-apart portion (spaced-apart portion Q) existing at the boundary between a pair of block regions. That is, in the touch screen 1, the dummy coupling wire 2G that is formed in a wire layer different from the wire layer of the third and fourth end portions is provided in the spaced-apart portion (spaced-apart portion Q) existing between the third end portion of the detection row wire 3 provided in one block region and the fourth end portion of the floating wire 3F provided in the other block region.

The dummy coupling wire 3G is arranged such that, in a plan view, both end portions thereof partially overlap the first end portion of the detection column wire 2 and the second end portion of the floating wire 2F, respectively. The dummy coupling wire 2G is arranged such that, in a plan view, both end portions thereof partially overlap the third end portion of the detection row wire 3 and the fourth end portion of the floating wire 3F, respectively. The dummy coupling wires 3G and 2G, which are in such different wire layers, are arranged so as to cross each other. Both of the dummy coupling wires 2G and 3G are in a floating state. The dummy coupling wire 3G is inclined at −45 relative to the column direction y. The dummy coupling wire 2G is inclined at +45° relative to the column direction y.

As shown in the part (c) of FIG. 38, in the touch screen 1, a dummy coupling wire 2K (second dummy wire) is provided in a spaced-apart portion (spaced-apart portion U) existing at the boundary between the block regions R1 and R2. That is, in the touch screen 1, the dummy coupling wire 2K that is formed in a wire layer different from the wire layer of the third and fourth end portions is provided in the spaced-apart portion (spaced-apart portion U) existing between the third end portion of the detection row wire 3 provided in one block region R1 and the fourth end portion of the detection row wire 3 provided in the other block region R2.

The dummy coupling wire 2K is arranged such that, in a plan view, both end portions thereof partially overlap the third and fourth end portions of the detection row wires 3. The dummy coupling wire 2K is a branch wire of the detection column wire 2, and inclined at +45° relative to the column direction y.

As shown in the part (d) of FIG. 38, in the touch screen 1, a dummy coupling wire 3K (first dummy wire) is provided in a spaced-apart portion (spaced-apart portion W) existing at the boundary between the block regions C1 and C2. That is, in the touch screen 1, the dummy coupling wire 3K that is formed in a wire layer different from the wire layer of the first and second end portion is provided in the spaced-apart portion (spaced-apart portion W) existing between the first end portion of the detection column wire 2 provided in one block region C1 and the second end portion of the detection column wire 2 provided in the other block region C2.

The dummy coupling wire 3K is arranged such that, in a plan view, both end portions thereof partially overlap the first and second end portion of the detection column wires 2. The dummy coupling wire 3K is a branch wire of the detection row wire 3, and inclined at −45° relative to the column direction y.

As described above, in this preferred embodiment, the dummy coupling wires are provided in the non-coupling portions of the diagonal wires. This can make it difficult that non-uniformity in the wire pattern is visually recognized. Though not described herein, even in a case where the dummy coupling wires are provided also in spaced-apart portions between the floating wires 2F and spaced-apart portions between floating wires 3F, effects similar to the above-described effects can be obtained.

Desirably, all the detection column wires 2 and the detection row wires 3 (including the branch wires 2e and 3e) described in the preferred embodiments 1 to 5 have substantially the same line width. In such a configuration, the transmittance and the reflectance can be made uniform throughout the detection column wires 2 and the detection row wires 3. Therefore, visual recognition of the block region C1 and the like is prevented. Additionally, in order to avoid visual recognition of wires constituting the detection column wires 2 and the detection row wires 3, it is desirable that the width of the wires is 10 μm or less.

In the preferred embodiments described above, the grid A includes four block regions in total, two of which are the block regions C1 and C2 having the detection column wires 2 and the other two of which are the block regions R1 and R2 having the detection row wires 3. However, the number of block regions included in the grid A is not limited to two having the detection column wires 2 and two having the detection row wires 3. It suffices that the number of block regions having the detection column wires 2 is an even number and the number of block regions having the detection row wires 3 is an even number, and these block regions are arranged in a checkered pattern.

<Preferred Embodiment 6>

Figure 39:
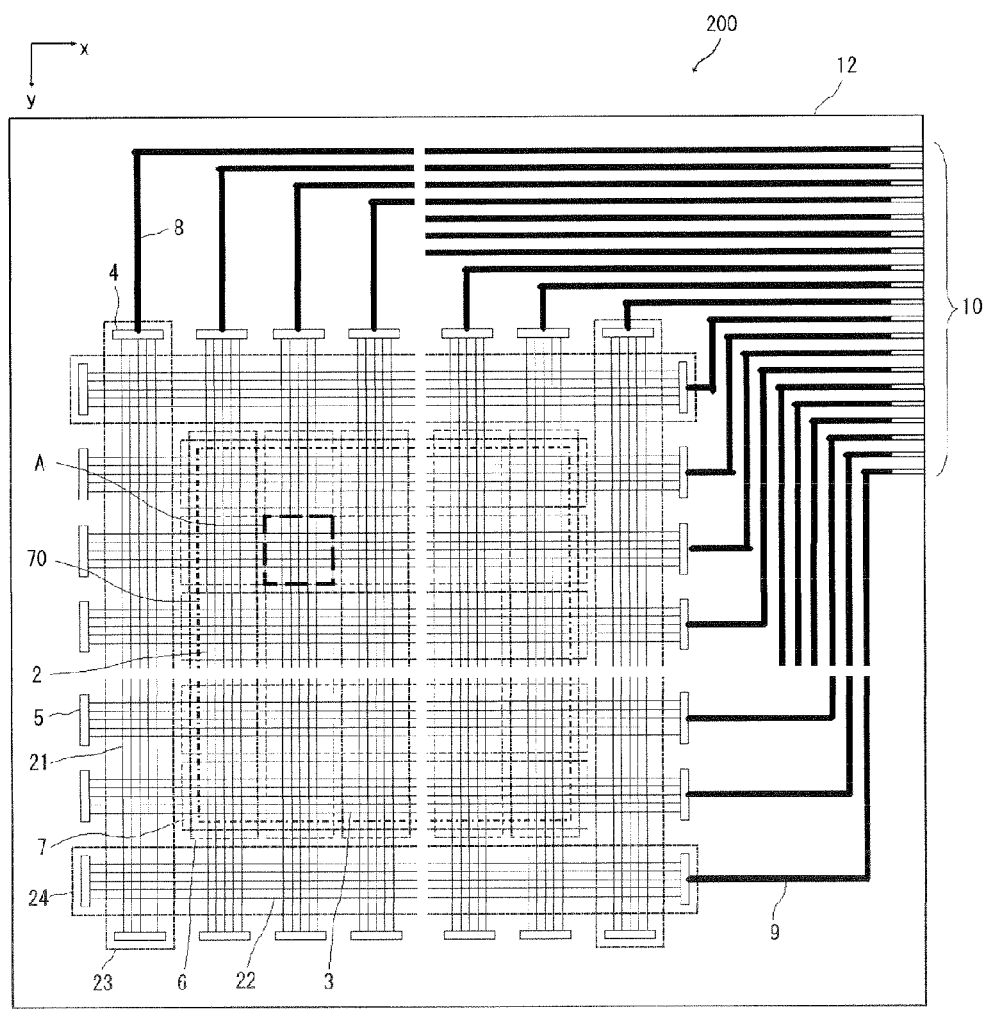
FIG. 39 is a plan view showing a configuration of a touch screen according to a preferred embodiment 6.

FIG. 39 is a plan view showing, in more detail, the plan view (FIG. 1) schematically showing the configuration of the touch screen 1 according to the preferred embodiment 1. As shown in FIG. 39, a touch screen 200 includes a base substrate 12, a plurality of detection column wires 2, and a plurality of detection row wires 3. The base substrate 12 is similar to the one included in the touch screen 1, a transparent substrate made of a transparent glass material or a transparent resin. The plurality of detection column wires 2 extend in a column direction (corresponding to the y direction in FIG. 39). The plurality of detection row wires 3 extend in a row direction (corresponding to the x direction in FIG. 39). The detection column wires 2 are included in a column direction wire bunch 6 having a rectangular shape that extends in the column direction y. The detection column wires 3 are included in a row direction wire bunch 7 having a rectangular shape that extends in the row direction x. A detection region 70 is configured with a plurality of the detection column direction wire bunches 6 and a plurality of the detection row direction wire bunches 7.

At the outer side of the outermost detection column wire 2 (at each end) of the detection region 70, a dummy column wire 21 is arranged in parallel and adjacent thereto. In the same manner, at the outer side of the outermost detection row wire 3 of the detection region 70, a dummy row wire 22 is arranged in parallel and adjacent thereto.

Here, a description will be given to a parasitic capacitance that is added to the detection column wire 2 or the detection column direction wire bunch 6 of the touch screen 1. The part (a) of FIG. 40 is a schematic diagram showing an example of a touch panel including the touch screen shown in FIG. 39. Actually, the detection row direction wire bunches 7 and a column wire select switch circuit 20b are provided. However, for simplification of the description, they are not illustrated. The part (b) of FIG. 40 is a diagram showing a part of a cross-section taken along the line B1-B2 in the part (a) of FIG. 40. The part (b) of FIG. 40 shows a region in the vicinity of a dummy column direction wire bunch 23 and, among the plurality of detection column direction wire bunches 6, two detection column direction wire bunches 6 located at the end. In a dummy column direction wire bunch 23 and each of the plurality of detection column direction wire bunches 6, a parasitic capacitance Ec is formed. The parasitic capacitance Ec is formed between each of them and a dielectric 74 included in a frame region of a display device, a casing that supports the display device, or the like. Additionally, in the dummy column direction wire bunch 23, a parasitic capacitance Ecd is also added. The parasitic capacitance Ecd is formed between the dummy column direction wire bunch 23 and a dielectric 75 included in the frame region of the display device, the casing that supports the display device, or the like.

Accordingly, a parasitic capacitance added to the dummy column direction wire bunch 23 is Ec+Ecd, and a parasitic capacitance added to each detection column direction wire bunch 6 is Ec. No difference occurs among the parasitic capacitances of the detection column direction wire bunches 6. That is, the parasitic capacitance is uniformized over all the detection column direction wire bunches 6. As a result, a variation in the sensitivity of detection of the touch capacitance is suppressed with respect to the column direction. Thus, the accuracy of detection of the touch capacitance is improved.

Actually, in the detection column direction wire bunch 6, a parasitic capacitance Ece is formed between the detection column direction wire bunch 6 and the dielectric 75 in accordance with the distance from the dielectric 75 included in the frame region of the display device, the casing that supports the display device, or the like. The part (c) of FIG. 40 shows the relationship of the parasitic capacitance Ece formed between the detection column direction wire bunch 6 and the dielectric 75 relative to the distance from the dielectric 75. In the parasitic capacitance Ec formed relative to the dielectric 75, a parasitic capacitance Ece1 of the detection column direction wire bunch 23 located outermost is higher than a parasitic capacitance Ece2 of the detection column direction wire bunch 81 located inside and immediately adjacent to the outermost detection column direction wire bunch 80. The parasitic capacitance Ecd2 is higher than a parasitic capacitance Ece3 (not shown) of the detection column direction wire bunch (not shown) located further inside and adjacent thereto.

The parasitic capacitance added to the dummy column direction wire bunch 23 is Ec+Ecd, including the parasitic capacitance Ecd occurring between the dielectric 75 and each of the detection column direction wire bunches 6. On the other hand, the parasitic capacitance of the detection column direction wire bunch 80 located outermost is Ec+Ece1. The parasitic capacitance of the detection column direction wire bunch 81 located next inside is Ec+Ece2. The parasitic capacitance of the detection column direction wire bunch 82 located further next inside is Ec+Ece3.

However, the parasitic capacitance Ec+Ecd added to the dummy column direction wire bunch 23 is higher than the parasitic capacitance Ec+Ece of each detection column direction wire bunch. Accordingly, it is not likely that a difference occurs among the parasitic capacitances of the detection column direction wire bunches 6. That is, the parasitic capacitance is uniformized over all the detection column direction wire bunches 6. As a result, a variation in the sensitivity of detection of the touch capacitance is suppressed with respect to the column direction. Thus, the accuracy of detection of the touch capacitance is improved.

As described above, in order that the accuracy of detection of the touch capacitance is improved in all the detection column direction wire bunches 6, it is demanded that the dummy column wire is arranged at the outer side of the outermost detection column direction wire bunch 6.

Similarly to the dummy column direction wire bunch 23, arrangement of a dummy row direction wire bunch 24 is also demanded. The same description as that of the dummy column direction wire bunch 23 is applied to the dummy row direction wire bunch 24. Therefore, the description is omitted here.

As has been described above, due to the dummy column direction wire bunch 23 arranged at the outer side of the outermost detection column direction wire bunch 6 of the detection region 70 (at each end) and the dummy row direction wire bunch 24 arranged at the outer side of the detection row direction wire bunch 7, the accuracy of detection of the touch capacitance can be improved in all the detection regions.

Figure 41:
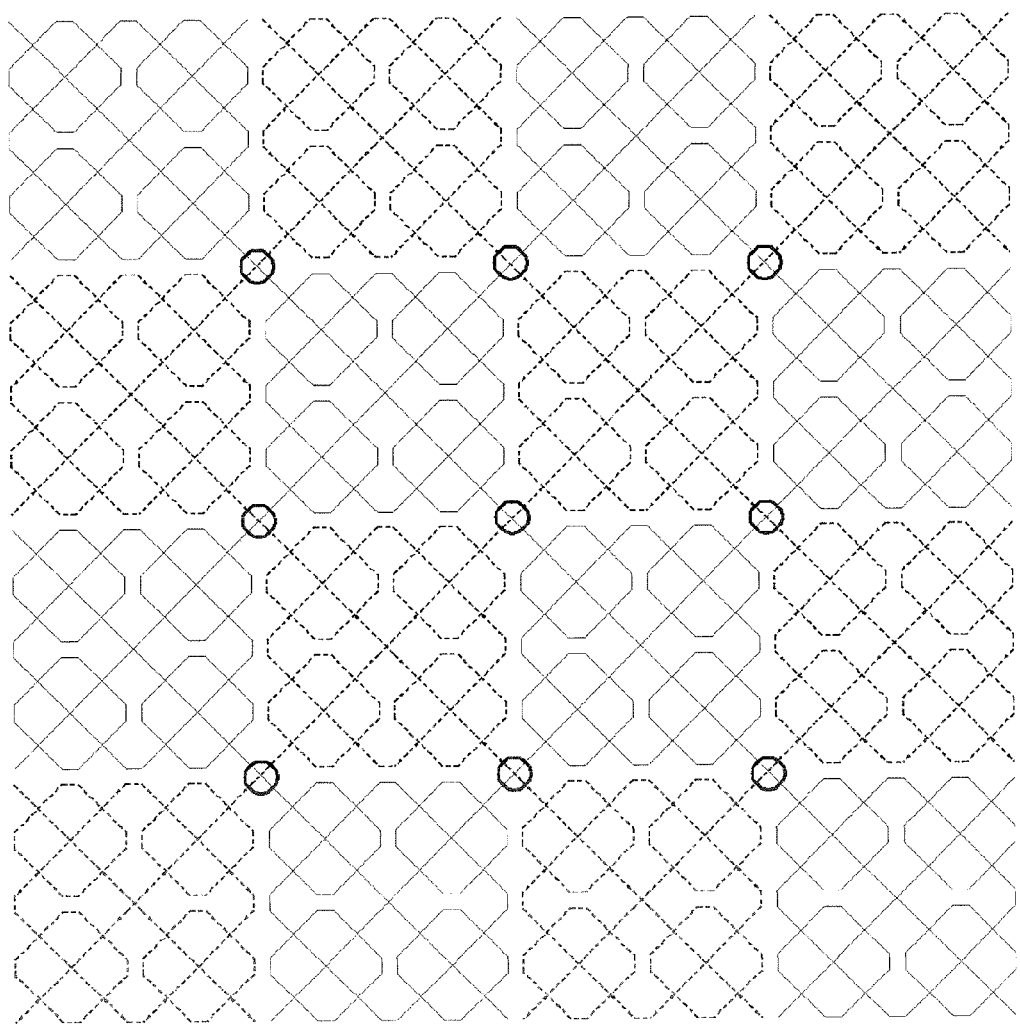

FIG. 41 is a diagram showing the detection column direction wire bunch 6 and the detection row direction wire bunch 7 configured based on, as a fundamental unit, the grid A shown in FIG. 15. In FIG. 42, as compared with the detection column wires 2 and the detection row wires 3 provided in the block regions included in the grid A shown in FIG. 41, the number of zigzag wires is doubled. In FIG. 42, as an example, the number of block regions is 16 (4×4). In this case, in the grid A, the number of coupling portions that couple the block regions C1 and C2 to each other is one. Therefore, in the detection column direction wire bunch 6, the number of coupling portions located on the same y-coordinate is three. Likewise, in the grid A, the number of coupling portions that couple the block regions R1 and R2 to each other is one. Therefore, in the detection row direction wire bunch 7, the number of coupling portions located on the same x-coordinate is three.

FIG. 43 is a version of FIG. 42 in which the number of block regions is 36 (6×6). In this case as well, in the grid A, the number of coupling portions that couple the block regions C1 and C2 to each other is one. Therefore, in the detection column direction wire bunch 6, the number of coupling portions located on the same y-coordinate is five. Likewise, in the grid A, the number of coupling portions that couple the block regions R1 and R2 to each other is one. Therefore, in the detection row direction wire bunch 7, the number of coupling portions located on the same x-coordinate is five.

That is, when the number of block regions included in the detection column direction wire bunch 6 and the detection row direction wire bunch 7 is greater, the number of block region coupling portions located on the same y-coordinate or the number of block region coupling portions located on the same x-coordinate is also greater. When the number of the block regions is smaller, the number of block region coupling portions located on the same y-coordinate or the number of block region coupling portion located on the same x-coordinate is also smaller. This relationship can be represented by the mathematical expression (W=V−1), where V represents the number of block regions and W represents the number of block region coupling portions located at the same coordinate.

In FIGS. 42 and 43, the relationship between the number of block regions and the number of block region coupling portions located on the same y-coordinate or the same x-coordinate has been described by using the detection wires shown in the preferred embodiment 2. This relationship is also established in the detection wires described in the preferred embodiments 1, 3, and 4.

Figure 44:
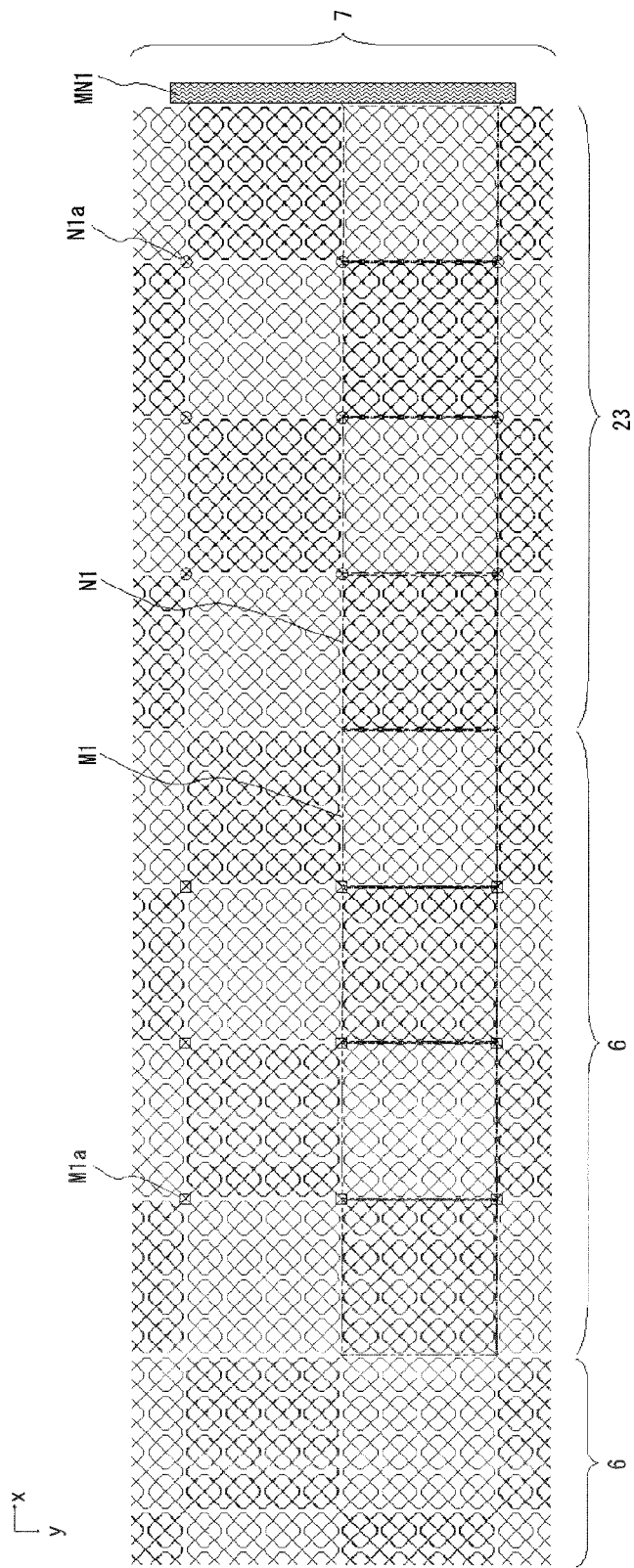

In the above, the necessity for the dummy column direction wire bunch 23 and the dummy row direction wire bunch 24, and the relationship between the number of block regions and the number of block region coupling portions located on the same y-coordinate or the same x-coordinate, have been thus far described. Hereinafter, configurations of the dummy column direction wire bunch 23 and the dummy row direction wire bunch 24 will be described. The dummy column wire 21 and the dummy row wire 22 can be configured with detection wires similar to the detection column wire 2 and the detection row wire 3 constituting the detection region 70 as described in the preferred embodiments 1 to 3. As one example, configurations of a detection column wire and a dummy column wire are shown in FIG. 44. In FIG. 44, a crossing region (sometimes referred to as a detection block region) where the detection column direction wire bunch 6 and the detection row direction wire bunch 7 cross each other is shown in the left part, while a crossing region (sometimes referred to as a dummy column block region) where the dummy column direction wire bunch 23 and the detection row direction wire bunch 7 cross each other is shown in the right part. The number VM1 of block regions M1 (indicated by the alternate long and short dash line in FIG. 44) located on the same y-coordinate in the detection column direction wire bunch 6 is four. The number VN1 of block regions N1 (indicated by the alternate long and two short dashes line in FIG. 44) located on the same y-coordinate in the dummy column direction wire bunch 23 is four.

As apparent from the configurations of the detection column wires and the dummy column wires shown in FIG. 44, the number VM1 of block regions M1 and the number WM1a of coupling portions M1a in the detection column direction wire bunch 6 have the relationship represented by the mathematical expression (WM1a=VM1−1). In the same manner, the number VN1 of block regions N1 and the number WN1a of coupling portions N1a in the dummy column direction wire bunch 23 have the relationship represented by the mathematical expression (WN1a=VN1−1). Accordingly, in FIG. 44, the number WM1a of coupling portions M1 between the block regions M1 in the detection column direction wire bunch 6 is 4−1=3, while the number WN1a of coupling portions N1a between the block regions N1 in the dummy column direction wire bunch 23 is 4−1=3. The same applies to the number of block regions and the number of coupling portions in the detection row direction wire bunch, and to the number of block regions and the number of coupling portions in the dummy row direction wire bunch, though descriptions thereof are omitted here.

Figure 45:
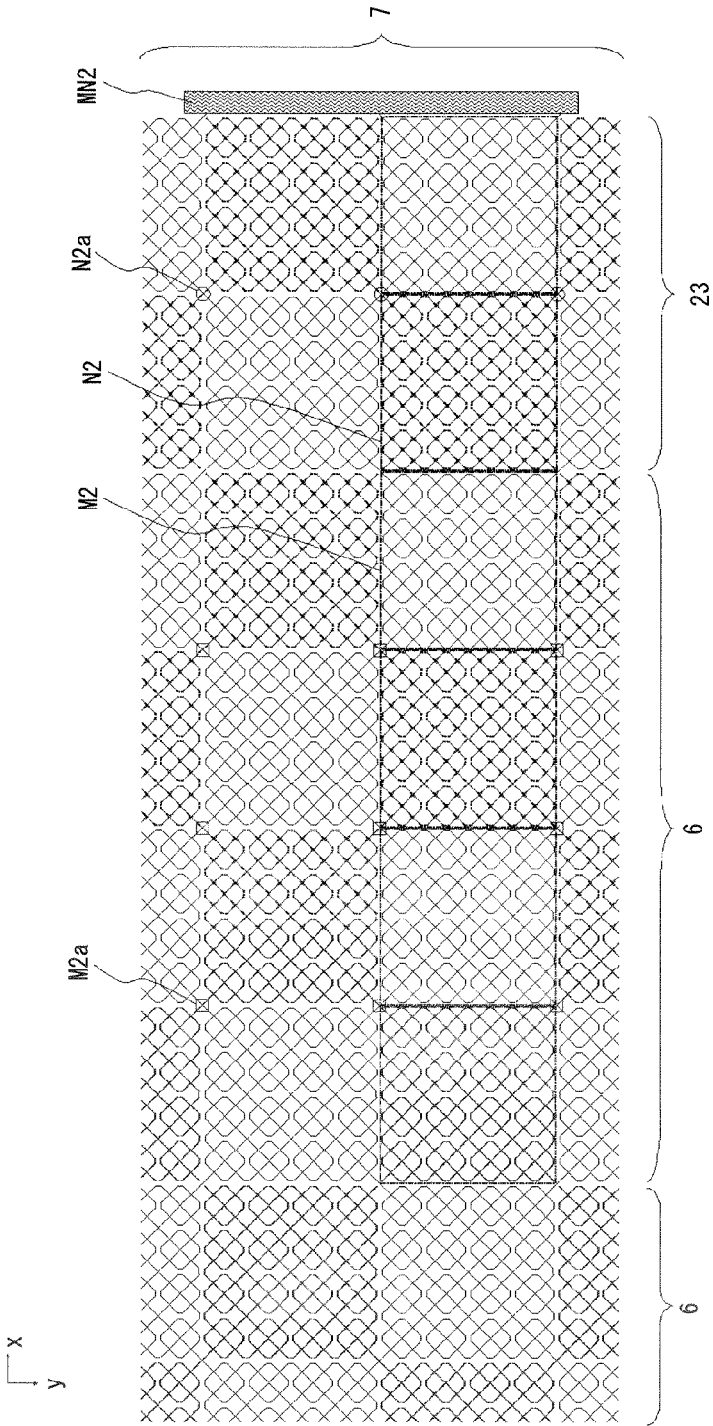

Meanwhile, due to a limitation of a product and the like, it is sometimes demanded that the widths of the dummy column direction wire bunch 23 and the dummy row direction wire bunch 24 be reduced in order to downsize the frame region of the touch screen 200. Configurations of the detection column wires and the dummy column wires at this time are shown in FIG. 45. In this case, the number WN2 of block regions N2 included in the dummy column direction wire bunch 23 is smaller than the number VM2 of block region M2s located on the same y-coordinate included in the detection column direction wire bunch 6 (VM2>WN2). Accordingly, the number of coupling portions N2a between the block regions N2 located on the same y-coordinate in the dummy column direction wire bunch 23 is also made small. In FIG. 45, the number of coupling portions M2a between the block regions M2 in the detection column direction wire bunch 6 is 4−1=3, and the number of coupling portions N2a between the block regions N2 in the dummy column direction wire bunch 23 is 2−1=1.

In this case, a problem arises that, due to a foreign substance or the like during a manufacturing process, disconnection occurs in the dummy column direction wire bunch 23 extending in the y direction, so that the function as the dummy column direction wire bunch may be sometimes lost in a portion, subsequent to the disconnection, of the dummy column direction wire bunch 23 extending in the y direction. Likewise, a problem arises that disconnection occurs in the dummy row direction wire bunch 24 (not shown) extending in the x direction, so that the function as the dummy row direction wire may be sometimes lost in a portion, subsequent to the disconnection, of the dummy row direction wire bunch 24 extending in the x direction.

Figure 46:
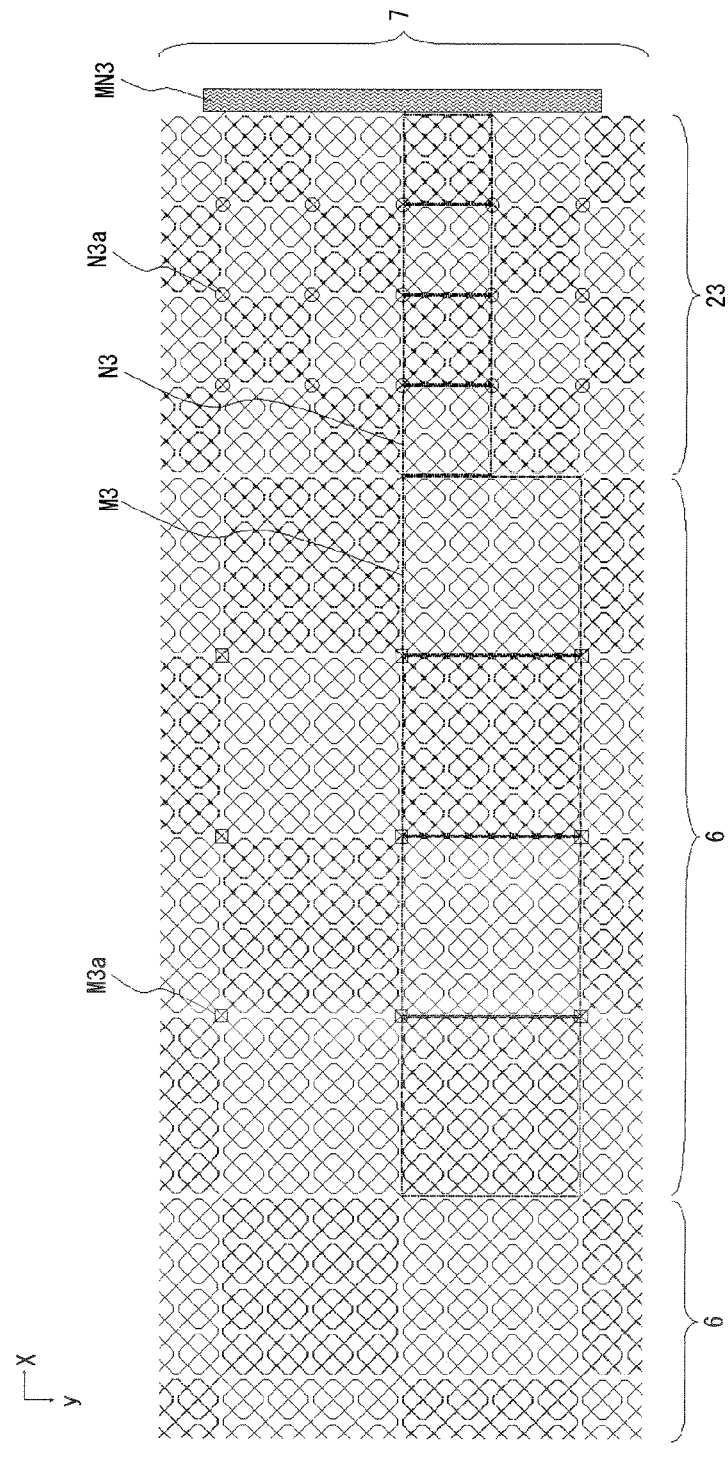

To solve these problems, in this preferred embodiment, a description will be given to a configuration in which disconnection due to a foreign substance or the like during the manufacturing process is not likely to occur in the dummy column direction wire bunch 23 and the dummy row direction wire bunch 24 (not shown). FIG. 46 shows an example of this preferred embodiment. In FIG. 46, the number of patterns N3p constituting the block region N3 in the dummy column direction wire bunch 23 is four (2×2), while in FIG. 45, the number of patterns N2p constituting the block region N2 in the dummy column direction wire bunch 23 is sixteen (4×4). The number WN3a of block regions N3 in the dummy column direction wire bunch 23 is four. The number of coupling portions N3a between the block regions N3 in the dummy column direction wire bunch 23 is 4−1=1. That is, the number of patterns N3p constituting the block region N3 in the dummy column direction wire bunch 23 is reduced from sixteen shown in FIG. 45 to four shown in FIG. 46. Thereby, the number of coupling portions between the block regions can be increased from one to three.

As has been described above, the number S72' of patterns N3p constituting the block region N3 in the dummy column direction wire bunch 23 shown in FIG. 46 is made smaller than the number S72 of patterns N2p constituting the block region N2 in the detection column direction wire bunch 23 shown in FIG. 45 (S72>S72'). Thereby, the number of block region coupling portions located on the same y-coordinate can be increased. Thus, even if disconnection occurs due to, for example, a foreign substance during the manufacturing process, the possibility of occurrence of disconnection in the dummy column direction wire bunch 23 extending in the y direction can be lowered. The same applies to the detection row direction wire bunch 24 (not shown), though a description thereof is omitted here. In this case, the same description applies to comparison between a crossing region (detection block region) where the detection column direction wire bunch 6 and the detection row direction wire bunch 7 cross each other, and a crossing region (dummy row block region) where the detection column direction wire bunch 6 and the dummy row direction wire bunch 24 cross each other. The magnitude relationship between the number of dummy column block region patterns and the number of detection block region patterns described above, and the magnitude relationship between the number of dummy row block region patterns and the number of detection block region patterns, have at least either one of the configurations. Thereby, the effects of the present invention are exerted.

However, as described above, when the number of block region patterns constituting the dummy column direction wire bunch 23 and the dummy row direction wire bunch 24 is made smaller than the number of block region patterns constituting the detection column direction wire bunch 6 and the detection row direction wire bunch 7, the coupling capacitance of the dummy column direction wire bunch 23 and the dummy row direction wire bunch 24 is increased. Although the dummy column direction wire bunch 23 and the dummy row direction wire bunch 24 themselves do not directly contribute to detection of the touch capacitance, the coupling capacitance is increased in the detection column direction wire bunch 6 and the detection row direction wire bunch 7, which form capacitive coupling with the dummy column direction wire bunch 23 and the dummy row direction wire bunch 24.

Here, in a total coupling capacitance between the detection column direction wire bunch 6 and the detection row direction wire bunch 7, a proportion of the coupling capacitance between the detection column direction wire bunch 6 and the dummy row direction wire bunch 24 and the coupling capacitance between the detection row direction wire bunch 7 and the dummy column direction wire bunch 23 is small. Therefore, it can be considered that reducing the number of block region patterns constituting the dummy column direction wire bunch 23 and the dummy row direction wire bunch 24 has little influence. Thus, by making the number of block region patterns constituting the dummy column direction wire bunch 23 and the dummy row direction wire bunch 24 smaller than the number of block region patterns constituting the detection column direction wire bunch 6 and the detection row direction wire bunch 7, the possibility of occurrence of disconnection in the dummy column direction wire bunch 23 and the dummy row direction wire bunch 24 can be lowered, thus enabling the touch position to be detected with a high reliability.

In the above, a case of reducing the widths of the dummy column direction wire bunch 23 and the dummy row direction wire bunch 24 has been described. However, the same configuration is also applicable to a case where it is not necessary to reduce the frame region of the touch screen 200, that is, a case where it is not necessary to reduce the widths of the dummy column direction wire bunch 23 and the dummy row direction wire bunch 24. In such a case as well, the possibility of occurrence of disconnection in the dummy column direction wire bunch 23 and the dummy row direction wire bunch 24 can be lowered, thus enabling the touch position to be detected with a high reliability.

<Preferred Embodiment 7>

In a case described in the preferred embodiment 4, the detection column wires 2 provided in the block regions C1 and C2 are partially replaced with the floating wires that are in the same wire layer as the detection row wires 3, and the detection row wires 3 provided in the block regions R1 and R2 are partially replaced with the floating wires that are in the same wire layer as the detection column wire 2, so that the frequency of repeating the shading pattern and the coloring pattern is increased, thereby making it difficult that the block region pattern is visually recognized.

On the other hand, the preferred embodiment 6 has been described based on the preferred embodiments 1 to 3, but the configuration of the preferred embodiment 6 can also be implemented with the block illustrated in the preferred embodiment 4. FIG. 47 is a diagram showing a case where the dummy column direction wire bunch 23 and the dummy row direction wire bunch 24 described in the preferred embodiment 6 are configured as illustrated in the preferred embodiment 4. In the dummy column direction wire bunch 23 and the dummy row direction wire bunch 24, too, the frequency of repeating the shading pattern and the coloring pattern is increased. Therefore, it is difficult that the block region pattern is visually recognized.

However, in a case where the block regions R1 and R2 including the dummy column wire 21 and the dummy row wire 22 are partially replaced with the floating wires, as compared with a case where they are not replaced with the floating wires, the capacitive coupling formed between the dummy column and row wires 21, 22 and the dielectric 75 included in the frame region of the display device, the casing that supports the display device, or the like, is reduced, because the area of wires that contribute to the capacitive coupling is reduced. Thus, there is a problem that an adverse effect acts on the reduction in the capacitive coupling formed between the detection column and row wires 2, 3 and the dielectric 75 included in the frame region of the display device, the casing that supports the display device, or the like. In other words, an adverse effect acts on an electric field shielding effect, which is one of the primary effects obtained by arranging the dummy column wire 21 and the dummy row wire 22.

To solve this problem, in this preferred embodiment, a description will be given to the dummy column wires 21 and the dummy row wires 22 that enables the frequency of repeating the shading pattern and the coloring pattern to be kept high without impairing the electric field shielding effect against the frame region of the display device, the casing that supports the display device, or the like. Furthermore, a description will be given to a boundary portion between a detection wire bunch and the dummy column direction wire bunch 23, and a boundary portion between a detection wire bunch and the dummy row direction wire bunch 24.

FIG. 48 shows the dummy column direction wire bunch 23 and the dummy row direction wire bunch 24 having an enhanced electric field shielding effect. FIG. 46 shows a boundary portion between the dummy column direction wire bunch 23 and the detection wire bunch. As for a boundary portion between the dummy row direction wire bunch 24 and the detection wire bunch, the same relationship as that between the dummy column direction wire bunch 23 and the detection wire bunch is established. Therefore, a description thereof is omitted here. As shown in FIG. 48, to enhance the electric field shielding effect, the replacement is not performed in the configuration in which the wires are replaced with the floating wires as shown in FIG. 47. This is most effective, because the area that contributes to the capacitive coupling formed with the dielectric 75 included in the frame region of the display device, the casing that supports the display device, or the like, is increased.

Figure 49:
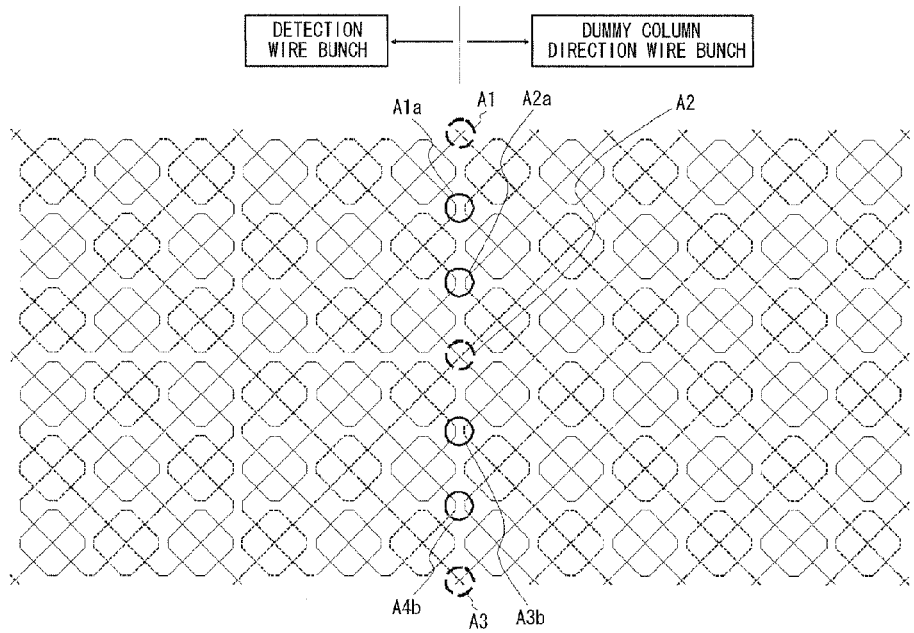

In this case, as shown in FIG. 49, at vertices A1a, A2a, A3b, and A4b located at the boundary portion between the detection wire bunch and the dummy column direction wire bunch 23, the detection wire bunch and the dummy column direction wire bunch 23 are not coupled to each other. On the other hand, at vertices A1, A2, and A3 of the block A, coupling portions are provided because it is necessary to electrically connect the detection wire bunch and the dummy column direction wire bunch to each other.

Figure 50:
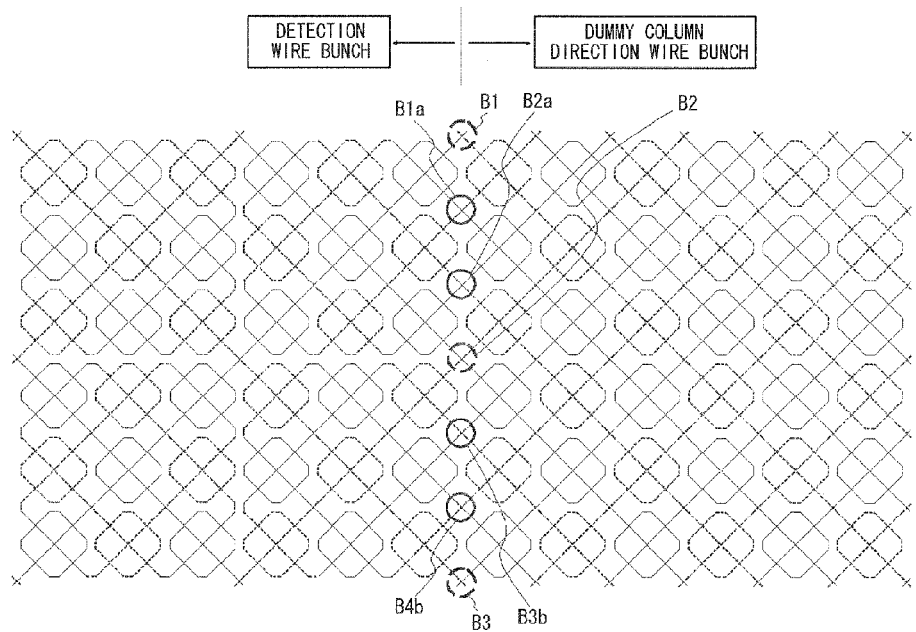

FIG. 50 is a diagram showing an example different from the above-described example about the boundary between the dummy column direction wire bunch 23 and the detection wire bunch. At vertices B1a, B2a, B3b, and B4b, a wire layer different from the wire layer of the floating wires of the detection wire bunch is formed, and the detection wire bunch is coupled to a wire extending from an end portion of the dummy column direction wire bunch. Such a manner of coupling increases the number of coupling portions between the detection row wire 3 included in the detection wire bunch and the detection row wire included in the dummy column direction wire bunch 23. Accordingly, the possibility of occurrence of disconnection due to, for example, a foreign substance during the manufacturing process can be lowered, thus enabling the touch position to be detected with a high reliability.

As described above, in this preferred embodiment, the configuration of the preferred embodiment 4 in which the dummy column wires are replaced with the floating wires is not adopted, and no replacement is performed. This can enhance the electric field shielding effect of the dummy column wire. Moreover, this enables even the detection column wires configured with the floating wire shown in preferred embodiment 4 to be coupled across the blocks. Furthermore, both in the detection column wire and in the dummy column wire, the frequency of repeating the shading pattern and the coloring pattern can be kept high, thus making visually recognition difficult.

In the present invention, the preferred embodiments may be appropriately modified, changed, or omitted in various ways within the scope of the invention.

<Preferred Embodiment 8>

In a preferred embodiment 8 of the present invention, a description will be given to a liquid crystal display device the touch screen 1 described above is attached to a liquid crystal display panel 61 that is a display panel so that the touch panel 100 and the liquid crystal display panel 61 are integrated.

Figure 51:
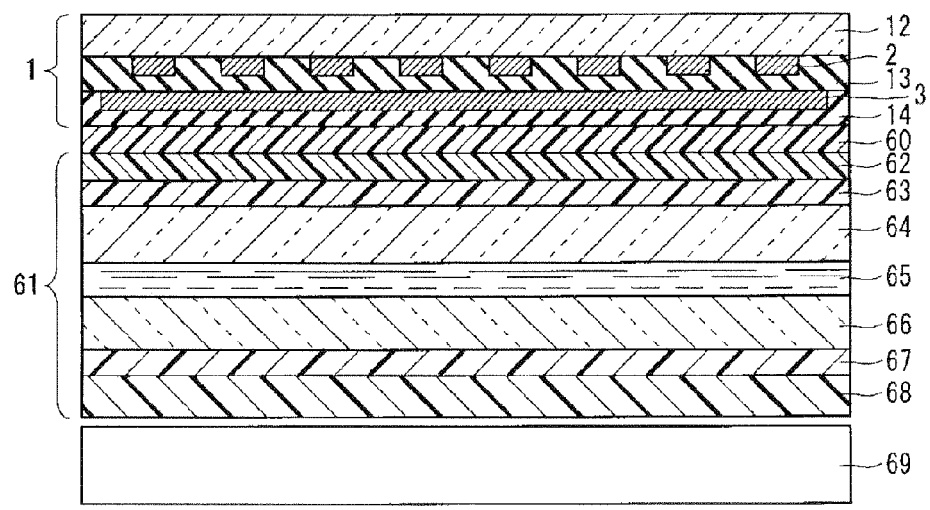
FIG. 51 is a diagram showing a configuration of a liquid crystal display device according to a preferred embodiment 8.

FIG. 51 is a cross-sectional view showing a configuration of a liquid crystal display device according to this preferred embodiment. This liquid crystal display device includes the touch panel 100 shown in FIG. 14 and including the touch screen 1, an adhesive layer 60, a liquid crystal display panel 61, and a backlight 69. In FIG. 51, for the sake of convenience, illustration of the FPC 17 and the controller substrate 18 of the touch panel 100 is omitted.

The liquid crystal display panel 61 includes a polarization plate 62, an adhesive layer 63, a color filter substrate 64, a liquid crystal layer 65, a TFT array substrate 66, an adhesive layer 67, and a polarization plate 68. Hereinafter, the upper side in FIG. 51 will be referred to as one side with respect to the thickness direction, and the lower side in FIG. 51 will be referred to as the other side with respect to the thickness direction.

The color filter substrate 64 is formed with a color filter, a black matrix, a transparent electrode, and an alignment film (any of which are not shown) being formed on a glass substrate. The TFT array substrate 66 is formed with switching elements (any of which are not shown) such as thin-film transistors (TFT) being formed on a glass substrate. The liquid crystal layer 65 is sandwiched between the color filter substrate 64 and the TFT array substrate 66, and made of, for example, a twisted nematic (TN) liquid crystal.

The polarization plate 68 is adhesively fixed, with the adhesive layer 67, to a surface of the TFT array substrate 66 at the other side with respect to the thickness direction. In the same manner, the polarization plate 62 is adhesively fixed, with the adhesive layer 63, to a surface of the color filter substrate 64 at one side with respect to the thickness direction. The backlight 69, which is a light source, is arranged at the rear surface side (the other side with respect to the thickness direction) of the liquid crystal display panel 61.

The liquid crystal display panel 61 is mounted to the touch screen 1 of the touch panel 100. In this preferred embodiment, the touch screen 1 is adhesively fixed, with the adhesive layer 60, to a front surface side of the liquid crystal display panel 61 (here, to a surface of the polarization plate 62 at one side with respect to the thickness direction).

Thus, in the liquid crystal display device according to this preferred embodiment, the touch screen 1 is adhesively fixed to the front surface side of the liquid crystal display panel 61, and integrated therewith. Accordingly, a mechanism for holding the touch screen 1, which has been conventionally necessary, can be omitted. As a result, the liquid crystal display device can be thinned as a whole. Additionally, entry of dust, and the like, into a gap between the touch screen 1 and the liquid crystal display panel 61 is suppressed. Therefore, an adverse effect on the display, which is caused by entry of dusts and the like, is suppressed.

The TFT array substrate 66 shown in FIG. 51 receives from an external driver circuit a signal (hereinafter, sometimes referred to as "image signal") in accordance with an image to be displayed. In accordance with the received image signal, the TFT formed on the TFT array substrate 66 and corresponding to each pixel controls an applied voltage of the liquid crystal layer 65, thus changing an arrangement direction of liquid crystal molecules of the liquid crystal layer 65.

Incident light from the backlight 69 passes through the polarization plate 68, into a linearly-polarized light. Then, the light passes through the liquid crystal layer 65 and thereby its vibration direction is curved in accordance with the image signal indicating an image to be displayed. The light whose vibration direction has been curved passes through a color filter formed in the color filter substrate 64. Thereby, the light is separated into three primary colors of light. Then, the light passes through the polarization plate 62 provided at the front surface side, and thereby changes into light with a light intensity that is in accordance with the image signal. The light having passes through the polarization plate 62 further passes the touch screen 1 provided on the front surface. As a result, the light is, as the display light, visually recognized by a user.

In this manner, transmittance of light from the backlight 69 is controlled in accordance with the image signal, and thereby the liquid crystal display device implements a desired display. The touch panel 100 including the touch screen 1 calculates a touch coordinates value based on a change in an oscillation cycle, and outputs the calculated touch coordinates value as the touch coordinates data.

In this preferred embodiment, the column direction y of the touch screen 1 is parallel to the column direction of a pixel pattern in the liquid crystal display panel 61, and the row direction x of the touch screen 1 is parallel to the row direction of the pixel pattern in the liquid crystal display panel 61. In this state, the liquid crystal display panel 61 is mounted to the touch screen 1.

In such a liquid crystal display device according to this preferred embodiment, each of the zigzag wires of the detection column wire 2 and the detection row wire 3 is, for each pixel, arranged in an oblique direction that is inclined relative to the arrangement direction of the pixel pattern. Accordingly, a part of each pixel of the liquid crystal display panel 61 can be uniformly covered with the detection column wire 2 and the detection row wire 3. As a result, the transmittance at a time when the display light emitted from the entire liquid crystal display panel 61 passes through the touch screen 1 can be uniformized. Thus, occurrence of a moire pattern is suppressed.

In the present invention, the preferred embodiments may be appropriately modified, changed, or omitted in various ways within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A touch screen comprising:
   a transparent substrate;
   a column direction wire bunch and a row direction wire bunch that are formed on said transparent substrate, said column direction wire bunch having a rectangular shape and including a plurality of detection column wires electrically connected commonly to each other, said row direction wire bunch having a rectangular shape and including a plurality of detection row wires electrically connected commonly to each other; and
   a dummy column direction wire bunch and a dummy row direction wire bunch, said dummy column direction wire bunch having a rectangular shape and including a plurality of dummy column wires electrically connected commonly to each other, said dummy row direction wire bunch having a rectangular shape and including a plurality of dummy row wires electrically connected commonly to each other, wherein said dummy column direction wire bunch is provided at the outer side of the outermost one of the detection column wires in a detection region including a plurality of said detection column wires and a plurality of said detection row wires, said dummy row direction wire bunch is provided at the outer side of the outermost one of the detection row wires in a detection region including a plurality of said detection column wires and a plurality of said detection row wires, in a plan view, a plurality of detection block regions obtained as a result of dividing a crossing region where said column direction wire bunch and said row direction wire bunch cross each other are specified, in a plan view, a plurality of dummy column block regions obtained as a result of dividing a crossing region where said dummy column direction wire bunch and said row direction wire bunch cross each other are specified, in a plan view, a plurality of dummy row block regions obtained as a result of dividing a crossing region where said dummy row direction wire bunch and said column direction wire bunch cross each other are specified, in a plan view, a plurality of patterns constituting said detection block regions, said dummy column block regions, and said dummy row block regions are specified, the number of said patterns in said dummy column block region or the number of said patterns in said dummy row block region is smaller than the number of said patterns in said detection block region.

2. A touch panel comprising:
the touch screen according to claim 1;
a switch circuit that sequentially selects each of a plurality of said column direction wire bunches and each of a plurality of said row direction wire bunches; and
a detection processing circuit that performs a calculation process for calculating touch coordinates on said touch screen indicating a touch position touched with an indicator based on a result of detection of an electrostatic capacitance formed between said column direction wire bunch selected by said switch circuit and said indicator having touched said touch screen and a result of detection of an electrostatic capacitance formed between said row direction wire bunch selected by said switch circuit and said indicator.

3. A display device comprising:
the touch panel according to claim 2; and
a display panel mounted to said touch screen of said touch panel.

4. The display device according to claim 3, wherein said touch screen is adhesively fixed to a front surface side of said display panel.

5. The display device according to claim 3, wherein said column direction of said touch screen is parallel to a column direction of a pixel pattern in said display panel, said row direction of said touch screen is parallel to a row direction of said pixel pattern in said display panel.

6. A touch panel comprising:
the touch screen according to claim 1;
a switch circuit that sequentially selects each of a plurality of said column direction wire bunches and each of a plurality of said row direction wire bunches; and
a detection processing circuit that performs a calculation process for calculating touch coordinates on said touch screen indicating a touch position touched with an indicator based on a result of detection of a change in a mutual capacitance between said column direction wire bunch and said row direction wire bunch selected by said switch circuit in accordance with the touch to said touch screen with said indicator.

7. A display device comprising:
the touch panel according to claim 6; and
a display panel mounted to said touch screen of said touch panel.

8. A touch screen comprising:
a transparent substrate;
a column direction wire bunch and a row direction wire bunch that are formed on said transparent substrate, said column direction wire bunch having a rectangular shape and including a plurality of detection column wires electrically connected commonly to each other, said row direction wire bunch having a rectangular shape and including a plurality of detection row wires electrically connected commonly to each other;
a first floating wire formed in the same wire layer as said row direction wire bunch, said first floating wire being not connected to said column direction wire bunch and said row direction wire bunch;
a second floating wire formed in the same wire layer as said column direction wire bunch, said second floating wire being not connected to said column direction wire bunch and said row direction wire bunch; and
a dummy column direction wire bunch and a dummy row direction wire bunch, said dummy column direction wire bunch having a rectangular shape and including a plurality of dummy column wires electrically connected commonly to each other, said dummy row direction wire bunch having a rectangular shape and including a plurality of dummy row wires electrically connected commonly to each other, said dummy column direction wire bunch is provided at the outer side of the outermost one of the detection column wires in a detection region including a plurality of said detection column wires and a plurality of said detection row wires, said dummy row direction wire bunch is provided at the outer side of the outermost one of the detection row wires in a detection region including a plurality of said detection column wires and a plurality of said detection row wires, in a plan view, a plurality of detection block regions obtained as a result of dividing a crossing region where said column direction wire bunch and said row direction wire bunch cross each other are specified, in a plan view, a plurality of dummy column block regions obtained as a result of dividing a crossing region where said dummy column direction wire bunch and said row direction wire bunch cross each other are specified, in a plan view, a plurality of dummy row block regions obtained as a result of dividing a crossing region where said dummy row direction wire bunch and said column direction wire bunch cross each other are specified, in each of said detection block regions, said detection column wire and said first floating wire, or said detection row wire and said second floating wire, are provided, in said dummy column block region or said dummy row block region, any floating wire that is not electrically connected is not provided.

9. A touch panel comprising:
the touch screen according to claim 8;
a switch circuit that sequentially selects each of a plurality of said column direction wire bunches and each of a plurality of said row direction wire bunches; and
a detection processing circuit that performs a calculation process for calculating touch coordinates on said touch screen indicating a touch position touched with an indicator based on a result of detection of an electrostatic capacitance formed between said column direction wire bunch selected by said switch circuit and said indicator having touched said touch screen and a result of detection of an electrostatic capacitance formed between said row direction wire bunch selected by said switch circuit and said indicator.

10. A display device comprising:
the touch panel according to claim 9; and
a display panel mounted to said touch screen of said touch panel.

11. A touch panel comprising:
the touch screen according to claim 8;
a switch circuit that sequentially selects each of a plurality of said column direction wire bunches and each of a plurality of said row direction wire bunches; and
a detection processing circuit that performs a calculation process for calculating touch coordinates on said touch screen indicating a touch position touched with an indicator based on a result of detection of a change in a mutual capacitance between said column direction wire bunch and said row direction wire bunch selected by said switch circuit in accordance with the touch to said touch screen with said indicator.

12. A display device comprising:
the touch panel according to claim 11, and
a display panel mounted to said touch screen of said touch panel.

* * * * *